US012605780B2

(12) United States Patent (10) Patent No.: US 12,605,780 B2
Conway et al. (45) Date of Patent: Apr. 21, 2026

(54) CUTTING APPARATUS

(71) Applicant: Decom Engineering Ltd, Cookstown (GB)

(72) Inventors: Greg Conway, Cookstown (GB); Sean Conway, Cookstown (GB)

(73) Assignee: Decom Engineering Ltd, County Tyrone (GB)

( * ) Notice: Subject to any disclaimer, the term of this patent is extended or adjusted under 35 U.S.C. 154(b) by 160 days.

(21) Appl. No.: 18/547,990

(22) PCT Filed: Feb. 25, 2022

(86) PCT No.: PCT/EP2022/054897
§ 371 (c)(1),
(2) Date: Aug. 25, 2023

(87) PCT Pub. No.: WO2022/180258
PCT Pub. Date: Sep. 1, 2022

(65) Prior Publication Data
US 2024/0139840 A1 May 2, 2024

(30) Foreign Application Priority Data

Feb. 25, 2021 (GB) ..................................... 2102708

(51) Int. Cl.
*B23D 57/00* (2006.01)
(52) U.S. Cl.
CPC ................................ *B23D 57/0084* (2013.01)
(58) Field of Classification Search
CPC .... B23D 57/0084; B23D 45/12; B23D 21/00; B26D 3/16; B26D 3/14; B26D 1/14; B27B 5/10
See application file for complete search history.

(56) References Cited

U.S. PATENT DOCUMENTS

| | | | | |
|---|---|---|---|---|
| 2,378,554 A | * | 6/1945 | Irwin, Jr. .................. | B27B 5/10 298/2 |
| 7,017,450 B2 | | 3/2006 | Bangert | |
| 8,973,275 B1 | * | 3/2015 | Cleveland .............. | B23D 53/12 30/380 |
| 2010/0043609 A1 | * | 2/2010 | Franze ................... | B23D 21/06 83/13 |
| 2011/0167651 A1 | * | 7/2011 | Tokunaga .............. | B23D 47/12 30/388 |

(Continued)

FOREIGN PATENT DOCUMENTS

WO 2011140227 A1 11/2011

OTHER PUBLICATIONS

ISR for application PCT/EP2022/054897 dated Jun. 2, 2022.

*Primary Examiner* — Liang Dong
(74) *Attorney, Agent, or Firm* — Renner, Kenner; Arthur M. Reginelli

(57) ABSTRACT

A cutting apparatus (1) configured for The cutting apparatus (1) has a cutting means drive arrangement (100) having at least one cutting means (12) and at least one motive means (43) for providing power to the cutting means (12). The cutting apparatus (1) is configured such that all, some or a part of the cutting means drive arrangement (100) is interchangeable, on site. This enables use of a single cutting apparatus to perform a variety of different cuts and/or to cut a variety of different objects.

20 Claims, 42 Drawing Sheets

(56)     References Cited

U.S. PATENT DOCUMENTS

| | | | | |
|---|---|---|---|---|
| 2011/0167975 | A1* | 7/2011 | Boudreault | B23D 59/006 |
| | | | | 83/100 |
| 2011/0271805 | A1 | 11/2011 | Abadie et al. | |
| 2021/0213644 | A1* | 7/2021 | Trudeau | B26D 1/08 |
| 2021/0215006 | A1* | 7/2021 | Johnson | B25B 21/002 |

* cited by examiner

CUTTING APPARATUS

The present invention relates to a cutting apparatus. In particular, the present invention relates to a cutting apparatus for cutting a wide variety of materials above or below sea level.

The main demand for cutting technologies above the sea level is to cut solid and hollow metal materials such as pipe sections and concrete piles. Below sea level the demand is for metal pipes but also solid materials such as mooring chain and high-tension materials such as umbilicals The main source of cutting demand both above and below the sea arises in the decommissioning industry as large amounts of material must be removed in a safe, cost effective and environmentally friendly manner. The equipment needs to be deployed in a variety of ways, such as by crane, excavator attachment, diver operation or via remote operated vehicles (ROVs). The existing cutting technologies include abrasives, ID cutters, diamond wire saws, reciprocating cutting tools, hydraulic shears and explosives which operate in a variety of ways.

Abrasives create a clean cut by injecting sand or slurry into a high-pressure water jet that wears away at the steel. Typically, the abrasive water jet will operate at 10,000-15,000 psi. This method is very versatile, and due to the relatively small cutting head the process can be used where access is restricted. In some tools, the water jet can cut through both sides of the pipe simultaneously, and hence need only rotate halfway around the pipe to complete a cut. Others require access around the complete circumference. This can cut through with very little shock to the structure of the cutting tool but requires a large deck space to contain the equipment. Abrasives cannot cut below the mudline, so the area must be dredged first, which requires further equipment and work.

ID cutters are a mechanical tool that can be lowered into the interior of a pipe and activated to cut from the inside out. These are the easiest way to cut the sections buried below the mudline but can be difficult to manage due to poor visibility within the pipe and can be hindered by obstructions.

Diamond wire saws can cut straight through the steel, concrete and aggregate that make up a conductor pipe and casings and can be easily controlled for effective cutting of larger wall sections. Diamond wire saws are also more environmentally friendly than other methods. However, they take up a lot of space, so are only usable if there is enough clearance on the outside of the structure. In addition, they cannot cut below the mudline, so the area must be dredged first, which requires further equipment and work. A diamond wire cutting machine consists of a continuous loop of diamond-encrusted wire mounted on a pulley system which is driven either hydraulically by a hydraulic power unit on board the deployment vessel, or subsea by a work class ROV. Depending on the number and type of cuts being made, a diamond wire may require regular replacement. This is an expensive and time-consuming operation, which is performed on the deck of the support vessel. For larger diameter, concrete coated pipelines, the diamond wire may need replacing after every cut, which would limit its applicability in a major cut and lift operation on a long-distance trunkline.

There are two main types of reciprocating cutting tools, the band saw and the guillotine which both use a serrated steel blade. The guillotine cutter uses a reciprocating mechanism to 'slice' down into the pipe with a back-and forth motion, while the band saw has a continuous flexible blade driven around a number of pulleys. Both tools are clamped to the pipe to perform the cut. The guillotine cutter can cut a maximum diameter of 32 inches and can be fully ROV controlled. Likewise, the band saw is either diver or ROV controlled, but tooling up to 48 inches cut diameter is available. For both tools, the speed of cutting and the life span of the blades are dependent on the materials being cut. Large diameter concrete coated pipe will be particularly slow to cut and will lead to the highest blade consumption. This makes these cutters a less attractive option for long-distance trunklines.

Hydraulic shears are traditionally used onshore or on the deck of an offshore platform. These are mounted on the boom of an excavator and dismantle facilities using the 'piece-small' method. Recently however, they have been used for subsea application. For subsea application, the shear is suspended from the vessel crane and placed in position for each cut. Although the tool has had limited use subsea, its simple operation could make it suitable for making multiple cuts along long pipelines without recovery to the deck for replacement of consumables, etc. One disadvantage of the hydraulic shear is that it does not produce a 'clean' cut, which may represent a hazard to personnel during handling and may make the handling of cut pipe sections themselves difficult.

Explosives can be lowered into the piles from the surface to the optimal place to sever the casings. Detonating is the fastest method of severing and is also the lowest costing option. However, there are obvious safety concerns and environmental issues.

Current technologies are therefore limited to certain uses which means that in order to perform a full site decommissioning, a variety of these technologies will be required.

It is an object of the present invention to mitigate the above-mentioned problems associated with existing technologies.

It is a further object of the invention to reduce the ancillary time required to perform site decommissioning.

It is a further object of the invention to reduce the amount and variety of equipment required to cut a variety of materials and objects.

According to the present invention there is provided a cutting apparatus comprising a cutting means drive arrangement characterised in that the cutting means drive arrangement is interchangeable.

Preferably, all, some or a part of the cutting means drive arrangement is interchangeable.

Preferably, all, some or a part of the cutting means drive arrangement is interchangeable, on site. Ideally, all, some or a part of the cutting means drive arrangement is interchangeable, on deck for example on the deck of an oil rig or other platform close to the site of the cut.

Preferably, the cutting apparatus is configurable to enable interchanging between different types of cutting means drive arrangements.

Preferably, the cutting means drive arrangement comprises a cutting means and a motive means for powering the cutting means.

Preferably, the motive means is a motor, engine or similar arrangement for causing physical or mechanical motion.

Preferably, the motive means is a cutting means motor.

Preferably, the cutting means motor is configurable to power movement and/or rotation of the cutting means.

Ideally, the cutting means drive arrangement comprises a cutting means, a motor for powering the cutting means, mechanical fasteners, washers and/or flanges used for attaching the cutting means and/or the motor to each other, to one or more parts of the cutting apparatus and/or to one or more other parts of the cutting means drive arrangement.

Advantageously, this enables interchangeability between one or more types of cutting means and one or more motors required to power different types of cutting means and/or or to cut different types of objects. Therefore, this enables the same cutting apparatus to be used for a variety of different cuts thereby reducing costs. Further advantageously, this reduces the need for additional equipment thereby saving space. This is in comparison to an operation requiring different types of objects to be cut and therefore requiring multiple cutting apparatuses having different types of cutting means/blades and/or motors.

Preferably, the cutting apparatus comprises a cutting head.

Ideally, the cutting head comprises an interchangeable cutting means drive arrangement.

Preferably, one, some or all parts of the cutting means drive arrangement is releasably detachable to a mounting plate of the cutting head.

Preferably, the cutting means is rotatable.

Preferably, the cutting apparatus is configurable for subsea application.

Preferably, the cutting apparatus comprises at least one blade. Ideally, the at least one blade is rotatable.

Preferably, the cutting means is a blade.

Alternatively, the cutting means may be any other suitable means.

Preferably, the cutting means is interchangeable.

Ideally, the cutting means is interchangeable with a different type of cutting means.

By different type, we mean a cutting means having different features and/or performing a different function of type of cut and/or is adaptable for us with a different type of motor and/or can cut a different object.

Ideally, the at least one blade is interchangeable.

Ideally, the at least one blade is interchangeable with a different type of blade.

By different type, we mean a blade having different features and/or performing a different function or type of cut and/or is adaptable for use with a different type of motor and/or can cut a different object.

Preferably, the cutting apparatus is configurable to enable interchanging between different types of cutting means and/or blades. Advantageously, the cutting means and/or blade can be changed as required, depending on the cut to be performed.

Preferably, the cutting apparatus comprises a plurality of interchangeable cutting means and/or blades.

Preferably, the at least one blade is configurable to cut one or more objects.

Preferably, the plurality of blades are configurable to cut one or more objects.

Ideally, different cutting means and/or blades are suitable to cut different objects and/or to perform different types of cuts.

Ideally, the configuration of the cutting head is interchangeable.

Ideally, the cutting apparatus comprises a plurality of interchangeable cutting head configurations. The terms cutting head configuration and configuration of the cutting head are used interchangeably throughout the specification. By cutting head configuration. we mean the arrangement of the parts of the cutting head such as the cutting means/blade, cutting means motor/blade motor, one or more mounting plates, mechanical fasteners, washers and/or flanges used for attaching the cutting means and/or cutting means motor to each other, to one or more parts of the cutting apparatus and/or to one or more other parts of the cutting head.

Preferably, the cutting apparatus comprises a cutting head attachment means configurable for releasably attaching the cutting head and/or the cutting means drive arrangement to one or more other parts of the cutting apparatus.

Advantageously, the cutting head configuration may be interchanged depending on the type of cut that is required. By the type of cut we mean depending on the type of object to be cut or the size, shape, weight, material or location of the object to be cut and/or on the speed and/or torque required to cut the object. Further advantageously, this allows a single cutting apparatus to be used with a number of different cutting head configurations.

Preferably, the cutting apparatus comprises a drive means for driving the cutting head attachment means and/or the cutting head.

Preferably, the cutting means drive arrangement is driven via the cutting head attachment means and/or the cutting head.

Ideally, the cutting head comprises the at least one cutting means and/or blade.

Preferably, the cutting head comprises the at least one cutting means and/or blade which is interchangeable.

Preferably, the at least one cutting means and/or blade is releasably secured to the cutting head and/or to a mounting plate of the cutting head.

Ideally, the at least one cutting means and/or blade is configurable to be removed from the cutting head/mounting plate on which it is secured for changing between blades.

Preferably, only one blade is attached to the cutting head/mounting plate at any one time.

Preferably, the cutting means drive arrangement comprises only one cutting means or blade at any one time.

Preferably, the at least one blade is a circular blade.

Preferably, the at least one blade is configurable to prevent the formation of sparks or heat during cutting.

Preferably, the at least one blade comprises interchangeable tips.

Advantageously, the blade tips can be changed as required, depending on the cut and/or wear of the tips. This thereby reduces ancillary time before, during and after a cut. This is in comparison to the cutting apparatus and blades needing to be changed entirely during or between cuts.

Preferably, the at least one blade is a steel cutting blade.

Preferably, the at least one blade is an interchangeable steel cutting blade.

Ideally, the cutting apparatus comprises at least one custom blade.

Preferably, the at least one blade is a custom blade.

Preferably, the cutting apparatus comprises a tungsten carbide tipped blade.

Preferably, the at least one blade is a tungsten carbide tipped blade.

Preferably, the at least one tungsten carbide tipped blade is configurable to prevent the formation of sparks or heat during cutting.

Preferably, the cutting apparatus comprises an interchangeable tungsten carbide tipped blade.

Preferably, the cutting apparatus comprises a vacuum brazed diamond blade.

Preferably, the at least one blade is a vacuum brazed diamond blade or a segmented diamond blade.

Preferably, the cutting apparatus comprises an interchangeable vacuum brazed diamond blade or an interchangeable segmented diamond blade.

Preferably, the cutting apparatus and/or cutting head comprises a blade motor and/or cutting means motor for powering motion of the at least one blade and/or cutting means.

Preferably, the cutting means drive arrangement comprises a blade motor for powering motion of the at least one blade.

Preferably, the blade motor comprises a blade motor output shaft.

Preferably, the blade motor comprises a spindle for rotating the at least one blade.

Preferably, the spindle is configurable to receive the blade motor output shaft.

Preferably, the blade motor output shaft is releasably attachable to the spindle.

Preferably, the blade motor output shaft is configurable to slide into the spindle.

Preferably, the at least one blade comprises an aperture for receiving the spindle.

Additionally, or alternatively, the at least one blade is releasably secured to the cutting head/mounting plate via one or more mechanical fasteners such as screws, bolts and/or any other suitable means.

Additionally, or alternatively, the at least one blade is releasably secured to the spindle via a washer and/or one or more mechanical fasteners such as screws, bolts and/or any other suitable means.

Preferably, the blade motor is offset from the central axis of the at least one blade.

Advantageously, this provides more clearance for making cuts with the blade. Thereby, this increases the ability of the cutting apparatus to cut straight through a pipe or other objects having a larger diameter without needing to stop or reposition the cutting apparatus because the blade motor is too close to the object being cut.

Preferably, the cutting apparatus comprises an offsetting means to enable the blade motor to be offset relative to the central axis of the at least one blade.

Ideally, the cutting apparatus comprises an offsetting means to enable the blade motor to be offset relative to the central axis of the at least one blade such as a gearbox or chain drive.

Preferably, the cutting means drive motor is interchangeable.

Preferably, the cutting means drive motor is interchangeable with one or more different types of cutting means drive motor. By different types, we mean different types of cutting means drive motor comprising different features and/or being configurable to perform a different function or different type of cut and/or to power a different type of cutting means.

Ideally, the cutting apparatus comprises a plurality of interchangeable blade motors.

Advantageously, the motor can be changed as required to perform different cuts.

Preferably, the at least one blade motor is interchangeable with one or more different types of blade motors By different types, we mean another blade motor comprising different features and/or being configurable to perform a different function or different type of cut and/or to power a different type of blade.

Preferably, the cutting apparatus comprises a low speed, high torque motor.

Preferably, the cutting apparatus comprises a low speed, high torque motor to enable the cutting apparatus to perform a low speed, high torque cut.

Preferably, the cutting apparatus is configurable to perform a low speed, high torque cut.

Preferably, the cutting apparatus and/or cutting means drive arrangement comprises a low speed, high torque configuration.

Ideally, the cutting apparatus comprises a low speed, high torque cutting means drive arrangement.

Ideally, the cutting apparatus comprises a low speed, high torque cutting means drive arrangement to enable the cutting apparatus to perform a low speed, high torque cut.

Preferably, the low speed, high torque cutting means drive arrangement comprises a low speed, high torque motor.

Preferably, the cutting apparatus comprises a high speed, low torque motor.

Preferably, the cutting apparatus comprises a high speed, low torque motor to enable the cutting apparatus to perform a high speed, low torque cut.

Preferably, the cutting apparatus is configurable to perform a high speed, low torque cut.

Preferably, the cutting apparatus and/or cutting means drive arrangement comprises a high speed, low torque configuration.

Preferably, the cutting apparatus comprises a high speed, low torque cutting means drive arrangement.

Preferably, the cutting apparatus comprises a high speed, low torque cutting means drive arrangement to enable the cutting apparatus to perform a high speed, low torque cut.

Advantageously, the interchangeability of the cutting means drive arrangement, means that the configuration may be interchanged depending on the type of cut that is required. By the type of cut we mean depending on the type of object to be cut or the size, shape, weight, material or location of the object to be cut and/or on the speed and/or torque required to cut the object. Further advantageously, this allows a single cutting apparatus to be used with a number of cutting means drive arrangements.

Preferably, the high speed, low torque cutting means drive arrangement comprises a high speed, low torque motor.

Preferably, the high speed, low torque motor and the low speed, high torque motor are configurable to be interchanged with respect to one another.

Preferably, the cutting apparatus is configurable to enable interchanging between the high speed, low torque motor and the low speed, high torque motor.

Ideally, the cutting apparatus is configurable to enable interchanging between the high speed, low torque configuration and the low speed, high torque configuration.

Preferably, the cutting apparatus comprises a high speed, low torque cutting means.

Advantageously, this enables the cutting apparatus to perform a high speed, low torque cut.

Preferably, the cutting apparatus comprises a low speed, high torque cutting means.

Advantageously, this enables the cutting apparatus to perform a low speed, high torque cut.

Preferably, the high speed, low torque cutting means drive arrangement comprises a high speed, low torque cutting means.

Preferably, the low speed, high torque cutting means drive arrangement comprises a low speed, high torque cutting means.

Preferably, the blade motor is configurable to be mounted to the mounting plate of the cutting head.

Preferably, only one blade motor is secured to the cutting head/mounting plate at any one time.

Preferably, the cutting means drive arrangement comprises only one blade motor at any one time.

Ideally, the blade motor is secured on a front surface of the mounting plate of the cutting head.

Preferably, the mounting plate comprises an aperture through which the motor spindle extends.

Ideally, the at least one blade is supported on the spindle of the blade motor extending through the mounting plate of the cutting head.

By cutting head we mean the collective assembly of the at least one blade, at least one blade motor, the mounting plate, any mechanical fasteners, washers and/or flanges used for attaching the at least one blade, at least one blade motor and the mounting plate to each other.

Advantageously, as the cutting head attachment means and/or the cutting head is driven towards an object to be cut via the drive means, so too is the blade.

Preferably, the mounting plate of the cutting head is releasably attached to the cutting head attachment means via mechanical fasteners and/or via any other means suitable for attaching the mounting plate to the cutting head attachment means.

Preferably, the cutting apparatus comprises a drive means for driving the cutting head attachment means and/or the cutting head towards and/or away from an object to be cut.

Preferably, the drive means comprises a drive member for applying drive force to the cutting head attachment means and/or to the cutting head.

Preferably, the drive means is configurable to prevent or reduce vibration during operation of the cutting apparatus.

Preferably, the drive means is configurable to prevent or reduce vibration of the cutting head attachment means, cutting head, cutting means drive arrangement and/or of the at least one blade.

Ideally, the drive means comprises at least two drive members.

Advantageously, this enables more drive force to be applied to the cutting head attachment means and/or the cutting head and/or the cutting means drive arrangement. This is in comparison to one drive member.

Preferably, the drive means is coupled to the cutting head attachment means and/or to the cutting head.

Ideally, the drive member is coupled to the cutting head attachment means and/or to the cutting head.

Preferably, the at least two drive members are coupled to the cutting head attachment means and/or to the cutting head.

Preferably, the at least two drive members are disposed laterally of the cutting head attachment means and/or cutting head.

By disposed laterally we mean outside the cutting zone of the cutting head.

Preferably, the at least two drive members are disposed laterally of the cutting head attachment means and/or cutting head for applying an equal force to both sides of the cutting head attachment means and/or cutting head.

Preferably, the at least two drive members are disposed laterally of the cutting head attachment means and/or cutting head to ensure uniform distribution of force is applied from the cutting head attachment means and/or cutting head to the object to be cut.

Advantageously, this reduces uneven vibration between the cutting head attachment means and/or cutting head and the object to be cut.

Preferably, the at least two drive members are mutually opposing relative to one another.

Preferably, the at least two drive members are disposed adjacent to mutually opposing lateral portions of the cutting head attachment means and/or cutting head.

Preferably, the at least two drive members are driven by a single drive means.

Advantageously, this increases synchronization between the at least two drive members. Further advantageously, this reduces vibration of the cutting head attachment means and/or cutting head. This is enabled by both embodiments of the drive means because both embodiments enable synchronised rotation of the output shafts. This is in comparison to each drive member being driven by its own corresponding drive means.

Preferably, the drive means is a linear drive means.

Preferably, the drive means comprises a drive motor.

Preferably, the drive means comprises a linear drive motor.

Preferably, the drive motor is a linear drive hydraulic motor.

Preferably, the drive means comprises an output shaft.

Ideally, the drive motor rotates the output shaft.

Ideally, the drive motor rotates the output shaft directly or indirectly.

Preferably, the cutting apparatus and/or drive motor comprises a three-way gearbox.

Preferably, the three-way gearbox is configurable to receive power from the drive motor.

Preferably, the three-way gearbox comprises a single input shaft and two output shafts.

Preferably, the single input shaft is connected to the two output shafts.

Ideally, input shaft is connected to the output shafts via a bevel gear and/or any other suitable means.

Preferably, the three-way gearbox is configurable to provide a 1:1 gear ratio and/or speed ratio.

Alternatively, or additionally, the three-way gearbox is configurable to provide a positive and/or negative gear ratio and/or speed ratio.

Alternatively, the drive motor is a twin shaft motor. Preferably, the drive means enables linear motion of the cutting head attachment means.

Preferably, the drive means enables linear motion of the cutting means drive arrangement and/or cutting head.

Ideally, the drive means enables linear motion of the cutting means drive arrangement and/or cutting head via the cutting head attachment means.

Preferably, the drive means comprises a lead screw to enable linear motion of the cutting head attachment means.

Preferably, the drive means comprises a lead screw to enable linear motion of the cutting head attachment means and thereby of the cutting means drive arrangement.

Preferably, the drive means comprises a lead screw to enable linear motion of the cutting head.

Preferably, the drive member is a lead screw.

Ideally, the drive means comprises at least two lead screws.

Preferably, the at least two drive members are lead screws.

Preferably, each lead screw is coupled to a portion of the cutting head attachment means and/or cutting head via a threaded collar.

Ideally, the drive means comprises a twin output shaft.

Ideally, each output shaft couples to one of the lead screws.

Advantageously, having a twin output shaft enables synchronisation between the at least two lead screws.

Preferably, the drive means comprises one or more additional gearboxes.

Ideally, each output shaft couples to one of the lead screws via an additional gearbox.

Preferably, the one or more additional gear boxes comprises a bevel gear.

Ideally, the gear box is a bevel gearbox.

Ideally, the drive means comprises at least two bevel gearboxes.

Preferably, each gear box is configurable to rotate a corresponding lead screw.

Preferably, the cutting apparatus comprises a control means for controlling the speed of the drive means.

Preferably, the cutting apparatus comprises a control means for controlling the speed of the drive motor.

Ideally, the drive means comprises a control means for controlling the speed of the dove motor.

Ideally, the control means comprises a flow control valve for controlling the speed of the drive means and/or drive motor.

Preferably, the control means is configurable to enable speed adjustment of the drive means and/or drive motor.

Ideally, the flow control valve is configurable to enable speed adjustment of the drive means and/or drive motor.

Preferably, the cutting apparatus comprises travel limiter means to prevent the cutting head from travelling beyond a pre-set distance.

Preferably, the travel limiter means comprises position detectors for detecting the position of the cutting head attachment means relative to one or more other elements of a cutting apparatus and/or relative to a start position of the cutting head attachment means.

Alternatively, or additionally, the cutting apparatus comprises any other type of detector for detecting the position and/or travel distance of the cutting head attachment means relative to one or more other elements of a cutting apparatus and/or relative to a start position of the cutting head attachment means.

Ideally, the travel limiter means is configurable to detect when the cutting head attachment means has travelled a pre-set distance and/or has reached a pre-set position.

Preferably, the travel limiter means is configurable to reduce, stop and/or reverse flow to the drive motor upon detection of the cutting head attachment means travelling a pre-set distance and/or reaching a pre-set position.

Advantageously, this prevents damage to the saw's structure which may arise due to continued driving of the cutting head past a pre-set position.

Ideally, the cutting apparatus comprises electrical and/or hydraulic travel limiter means.

Preferably, the cutting apparatus comprises a main frame for supporting one or more elements of the cutting apparatus such as the drive means.

Preferably, the cutting apparatus comprises two spaced apart structural support members for defining the structure of the cutting apparatus.

Preferably, the two spaced apart structural support members are mutually opposing.

Ideally, the two spaced apart support members are coupled via a structural spacer means.

Preferably, the longitudinal axis of the two spaced apart structural support members are parallel.

Preferably, the two spaced apart structural support members are in a parallel arrangement defining a gap between the structural support members.

Preferably, the cutting apparatus comprises a front plate and a back plate.

Ideally, the main frame comprises a front plate and a back plate.

Preferably, the two spaced apart structural support members are a front plate and a back plate.

Preferably, the front plate and back plate are mutually opposing relative to one another.

Preferably, the front plate and the back plate are spaced apart relative to each other.

Preferably, the front plate and the back plate are mechanically coupled to one another.

Preferably, the cutting apparatus comprises an object engaging portion and non-object engaging portion.

Preferably, the cutting apparatus comprises an object engaging end and a non-object engaging end.

Preferably, the main frame comprises an object engaging portion and non-object engaging portion.

Ideally, the main frame comprises an object engaging end and a non-object engaging end.

Preferably, the two spaced apart structural support members comprise an object engaging portion and non-object engaging portion.

Preferably, the two spaced apart structural support members comprise an object engaging end and a non-object engaging end.

Preferably, the front plate and back plate comprise an object engaging end and a non-object engaging end.

Preferably, the object engaging end is locatable at or about an end of the object engaging portion.

Preferably, the non-object engaging end is locatable at or about the non-object engaging portion.

Preferably, in use, the cutting head attachment means and/or the cutting head travels towards an object to be cut in a direction from the non-object engaging end of the cutting apparatus towards the object engaging end of the cutting apparatus.

Preferably, in use, the linear motion of the cutting head attachment means, cutting head and/or cutting means drive arrangement towards an object to be cut is in a direction from the non-object engaging end of the cutting apparatus towards the object engaging end of the cutting apparatus.

Preferably, in use, the linear motion of the cutting head attachment means, cutting head and/or cutting means drive arrangement away from an object to be cut is in a direction from the object engaging end of the cutting apparatus towards the non-object engaging end of the cutting apparatus.

Ideally, in use, the cutting head attachment means and/or the cutting head travels away from an object to be cut in a direction from the object engaging end of the cutting apparatus towards the non-object engaging end of the cutting apparatus.

Preferably, at least part of the cutting head and/or cutting means drive arrangement is disposed between the two spaced apart structural support members.

Ideally, at least part of the at least one cutting means and/or blade is disposed between the two spaced apart structural support members.

Preferably, at least part of the cutting head and/or cutting means drive arrangement is disposed in the gap between the two spaced apart structural support members.

Ideally, at least part of the at least one cutting means and/or blade is disposed in the gap between the two spaced apart structural support members.

Preferably, at least part of the cutting head and/or cutting means drive arrangement is disposed between the front plate and the black plate of the main frame.

Ideally, at least part of the at least one cutting means and/or blade is disposed between the front plate and the back plate of the main frame.

Preferably, at least part of the cutting head and/or cutting means drive arrangement is slidable between the two spaced apart structural support members and out through the object engaging end for releasable detachment thereof.

Ideally, at least part of the interchangeable cutting means and/or blade is slidable between the two spaced apart structural support members and out through the object engaging end for releasable detachment thereof.

Preferably, at least part of the cutting head and/or cutting means drive arrangement is parallel with the two spaced apart structural support members.

Ideally, at least part of the at least one cutting means and/or blade is parallel with the two spaced apart structural support members.

Preferably, the cutting apparatus comprises a clamping means to releasably clamp an object to be cut.

Preferably, the clamping means comprises one or more clamping jaws.

Ideally, the clamping means comprises a plurality of clamping jaws.

Preferably, the plurality of clamping jaws are interchangeable.

Preferably, the plurality of clamping jaws are interchangeable with one or more different types of clamping jaws.

Advantageously, the clamping jaws can be changed as required, depending on the size, weight, material and location of the object to be clamped. Further advantageously, this enables use of custom clamping jaws required for specific cuts. Preferably, the one or more clamping jaws are configurable to move towards, around and/or away from an object to be clamped.

Preferably, the clamping means comprises a left clamping arm and a right clamping arm.

Preferably, the left clamping arm and the right clamping arm are configurable to move towards, around and/or away from an object to be clamped.

Preferably, the left clamping arm and the right clamping arm are releasably attachable to the main frame of the cutting apparatus.

Ideally, the left clamping arm and the right clamping arm are pivotally attached to the main frame of the cutting apparatus.

Preferably, the left clamping arm and the right clamping arm are pivotally attached at or about the object engaging portion of the main frame. Preferably, the left clamping arm and the right clamping arm are pivotally attached at or about the object engaging end of the main frame.

Preferably, the left clamping arm is pivotally attached to one or both of the structural support members.

Preferably, the right clamping arm is pivotally attached to one or both of the structural support members.

Preferably, the left clamping arm is pivotally attached to the front and/or back plate of the main frame.

Preferably, the right clamping arm is pivotally attached to the front and/or back plate of the main frame.

Preferably, the left clamping arm and right clamping arm are mutually opposing.

Preferably, the left clamping arm and the right clamping arm are configurable to support at least one clamping jaw each.

Preferably, the one or more clamping jaws are configurable to releasably attach to the clamping arms via mechanical fasteners such as bolts.

Preferably, the one or more clamping jaws are releasably attachable to a clamping arm of via one or more shearable bolts/shear bolts.

Ideally, the one or more shearable bolts are configurable to snap upon application of excessive force or tension.

Advantageously, this prevents transmission of any tensile load onto the cutting means or any part of the clamping means, thereby, this prevents damage to the cutting means or any part of the clamping means.

Preferably, the one or more clamping jaws are further attached to the clamping arm via a second attachment means to prevent loss of the one or more clamping jaws upon snapping of the one or more shearable bolts.

Preferably, the secondary attachment means is configurable to provide a sling for the one or more clamping jaws upon snapping of the one or more shearable bolts to prevent loss of the clamping jaws.

Ideally, the second attachment means is a non-load bearing attachment means.

Preferably, the second attachments means comprises a shackle attached to the clamping jaw, a shackle attached to the clamping arm and a wire rope attached at one end to the clamping jaw shackle and at another end to the clamping arm shackle. Alternatively, the secondary attachment means may be formed from any suitable materials. Further, the rope may be attached to the clamping jaw or the clamping arm in any other suitable way and the rope may be formed of any suitable material.

Preferably, the wire rope is configurable to sling the one or more clamping jaws back to the clamping arm upon snapping of the one or more shearable bolts.

Alternatively, the one or more clamping jaws are attached to a jaw pivot assembly via one or more shearable bolts which is in turn attached to a clamping arm.

Preferably, each clamping jaw is configurable to releasably attach to only one of the clamping arms at any one time.

Preferably, the cutting apparatus comprises a left primary pivot and a right primary pivot around which the left clamping arm and the right clamping arm pivot respectively.

Advantageously, this enables movement of the one or more camping jaws around and/or away from an object to be clamped when the one or more clamping jaws are supported on the left clamping arm and/or right clamping arm.

Preferably, the left primary pivot and the right primary pivot extend between the two spaced apart structural support members at or about the object engaging portion.

Preferably, the left primary pivot and the right primary pivot extend perpendicular to the two spaced apart structural support members.

Preferably, the left clamping arm and the right clamping arm are configurable to move parallel to the plane of the two spaced apart structural support members.

Ideally, the one or more clamping jaws are configurable to move parallel to the plane of the two spaced apart structural support members.

Preferably, the left clamping arm and the right clamping arm are configurable to move parallel to the plane of direction of the cutting head.

Preferably, the left clamping arm and the right clamping arm are configurable to move parallel to the plane of direction of the at least one blade.

Ideally, the one or more clamping jaws are configurable to move parallel to the plane of direction of the cutting head.

Ideally, the one or more clamping jaws are configurable to move parallel to the plane of direction of the cutting means and/or at least one blade.

Preferably, the cutting apparatus comprises a left secondary pivot and a right secondary pivot around which the one or more clamping jaws can pivot, when supported on the left clamping arm or right clamping arm, respectively.

Advantageously, this enables further pivoting of the of the one or more clamping jaws around and/or away from an object to be clamped and can thereby accommodate a wider variety of different sized objects. Further advantageously, this enables further pivoting away from the main frame of the cutting apparatus which eases the process of changing the at least one blade and/or cutting head. This is in comparison to if the cutting apparatus only had the left and right main pivots.

Preferably, the pivot axis of the left and right primary pivots are parallel to the pivot axis of the left and right secondary pivots.

Preferably, the one or more clamping jaws are locatable mutually opposing to one or more other clamping jaws.

Ideally, the one or more clamping jaws supported on the left clamping arm mutually oppose the one or more clamping jaws supported on the right clamping arm and vice versa.

Preferably, the one or more clamping jaws are arrangeable such that in use the one or more clamping jaws interlock around the object to be cut.

Preferably, the one or more clamping jaws are arrangeable such that in a clamping position the one or more clamping jaws interlock around the object to be cut.

Preferably, the one or more clamping jaws are arrangeable such that in a clamping position the one or more clamping jaws are staggered with respect to one another.

Preferably, the one or more clamping jaws are arrangeable such that the one or more clamping jaws supported on the left clamping arm interlock with the one or more other jaws supported on the right clamping arm.

Preferably, the one or more clamping jaws are arrangeable such that the one or more clamping jaws supported on the left clamping arm are staggered in relation to the one or more other jaws supported on the night clamping arm.

Preferably, the one or more clamping jaws are arrangeable such that in use, the one or more clamping jaws supported on the left clamping arm and the one or more clamping jaws supported on the night clamping arm do not abut each other.

Preferably, the one or more clamping jaws are arrangeable such that in a clamping position, the one or more clamping jaws supported on the left clamping arm and the one or more clamping jaws supported on the right clamping arm do not abut each other.

Advantageously, this prevents the opposing clamping jaws from abutting against one another. Thereby, this enables the cutting apparatus to clamp a wider variety of different sized objects. The smaller the diameter of the object to be clamped, the more interlocked the clamping jaws will be. This is in comparison to mutually opposing clamping jaws which would abut one another at the tips of the jaws when clamping an object below a certain threshold size.

Preferably, the cutting apparatus comprises an additional clamping apparatus.

Ideally, the clamping means comprises an additional clamping apparatus.

Preferably, the additional clamping apparatus comprises an upper clamping module and a lower clamping module.

Ideally, the clamping means comprises an upper clamping module and a lower clamping module.

Preferably, the additional clamping apparatus is releasably attachable to the main frame of the cutting apparatus.

Ideally, the additional clamping apparatus is releasably attachable to the non-object engaging end of the cutting apparatus.

Ideally, the additional clamping apparatus compose a main body having an upper portion and a lower portion.

Preferably, the upper clamping module is locatable on the upper portion of the additional clamping apparatus.

Preferably, the lower clamping module is locatable on the lower clamping portion.

Preferably the upper clamping module and the lower clamping module extends from the main body of the additional camping apparatus.

Preferably, the additional clamping apparatus is configurable to releasably attach to the cutting apparatus at a substantially central portion of the main body of the additional clamping apparatus.

Preferably, the additional clamping apparatus is configurable to releasably attach to the cutting apparatus such that the upper clamping module extends above one of the structural support members of the cutting apparatus and such that the lower clamping module extends below the other of the structural support members.

Preferably, the plane of the upper clamping module is parallel with the two structural support members.

Preferably, the plane of the lower clamping module is parallel with the structural support members.

Preferably, the additional clamping apparatus comprises one or more clamping jaws Preferably, the upper clamping module comprises a left clamping jaw and a right clamping jaw.

Preferably, the lower clamping module comprises a left clamping jaw and a right clamping jaw.

Preferably, the one or more clamping jaws and the one or more clamping module clamping jaws may be used interchangeably.

Preferably, the upper clamping module is configurable to clamp an object above the cut line.

Preferably, the lower clamping module is configurable to clamp an object below the cut line.

By cut line, we mean the planar portion of the object that will be cut.

Preferably, the upper module clamping jaws and the lower module clamping jaws are configurable to clamp an object above and below the cut line, respectively.

Alternatively, one or both of the left clamping arm and the right clamping arm of the clamping means comprises one or more upper clamping jaws and one or both of the left clamping arm and the right clamping arm comprises one or more lower clamping jaws.

Preferably, the one or more upper clamping jaws are configurable to clamp an object above the cut line.

Ideally, the one or more lower clamping jaws are configurable to clamp an object below the cut line.

Advantageously, this creates a tension free zone between the upper clamping module/upper clamping jaws and the lower clamping module/lower clamping jaws. This prevents the already cut portion of the object clamping on the at least one blade as it passes through. Further advantageously, this enables accurate cutting of objects which may move or sway during cutting such as mooring chain. This is in comparison to a cutting apparatus having clamping jaws above the cut line only or below the cut line only.

Preferably, the one or more clamping module clamping jaws are interchangeable.

Preferably, the clamping module left clamping jaws are arrangeable to mutually oppose the clamping module right clamping jaws.

Preferably, the one or more clamping jaws are configurable to releasably attach to the upper clamping module and/or lower clamping module via mechanical fasteners such as bolts and/or shearable bolts and/or any other suitable means.

Preferably, each clamping jaw is configurable to releasably attach to only one of the clamping modules at any one time.

Preferably, the one or more clamping module clamping jaws are configurable to releasably attach to the additional clamping apparatus.

Preferably, the one or more clamping module clamping jaws comprise an arcuate portion configurable to clamp mooring chain.

Ideally, the clamping module left clamping jaw and the clamping module right clamping jaw comprise mutually opposing arcuate portions to clamp opposing portions of mooring chain.

Preferably, the one or more clamping module clamping jaws are arrangeable such that in use the one or more clamping module clamping jaws interlock with one another.

Preferably, the one or more clamping module clamping jaws are arrangeable such that in a clamping position the one or more clamping module clamping jaws interlock with one another.

Preferably, the one or more clamping module clamping jaws are arrangeable such that in a clamping position the one or more clamping module clamping jaws are staggered relative to one another.

Preferably, the one or more clamping module clamping jaws are arrangeable such that the one or more clamping module left clamping jaws interlock with the one or more clamping module right clamping jaws.

Preferably, the one or more clamping module clamping jaws are arrangeable such that in use, the one or more clamping module left clamping jaws and the one or more clamping module night clamping jaws do not abut each other.

Preferably, the one or more clamping module clamping jaws are arrangeable such that in a clamping position, the one or more clamping module left clamping jaws and the one or more clamping module right clamping jaws do not abut each other.

Preferably, the clamping means comprises clamp adjustment means to adjust the shape and/or size of the one or more clamping jaws.

Advantageously, this enables a wider variety of objects to be clamped.

Preferably, the clamp adjustment means is removably detachable from the one or more clamping jaws and/or clamping module clamping jaws.

Ideally, the clamp adjustment means is interchangeable.

Advantageously, this enables clamp adjustments means of different sizes and/or shape to be interchanged depending on the requirement. Further advantageously, this enables the use of custom clamp adjustment means.

Preferably, the clamp adjustment means are configurable to releasably attach to the one or more clamping jaws and/or clamping module clamping jaws via mechanical fasteners such as bolts.

Ideally, the clamp adjustment means are shaped and/or sized to correspond to the specific object to be clamped.

Ideally, the clamp adjustment means is releasably attachable to mutually opposing clamping jaws and/or clamping module clamping jaws.

Preferably, in one embodiment, the clamp adjustment means comprises an arcuate portion configurable to clamp a mooring chain.

Ideally, the clamp adjustment means is releasably attachable to mutually opposing clamping jaws and/or clamping module clamping jaws to clamp mutually opposing portions of a mooring chain.

Preferably, the left clamping arm and right clamping arm are configurable to operate independent of one another.

By operate we mean move towards, away from and/or around an object to be clamped.

Preferably, the one or more clamping jaws are configurable to operate simultaneously and/or independent from one another.

Preferably, the one or more upper module clamping jaws and the one or more lower module clamping jaws are configurable to operate simultaneously and/or independently from one another.

Advantageously, this enables increases the ease of handling objects before, after and/or during cutting.

Preferably, the one or more upper module clamping jaws and the one or more lower module clamping jaws are operably coupled to a hydraulic circuit.

Advantageously, this reduces the need for additional spool valves.

Preferably, the one or more clamping module left clamping jaws and the one or more clamping module right clamping jaws are configurable to operate simultaneously and/or independently from one another.

Advantageously, this enables better control over clamping and/or dropping an object that is already clamped.

Preferably, the clamping means is hydraulically, electrically and/or pneumatically operated and/or is operated via any other suitable means.

Preferably, the one or more upper clamps and/or the one or more upper clamping module are on a separate circuit to the one or more lower clamps and/or the lower clamping module.

Preferably, the cutting apparatus comprises one or more actuators configurable to operate the clamping means, the one or more clamping arms, the one or more clamping jaws, the one or more clamping modules and/or the additional clamping apparatus. Advantageously, this enables independent operation of the upper clamps/upper clamping module and the lower clamps/lower clamping module. Preferably, each actuator is configurable to operate independently from the one or more other actuators.

Preferably, the cutting apparatus comprises a clamp control means to control the clamping means.

Preferably, in one embodiment, the one or more actuators are hydraulic actuators such as hydraulic cylinders.

Preferably, the cutting apparatus comprises hydraulic cylinder pins.

Preferably, the cutting apparatus comprises a clamp pressure control means to control the clamping force of the clamping means.

Ideally, the cutting apparatus comprises a pressure release valve to control clamp pressure of the clamping means.

Preferably, the clamping force is pre-set during a pre-cut setup test.

Preferably, the cutting apparatus comprises a remote pressure control valve configurable to control clamp pressure of the clamping means remotely, if necessary.

Ideally, the clamp pressure control means comprises a pressure release valve to control clamp pressure of the clamping means.

Preferably, the pressure release valve is configurable to detect the pressure level of the clamping means.

Ideally, the pressure release valve is configurable to open in response to the pressure of the clamping means reaching and/or exceeding a pre-set pressure threshold.

Ideally, the pressure release valve is configurable to reduce clamping pressure in response to the pressure of the clamping means reaching and/or exceeding a pre-set pressure threshold.

Preferably, the pressure release valve is configurable to divert flow away from the clamping means in response to the pressure of the clamping means reaching and/or exceeding a pre-set pressure threshold.

Advantageously, this prevents a build-up of pressure of the clamping means.

Preferably, the pressure release valve is configurable to close and/or remain closed when the pressure of the clamping means is below a pre-set pressure threshold.

Ideally, the pressure release valve is configurable to reduce clamping pressure from 210 bar (3045 psi/21000 kPa) to 10 bar (145 psi/1000 kPa).

Ideally, in another embodiment, the one or more actuators are electrical actuators.

Preferably, the one or more clamping jaws can be formed from one or more materials such as steel, aluminium, polyether ether ketone (PEEK) and/or nylon and/or any other suitable material required for specific applications.

Preferably, the clamping means comprises locking pins to prevent undesired pivoting in one or more directions of the one or more parts of the clamping means such as the clamping arms and/or clamping jaws.

Preferably, the cutting apparatus comprises an abutment portion upon which an object being clamped by the one or more clamping jaws abuts against.

Preferably, the clamping means comprises an abutment portion upon which an object being clamped by the one or more clamping jaws abuts against.

Preferably, the abutment portion is locatable on one or both of the structural support members.

Preferably, the abutment portion is locatable on the front plate and/or on the back plate of the cutting apparatus.

Ideally, the abutment portion comprises a plurality of abutment surfaces.

Ideally, at least one abutment surface is locatable on the one of the spaced apart structural support members and at least one abutment surface is locatable on the other of the spaced apart structural support members.

Ideally, at least one abutment surface is locatable on the front plate of the cutting apparatus.

Ideally, at least one abutment surface is locatable on the back plate of the cutting apparatus.

Preferably, the clamping means is configurable to clamp an object adjacent to the object engaging end of the cutting apparatus.

Preferably, the abutment portion is locatable on the object engaging end of the cutting apparatus.

Preferably, the left clamping arm is locatable on one lateral side of the cutting apparatus.

Preferably, the right clamping arm is locatable on another lateral side of the cutting apparatus. By another, we mean on a side other than the side the left clamping arm is located.

Ideally, the left clamping arm and the right clamping arm are locatable on opposing lateral sides of the cutting apparatus.

Preferably, the one or more actuators of the clamping means are locatable on a lateral side of the cutting apparatus.

Ideally, two or more actuators of the clamping means are locatable on opposing lateral sides of the cutting apparatus relative to each other.

Preferably, the one or more actuators of the clamping means are configurable to extend from the non-object engaging portion of the cutting apparatus towards the clamping means on the lateral sides of the cutting apparatus, at or about the object engaging portion of the cutting apparatus.

Ideally, the one or more actuators of the clamping means are configurable to extend from the non-object engaging portion of the cutting apparatus towards the clamping means on the lateral sides of the cutting apparatus, at or about the object engaging portion of the cutting apparatus between the two spaced apart structural supports of the cutting apparatus.

Preferably, the abutment portion is tapered to a point.

Preferably, the abutment portion tapers to a central portion of the abutment portion.

Ideally, the abutment portion comprises one or more abutment surfaces which taper towards a central portion of the abutment portion.

Alternatively, the abutment portion is arcuate shaped to correspond to an arcuate object to be cut such as a pipe.

Preferably, the abutment portion is configurable to position an object uniformly in place such that the linear axis of travel of the at least one blade passes through the central axis of the object to be cut.

Preferably, the abutment portion is configurable to position an object uniformly in place such that the central axis of the at least one blade is in alignment with the central axis of the object to be cut.

Preferably, the abutment portion is configurable to position an object uniformly in place such that the linear axis of travel of the at least one blade is perpendicular to the central axis of the object to be cut.

Preferably, the abutment portion is configurable to position an object uniformly in place such that the leading edge of the at least one blade first intersects the object to be cut on a portion of the object that is parallel to the central axis of the object and the central axis of the at least one blade.

Advantageously, this prevents non-uniform forces being applied to the at least one blade.

Further advantageously, this prevents non-uniform resistance being applied to the at least one blade.

Preferably, all or part of the abutment portion is releasably attachable to the main frame of the cutting apparatus.

Preferably, the abutment portion comprises a releasably attachable Vee block assembly.

Advantageously, this means that a variety of different sized objects can be clamped. The larger the object or its diameter, the closer to the open end of the tapered abut portion it will abut against. The smaller the object or its diameter the closer to the closed tapered end of the abutment portion it will abut against. This is in comparison to the abutment portion being flat or arched.

Further advantageously, the releasable attachment of the abutment portion and/or Vee-block assembly improves the ease of removing all or some of the at least one blade and/or cutting head past the object engaging end of the cutting apparatus during changing.

Ideally, the releasably attachable Vee block assembly is attached to the abutment portion via mechanical fasteners and/or via any other means suitable.

Preferably, the clamping means is configurable to clamp an object between the one or more clamping jaws and the abutment portion.

Preferably, the cutting head comprises an abutment portion shaped and sized to correspond to the clamping means abutment portion.

Ideally, the mounting plate of the cutting head comprises an abutment portion shaped and sized to correspond to the clamping means abutment portion.

Advantageously, this enables the mounting plate of the cutting head to move right up to and/or to contact the object to be cut. This thereby increases the distance over which the cutting head can travel towards the object to be cut. Thereby this also enables the at least one blade to cut further through the object to be cut. This further ensures correct positioning of the object to be cut relative to the at least one blade.

Preferably, the at least one blade is disposed between the two spaced apart structural support members.

Preferably, the at least one blade is configurable to move, between the two spaced apart structural support members, towards and/or away from an object to be cut.

Preferably, the at least one blade is configurable to move between the two spaced apart structural support members and through the object engaging end of the cutting apparatus towards and/or away from an object to be cut.

Preferably, the at least one blade is removable from the cutting apparatus and/or mounting plate of the cutting head and/or spindle by opening the clamping means, removing the at least one blade from the cutting head and/or spindle to which it is attached by removing any fastening means and sliding the at least one blade between the two spaced apart structural support members and out through the object engaging end.

By opening the clamping means we mean removing the locking pins, pivoting the clamping means outwards, away from the object engaging end of the cutting apparatus and towards the lateral edges of the cutting apparatus. For example, pivoting the right clamping arm, including any jaws and/or other attachments attached to the right clamping arm, as far to the right as is necessary/possible and pivoting the left clamping arm, including any jaws and/or other attachments attached to the left clamping arm, as far to the left as is necessary/possible.

Preferably, the at least one blade is attached to the cutting apparatus and/or mounting plate of the cutting head and/or spindle by opening the clamping means, sliding the at least one blade into the object engaging end and between the two spaced apart structural support members and attaching the blade to the mounting plate of the cutting head and/or spindle using fastening means if necessary.

Preferably, interchangeable blades are changed by removing the blade attached to the cutting apparatus and/or mounting plate of the cutting head and/or spindle and attaching a new/different blade to the cutting apparatus and/or mounting plate of the cutting head and/or spindle as previously described.

Preferably, the at least one blade motor and/or spindle assembly is removed from the cutting apparatus and/or mounting plate of the cutting head by removing/unfastening the fastening means attaching the blade motor and/or spindle assembly to the cutting apparatus and/or mounting plate of the cutting head.

Preferably, the at least one blade motor and/or spindle is attached to the cutting apparatus and/or mounting plate of the cutting head by securing the blade motor and/or spindle to the mounting plate of the cutting apparatus and/or cutting head using fastening means.

Preferably, interchangeable blade motors are changed by removing the blade motor and/or spindle assembly attached to the cutting apparatus, mounting plate of the cutting head and/or spindle (if this is not removed with the blade motor) and attaching a new blade motor to the cutting apparatus, mounting plate of the cutting head and/or spindle (if this is not integral to the blade motor).

Preferably, the cutting head can be removed from the cutting apparatus and/or cutting head attachment means by opening the clamping means, detaching the abutment portion and/or Vee-block assembly, removing the mechanical fasteners and/or any other means suitable for attaching the cutting head to the cutting head attachment means and sliding the cutting head, (including any other parts attached to the cutting head mounting plate such as a blade, blade motor and/or any mechanical fasteners, washers and/or flanges) between the two spaced apart structural support members and out through the object engaging end.

Preferably, the cutting head is attached to the cutting apparatus and/or cutting head attachment means by opening the clamping means, detaching the abutment portion and/or Vee-block assembly, sliding the cutting head into the object engaging end and between the two spaced apart structural support members and attaching the cutting head to the cutting apparatus and/or cutting head attachment means using fastening means if necessary and reattaching the abutment portion and/or Vee-block assembly.

Preferably, interchangeable cutting heads are changed by removing the cutting head attached to the cutting apparatus and/or cutting head attachment means and attaching a new/different cutting head to the cutting apparatus and/or cutting head attachment means as previously described.

Preferably, the cutting apparatus comprises a stalling means to prevent the at least one blade becoming stuck or damaged during use.

Preferably, the stalling means is configurable to stall the blade motor.

Preferably, the stalling means is configurable to prevent motion of the at least one blade.

Preferably, the stalling means is configurable to prevent rotation of the at least one blade.

Ideally, the stalling means is configurable to prevent advancement of the cutting head.

Preferably, the stalling means is configurable to stall the linear drive means and/or motor.

Ideally, the stalling means comprises one or more sensors.

Preferably, the stalling means comprises one or more pressure sensors configurable to measure the pressure in the drive motor and/or the blade motor and detect when this pressure exceeds a pre-set pressure threshold.

Ideally, the pressure sensors are configurable to send an output signal to alert a user to the pressure level.

Preferably, the pressure sensors are configurable to send an output signal to a corresponding flow control valve to trigger the flow control valve to reduce and/or shut off flow to the linear drive motor and/or blade motor.

Preferably, the stalling means comprises one or more torque sensors configurable to measure the torque on the drive motor and/or the blade motor and detect when this torque is within a pre-set parameter.

Ideally, the torque sensors are configurable to send an output signal to alert a user to the pressure level.

Preferably, the torque sensors are configurable to send an output signal to a corresponding flow control valve to trigger the flow control valve to reduce and/or shut off flow to the linear drive motor and/or blade motor.

Preferably, the stalling means is configurable to stall the linear drive means and/or linear drive motor based on the pressure from the blade motor.

Preferably, the stalling means comprises a valve, most preferably a pilot pressure control valve.

Ideally, the stalling means is configurable to stall the linear drive and/or linear motor upon pressure in the valve reaching a pre-determined threshold.

Preferably, pressure in the valve will increase as pressure from the blade motor increases and/or as torque increases.

Advantageously, this prevents continuous advancement of the cutting means and/or blade when the pressure in the valve and/or from the blade and/or torque exceed a pre-set pressure threshold. Preferably, the stalling means comprises one or more current sensors configurable to measure the current in the drive motor and/or the blade motor and detect when this current exceeds a pre-set threshold.

Ideally, the current sensors are configurable to send an output signal to alert a user to the current level.

Preferably, the current sensors are configurable to send an output signal to a corresponding flow control valve to trigger the flow control valve to reduce and/or shut off flow to the blade motor.

Preferably, the stalling means comprises any other type of sensor configurable to detect when the load on the drive motor and/or blade motor is higher than the output of the drive motor and/or blade motor respectively.

Advantageously, the stalling means is configurable to reduce and/or prevent rotation of the at least one blade which subsequently prevents further cutting of the at least one blade through the object being cut which subsequently prevents advancement of the cutting head attachment means and/or the cutting head. Further advantageously, the stalling means prevents rotation of the at least one blade before the blade, motors and/or structural components become snagged or stuck or damaged.

Preferably, the cutting apparatus comprises one or more blade guides which define a virtual plane for the leading edge portion of the at least one blade.

Preferably, the cutting apparatus comprises one or more blade guides which define a virtual plane for the leading edge portion of the blade through which the at least one blade is guided.

Advantageously, this prevents misalignments and or bending of the blade.

Preferably, the cutting apparatus comprises one or more blade guides which define a straight path through which the at least one blade is guided.

Ideally, the cutting apparatus comprises a plurality of blade guides.

Preferably, the one or more blade guides are locatable on the one or both of the structural support members.

Preferably, the one or more blade guides are locatable on mutually opposing surfaces of the two spaced apart structural support members.

Ideally, the one or more blade guides are mutually opposing relative to another of the one or more blade guides.

Preferably, the one or more blade guides are locatable on the front plate and/or back plate of the cutting apparatus.

Ideally, the one or more blade guides are locatable on a back surface of the front plate of the cutting apparatus and/or a front surface of the back plate of a cutting apparatus on either side of the flat surfaces of the at least one blade.

Ideally, the one or more blade guides extend from the back surface of the front plate of the cutting apparatus and/or the front surface of the back plate of a cutting apparatus.

Ideally, the one or more blade guides extend from the back surface of the front plate of the cutting apparatus and/or the front surface of the back plate of a cutting apparatus towards the other of the front surface of the back plate and/or the back surface of the front plate respectively.

Preferably, the plurality of blade guides are locatable on the back surface of the front plate of the cutting apparatus and/or the front surface of the back plate of a cutting apparatus at a position mutually opposing another blade guide locatable on the other of the front surface of the back plate and/or the back surface of the front plate respectively.

Preferably, the one or more blade guides comprise one or more nylon solid blocks.

Ideally, the one or more blade guides are configurable to support the blade close to where the blade contacts the object being cut.

Ideally, the one or more blade guides are configurable to minimise and/or prevent vibrations of the at least one blade.

Preferably, the cutting apparatus comprises one or more blade supports.

Preferably, the one or more blade supports comprise upper and lower steel supports with nylon inserts.

Ideally, the one or more blade supports are adjustable.

Ideally, the upper and lower steel supports with nylon inserts are adjustable.

Preferably, the one or more blade supports are adjustable so that they make contact with the upper and lower face of the blade.

Preferably, the one or more blade supports are locatable in different positions depending on the blade diameter and blade weight but are preferably locatable along the diameter of the blade.

Ideally, the one or more blade supports are configurable to further minimise vibration of the at least one blade.

Preferably, the cutting apparatus is suitable for above sea application.

Preferably, the cutting apparatus comprises a control panel to control one or more other elements of the cutting apparatus.

Ideally, the cutting apparatus comprises a remote-control panel to enable remote control from one or more other elements of the cutting apparatus.

Preferably, the cutting apparatus comprises a remote observation means to enable observation of one or more other elements of the cutting apparatus in operation from a distance in relation to one or more other elements of the cutting apparatus.

Preferably, the cutting apparatus comprises a remote optical observation means to enable observation of one or more other elements of the cutting apparatus in operation from a distance in relation to one or more other elements of the cutting apparatus.

Preferably, the remote observation means comprises one or more cameras which are releasably attachable to the main frame of the cutting apparatus.

Ideally, the remote observation means comprises one or more lights which are releasably attachable to the main frame of the cutting apparatus.

Preferably, the remote-control observation means comprises one or more screens locatable on the remote control-panel to enable visualisation of images and/or videos captured by the one or more cameras.

Preferably, the cutting apparatus comprises rotator blade indicators to indicate when the at least one blade is or is not rotating.

Ideally, the rotator blade indicators are locatable on the main frame of the cutting apparatus and/or on the remote-control panel.

Preferably, the rotator blade indicators comprise one or more sensors configurable to detect rotation of the at least one blade such as motion sensors and or any other type of sensor configurable to detect rotation of the at least one blade.

Preferably, the cutting apparatus is hydraulically, electrically and/or pneumatically powered and/or is powered via any other suitable means.

Preferably, the cutting apparatus comprises a slew assembly.

Advantageously, this enables rotation of the cutting apparatus and/or vertical alignment of the cutting apparatus and/or horizontal alignment of the cutting apparatus and/or alignment of the apparatus in any orientation between vertical and horizontal alignment.

Preferably, the cutting apparatus comprises one or more connection means for connecting the cutting apparatus to a remotely operated vehicle (ROV), a forklift truck, an excavator, a wheeled loader and/or a crane and/or any other machine with the lift capacity and the required hydraulic supply configurable for deployment of the cutting apparatus.

Preferably, the cutting apparatus comprises one or more electrical, hydraulic and/or pneumatic connection means for connecting the apparatus to a remote power source.

Preferably, the cutting apparatus is configurable to receive hydraulic power from one or more hydraulic power units or power packs.

Ideally, the cutting apparatus is configurable to receive hydraulic power from an excavator.

Preferably, the cutting apparatus is configurable to receive hydraulic power from a power pack and an excavator.

Preferably, the amount of speed and torque required will depend on the type of cut being made and/or on the material to be cut For example, the tougher the material to be cut, the more torque will be required.

Preferably, for a low speed, high torque cut, the cutting apparatus and/or blade motor is configurable to provide a torque output between 1,000 newton-metres and 10,000 newton-metres.

Preferably, the torque output provided by the cutting apparatus and/or blade motor is between 3,000 netwon-metres and 5,000 newton-metres.

Ideally, the maximum torque output of the cutting apparatus and/or blade motor is 10,000 newton-metres.

Ideally, for a low speed, high torque cut, the cutting apparatus and/or blade motor is configurable to provide a speed of 30-60 revolutions per minute (RPM).

Preferably, the cutting apparatus comprises and/or is configurable to receive power from a primary hydraulic power unit capable of delivering 100 Litre per minute flow at 210 bar at the blade/blade motor. Ideally, the cutting apparatus and/or power unit may comprise a diverter valve configurable to split the flow between the blade motor and the drive motor and/or any other drive means.

Preferably, for a high speed, low torque cut, the cutting apparatus and/or blade motor is configurable to provide a speed of up to 600 revolutions per minute (RPM).

Preferably, for a high speed, low torque cut, the cutting apparatus and/or blade motor is configurable to provide a torque output of approximately 1,000 newton-metres. Ideally, the torque output provided for a high speed, low torque cut will depend on the pressure being used and the displacement.

Ideally, the torque output provided for a high speed, low torque cut will depend on the pressure being used and the displacement of the cutting means and/or blade.

Preferably, the cutting apparatus comprises and/or is configurable to receive a dedicated supply of power for the blade motor only.

Preferably, the cutting apparatus comprises and/or is configurable to receive power from an additional hydraulic power unit capable of delivering a dedicated supply to the high-speed blade motor of 90-100 Litres per minute flow up to 350 bar (35000 kPa). By additional hydraulic power unit, we mean in addition to the primary hydraulic power unit. Ideally, in this embodiment. the additional hydraulic power unit will provide a dedicated supply to the blade motor and the primary hydraulic power unit will deliver supply to one or more of the other drive means required by other components of the cutting apparatus such as the linear drive means and/or clamping means.

Alternatively, the cutting apparatus may comprise or utilise one hydraulic power unit with two separate circuits.

Preferably, the cutting apparatus comprises a steel cutting blade and/or tungsten carbide tipped blade and/or any other suitable blade to perform a low speed, high torque cut.

Preferably, the cutting apparatus comprises a diamond blade and/or any other suitable blade to perform a high speed, low torque cut.

Preferably, the cutting apparatus comprises a floatation means to provide neutral buoyancy of the cutting apparatus.

Advantageously, this improves the ease of handling and/or positioning the cutting apparatus.

Ideally, the floatation means is releasably attachable to the main frame of the cutting apparatus.

Preferably, the floatation means is integral to one or more parts of the cutting apparatus, such as the main frame.

Alternatively, the floatation means is releasably attachable to one or more other parts of the cutting apparatus.

Advantageously, this enables the floatation means to be removed from the cutting apparatus, if required and/or to be moved to enable more clearance for the cutting apparatus at one or more portions and/or to enable the cutting apparatus to manoeuvre around obstacles. Further advantageously, this increases the compactness of the cutting apparatus for transport and storage.

Preferably, the floatation means comprises one or more buoyancy modules.

Preferably, the cutting apparatus is formable from one or more materials.

Alternatively, or additionally, the cutting apparatus comprises one or more apertures to reduce the weight of the cutting apparatus. For example, apertures may be formed in the main frame of the cutting apparatus.

Ideally, the cutting apparatus is formable from one or more materials to reduce the weight of the cutting apparatus and/or such that the cutting apparatus is lightweight.

Preferably, the cutting apparatus is formable from one or more materials to ensure buoyancy of the cutting apparatus.

Ideally, the cutting apparatus is formable such that, in use, the cutting apparatus has neutral buoyancy with the floatation means.

Preferably, the cutting apparatus is formable from one or more materials that will provide the cutting apparatus with a density that is substantially equal to the density of the fluid in which it is to be immersed such as sea water, when used with a floating means and when in the cutting apparatus is submersed in the fluid.

Preferably, the cutting apparatus is formable such that, in water, the weight of the cutting apparatus is less than 50 kg with the floatation means.

Advantageously, reducing the weight of the cutting apparatus increases the potential for interoperability of the cutting apparatus with other equipment such as ROVS.

Ideally, all or part of the cutting apparatus is formable from aluminium, mild steel, one or more plastics, carbon fibre and/or any other suitable materials.

Ideally, all or part of the cutting apparatus may be 3D printed.

Additionally, or alternatively, all or part of the cutting apparatus is formable from steel, stainless steel and/or any other suitable material.

Advantageously, this increases the durability of all or part of the cutting apparatus where required and/or reduces the cost of manufacture of the cutting apparatus.

Preferably, the blade motor comprises an associated gearbox.

Ideally, the gearbox is a low-profile gearbox.

Preferably, the height of the gearbox and/or blade motor can be reduced by up to 50%.

Advantageously, this reduces the height or depth of the cutting apparatus. Further advantageously, this increases the accessibility and/or manoeuvrability of the cutting apparatus.

Preferably, the cutting apparatus and/or one or more gearboxes of the cutting apparatus comprise a pressure compensator to equalise the internal pressure of the one or more gearboxes with the external pressure. Advantageously, this reduces or prevents stress on the gearbox housing.

Preferably, the cutting apparatus is configurable to cut a variety of materials including steel, concrete and inconol.

Preferably, the cutting apparatus is configurable to cut a variety of objects including pipes, blocks of material, mooring chain and umbilicals.

Preferably, the cutting apparatus is configurable to cut ferrous and non-ferrous materials and/or a range of profiles such as pipe, square section or solid bar.

Preferably, the high speed, low torque configuration is configurable to cut at least carbon steel, alloy steel, wire rope, nylon rope, flexible flow lines, umbilical lines and/or fibre optic cables.

Preferably, the clamping means is configurable to clamp an object having a diameter in the range of 1270 mm and 101.6 mm.

Preferably, the cutting head is configurable to support at least one blade having a diameter up to 2600 mm.

Preferably, the cutting apparatus is configurable to support at least one blade having a diameter of 304.8 mm (12 inches).

Preferably, the cutting apparatus is configurable to support at least one blade having a diameter of 609.6 mm (24 inches).

Preferably, the cutting apparatus is configurable to support at least one blade having a diameter of 914.4 mm (36 inches).

Preferably, the cutting apparatus is configurable to support at least one blade having a diameter of 1524 mm (60 inches).

Preferably, the cutting apparatus is configurable to an object having a diameter of 50.8-609 mm (2-24 inches).

Preferably, the torque of the blade motor is configurable to ensure a continuous cut without any loss in blade speed. Ideally, the blade speed is based on the blade type and blade diameter.

Preferably, the cutting apparatus comprises a lubrication means to enable lubrication of the at least one blade during cutting.

Preferably, the lubrication means comprises a fluid delivery means to deliver fluid to the at least one blade during cutting.

Preferably, statements relating to a blade also apply to any other suitable cutting means.

Preferably, statements relating to a blade motor also apply to any other suitable cutting means motor.

Ideally, statements relating to one of a motive means, motor or engine also apply to any other type of motive means, motor, engine or similar arrangement for causing physical or mechanical motion.

Preferably, the cutting apparatus comprises one or more double acting hydraulic cylinders with dual load hold valves.

Preferably, the cutting apparatus comprises and/or is configurable to receive a system pressure cutting means/ blade circuit of 80-190 Bar, a cutting means/blade circuit required flow of 50 L/Min, a pressure linear feed circuit of 10-80 Bar, a flow linear feed circuit of 25-50 L/Min, a system pressure clamp circuit of 40-120 Bar and/or a flow rate clamp circuit of 50 L/Min.

Preferably, the tungsten carbide tipped blade has a nominal peripheral speed of 125 M/Min.

According to a second aspect of the invention there is provided a cutting apparatus comprising at least one cutting head wherein the cutting head is interchangeable.

Advantageously, the cutting heads may be interchanged depending on the type of cut that is required. By the type of cut we mean depending on the type of object to be cut or the size. shape, weight, material or location of the object to be cut. Further advantageously, this allows a single cutting apparatus to be used with a number of different cutting heads.

Preferably, the cutting apparatus comprises a plurality of interchangeable cutting heads.

Preferably the cutting apparatus comprises a cutting head attachment means configurable for releasably attaching the plurality of interchangeable cutting head thereto.

Preferably, only one cutting head is attached to the cutting head attachment means at any one time. Alternatively, multiple cutting heads may be attached to the cutting head attachment means at any one time.

By cutting head we mean the collective assembly of the at least one blade, at least one blade motor, the mounting plate, any mechanical fasteners, washers and/or flanges used for attaching the at least one blade, at least one blade motor and the mounting plate to each other.

Advantageously, this means that the entire cutting head can be interchanged in one piece.

Preferably, the at least one cutting head comprises all or some of the features of the previously described cutting head in the first aspect of the invention. Preferably, the plurality of interchangeable cutting heads comprises all or some of the features of the interchangeable cutting heads according to the first aspect of the invention.

Preferably, the cutting apparatus comprises all or some of the features of the cutting apparatus according to the first aspect of the invention.

Preferably, the cutting head attachment means comprises all or some of the features of the cutting head attachment means according to the first aspect of the invention.

Preferably, the at least one cutting head comprises at least one cutting means and/or blade as provided in the first aspect of the invention.

Preferably, the at least one cutting means and/or blade comprises all or some of the features of the at least one blade according to the first aspect of the invention.

Preferably, the at least one cutting means and/or blade is interchangeable.

Alternatively, the at least one cutting means and/or blade is fixed to the cutting head and/or mounting plate of the cutting head.

Preferably, the at least one cutting head comprises at least one blade motor and/or cutting means motor as provided in the first aspect of the invention.

Preferably, the at least one blade motor and/or cutting means motor comprises all or some of the features of the at least one blade motor according to the first aspect of the invention.

Alternatively, the at least one blade motor and/or cutting means motor is fixed to the at least one cutting head and/or mounting plate.

Preferably, the at least one cutting head and/or mounting plate is configurable to be removed and/or attached to the cutting apparatus and/or the cutting head attachment means.

Ideally, the entire interchangeable cutting heads, including the at least one blade and at least one blade motor, are configurable to be removed and/or attached to the cutting apparatus and/or the cutting head attachment means as one piece and/or individually.

According to a third aspect of the invention there is provided a method of cutting an object using a cutting apparatus suitable for subsea application and comprising a cutting means drive arrangement which is interchangeable.

Preferably, the cutting apparatus is a cutting apparatus according to the first and/or second aspect of the invention.

Preferably, the method comprising the step of installing a cutting means drive arrangement and/or cutting head to the cutting apparatus, if necessary. Alternatively, or additionally, the method comprising the step of installing and/or replacing one or more parts of the cutting means drive arrangement and/or the configuration of the cutting head and/or the mounting plate of the cutting head and/or the cutting head.

Preferably, the method comprising the step of installing/securing the at least one rotatable blade to the mounting plate of the cutting head and/or cutting head attachment means, if necessary.

Preferably, the method comprising the step of installing/securing at least one blade motor to the mounting plate of the cutting head and/or cutting head attachment means, if necessary.

Preferably, the method comprising the step pre-setting the clamping force of the cutting apparatus. Preferably, the method comprising the step of attaching the cutting apparatus to a machine/vehicle capable of lifting the cutting apparatus and providing a power supply to the cutting apparatus.

Preferably, the method comprising the step of deploying the cutting apparatus to the site of cut/object to be cut.

Ideally, the method comprising the step of providing power to the clamping means to manoeuvre the clamping means around the object to be cut.

Preferably, the method comprising the step of clamping the object to be cut. Ideally, the method comprising the step of clamping the object to be cut such that the object abuts against the abutment portion of the cutting apparatus.

Ideally, the method comprising the step of providing power to the blade motor and/or to the linear drive means to power rotation of the blade and movement of the cutting head and/or cutting head attachment means and/or of the rotatable blade towards the object to be cut.

Preferably, the method comprising the step of maintaining the power to the blade motor and/or linear drive means until the cut is performed. Ideally, the method comprising the step of monitoring the pressure, torque and/or speed of the clamping means, blade motor and/or drive means using the indicators and/or sensors and/or stalling means and/or pressure valves provided by the cutting apparatus.

Ideally, the method comprising the step of adjusting the pressure of the clamping means remotely, if necessary.

Preferably, the method comprising the step of shutting off the power provided to the drive motor and/or the linear drive means and/or reversing the direction of the blade motor and/or linear drive means to stop and/or to move the blade away from the object being cut.

Preferably, the method comprising the step of replacing the cutting head, the mounting plate of the cutting head, at least one cutting means/blade and/or cutting means motor/blade motor if necessary.

Preferably, the method comprising the step of interchanging one or more parts the cutting means drive arrangement and/or the cutting head configuration and/or the cutting head to prepare for the next cut, should the next cut require a different configuration.

The invention will now be described with reference to the accompanying drawings which shows by way of example only one embodiment of an apparatus in accordance with the invention.

Figure 1:
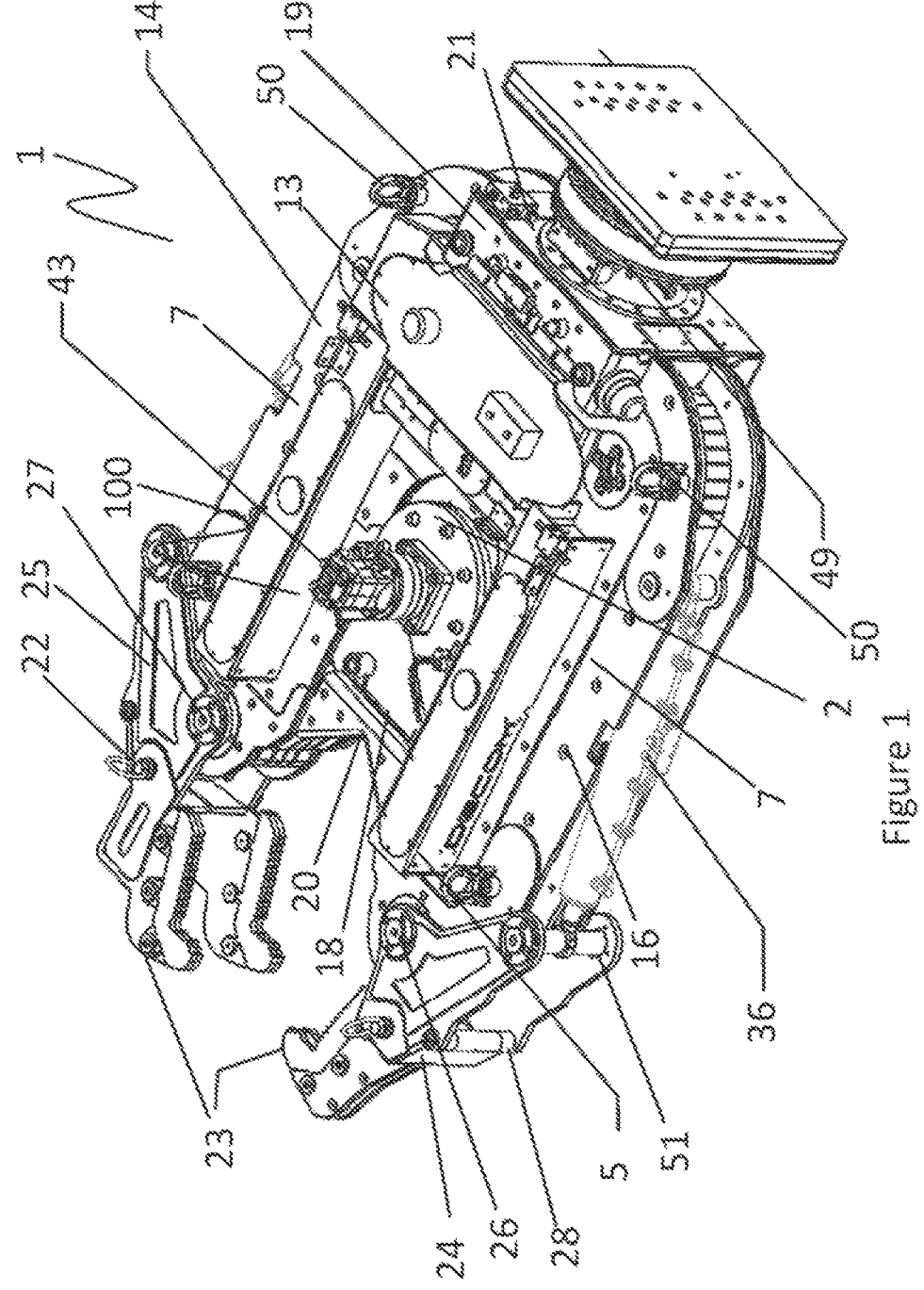
FIG. 1 illustrates a perspective view of a cutting apparatus according to the present invention.
Figure 2:
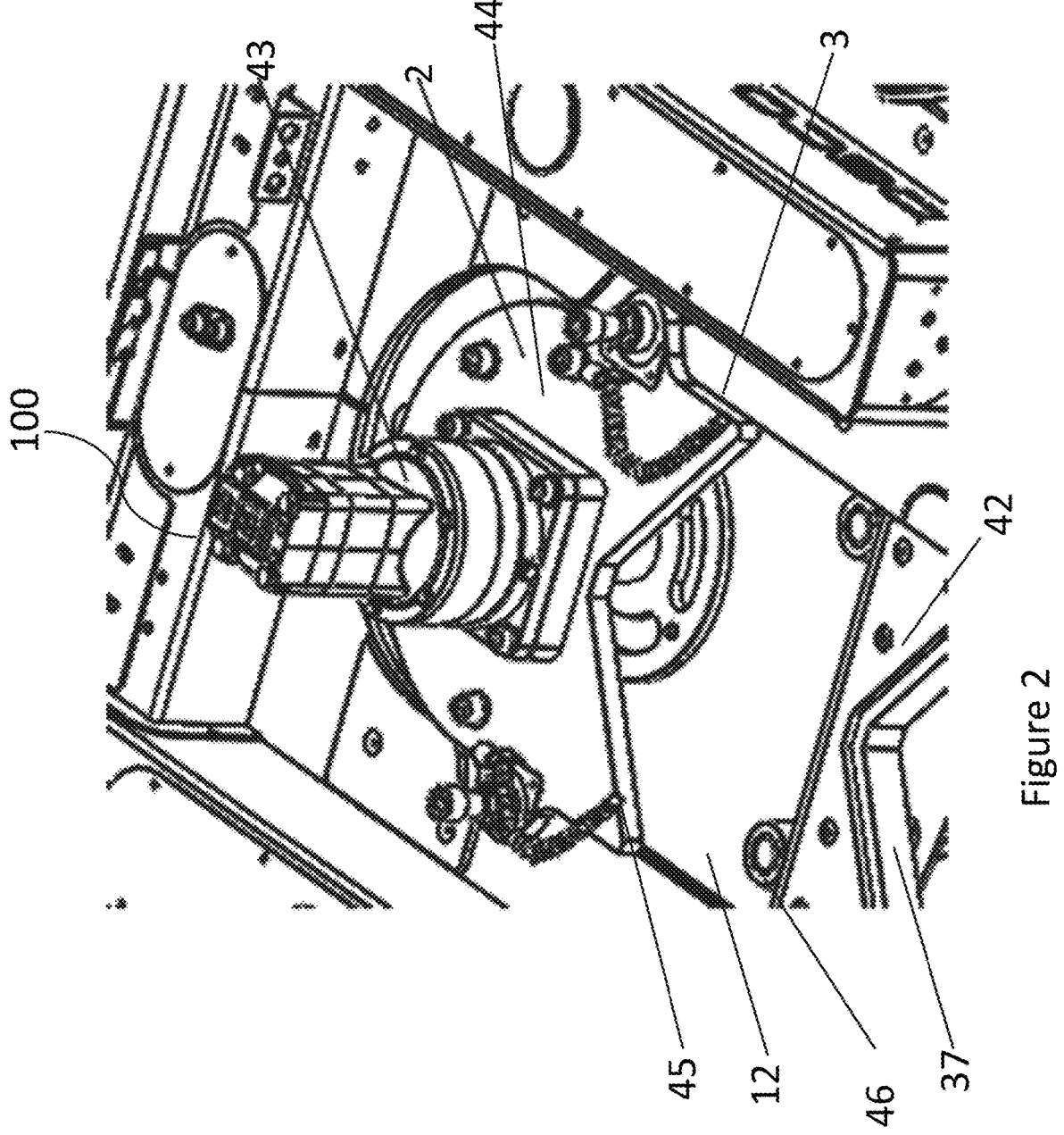
FIG. 2 illustrates a second perspective view of a cutting apparatus according to the present invention.

In the drawings there is shown a cutting apparatus indicated generally by reference numeral 1 having at least one cutting arrangement for cutting objects. The cutting apparatus 1 is configured for subsea application. The cutting apparatus has a cutting arrangement drive arrangement indicated by reference numeral 100. The cutting means drive arrangement 100 is interchangeable. All, some or a part of the cutting arrangement drive arrangement 100 is interchangeable, on site and/or on deck. The cutting arrangement drive arrangement 100 has a cutting arrangement 12 and a motive means 43. The motive means may be any means configurable for powering the cutting arrangement 12. The cutting arrangement drive arrangement 100 also has a plurality of mechanical fasteners, washers, plates and/or flanges 74, 72, 54 used for attaching the cutting arrangement 12 and/or the motor 43 to each other, to one or more parts of the cutting apparatus 1 and/or to one or more other parts of the cutting arrangement drive arrangement 100. This enables interchangeability between one or more types of cutting arrangements 12a, 12b and one or more motors 43a, 43b required to power different types of cutting arrangements 12a, 12b and/or or to cut different types of objects. Therefore, this enables the same cutting apparatus to be used for a variety of different cuts thereby reducing costs. Further, this reduces the need for additional equipment thereby saving space. This is in comparison to an operation requiring different types of objects to be cut and therefore requiring multiple cutting apparatuses having different types of blades and/or motors.

The cutting apparatus 1 has a cutting head 2. All, some or part of the cutting arrangement drive arrangement 100 is releasably detachable to a mounting plate 44 of the cutting head 2. In the embodiments illustrated, the cutting arrangement is a blade 12. The at least one blade 12 is interchangeable. This means that the blade can be changed as required, depending on the cut to be performed. The at least one blade 12 is configurable to cut one or more variety of objects. The cutting apparatus 1 has a plurality of blades 12. The plurality of blades 12 are interchangeable. The cutting apparatus 1 has a cutting head 2. The cutting apparatus 1 also has a cutting head attachment arrangement 3 configurable for releasably attaching the cutting head 2. The configuration of the cutting head 2 may be interchanged depending on the type of cut that is required. By the type of cut we mean depending on the type of object to be cut or the size, shape, weight, material or location of the object to be cut and/or on the speed and/or torque required to cut the object. This allows a single cutting apparatus to be used with a number of different cutting head configurations. The cutting apparatus 1 has a drive arrangement 4 for driving the cutting head attachment arrangement 3 and/or the cutting head 2 towards and/or away from an object to be cut. The cutting head 2 has at least one blade 12. The at least one blade 12 is releasably securable to the cutting head 2 and/or to a mounting plate 44 of the cutting head 2. Only one blade 12 is attached to the mounting plate 44, however, the skilled person will understand that multiple blades may be attached. The cutting arrangement drive arrangement 100 is illustrated as having only one blade 12 at any one time, however the cutting arrangement drive arrangement 100 may have multiple blades at any one time. The at least one blade 12 is configurable to be removed from the cutting head 2 on which it is secured for changing between blades. The at least one blade 12 is a circular, rotatable, cold cut blade. This also prevents the formation of sparks or heat during cutting. The at least one blade 12 has interchangeable tips (not shown). The blade tips can be changed as required, depending on the cut and/or wear of the tips. This thereby reduces ancillary time before, during and after a cut. This is in comparison to cutting apparatus and blades needing to be changed entirely during or between cuts. The at least one blade 12 may be a custom blade, a steel cutting blade, a tungsten carbide tipped blade or a diamond blade. Various blades are illustrated throughout the drawings.

Figure 25:
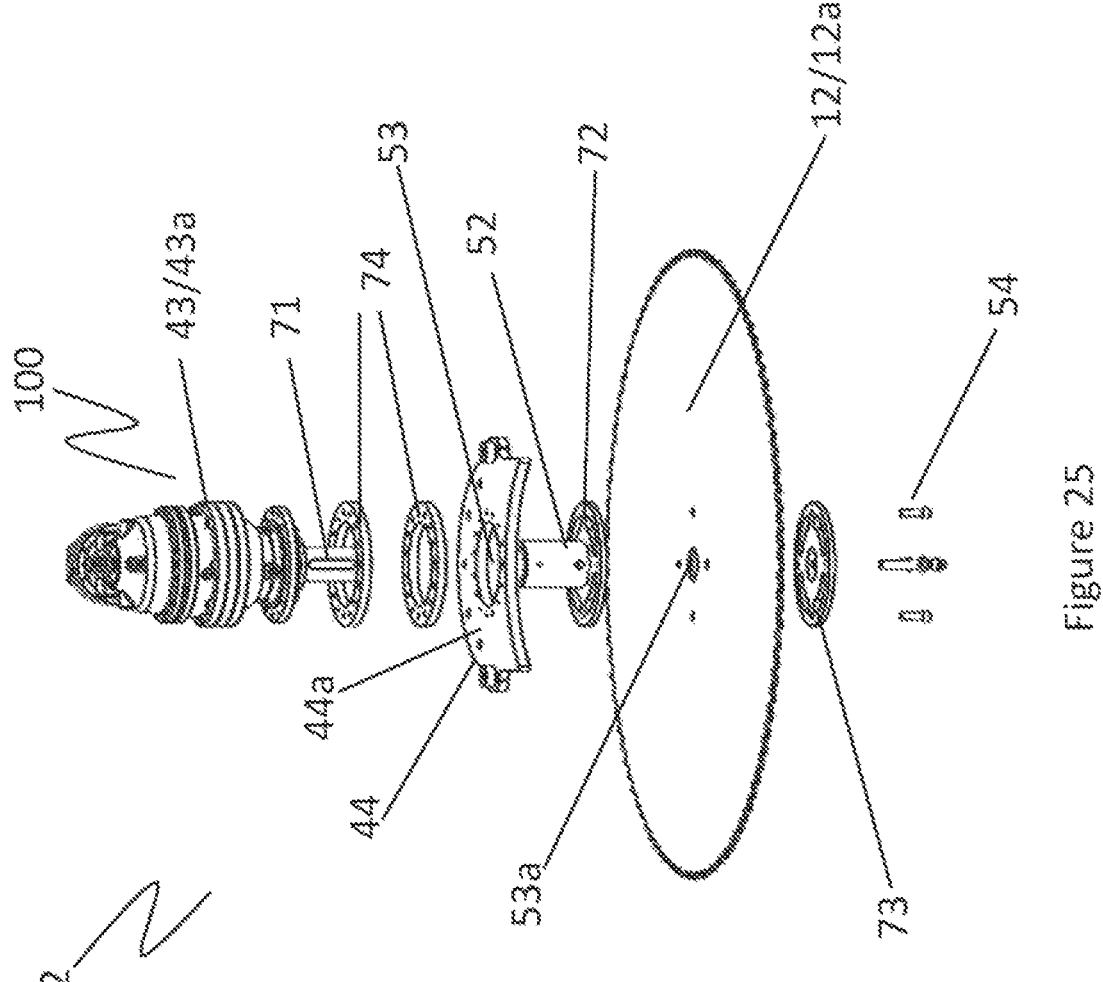
FIG. 25 is an exploded view illustrating an embodiment of the cutting head, blade and blade motor and showing the cutting means drive arrangement.
Figure 35:
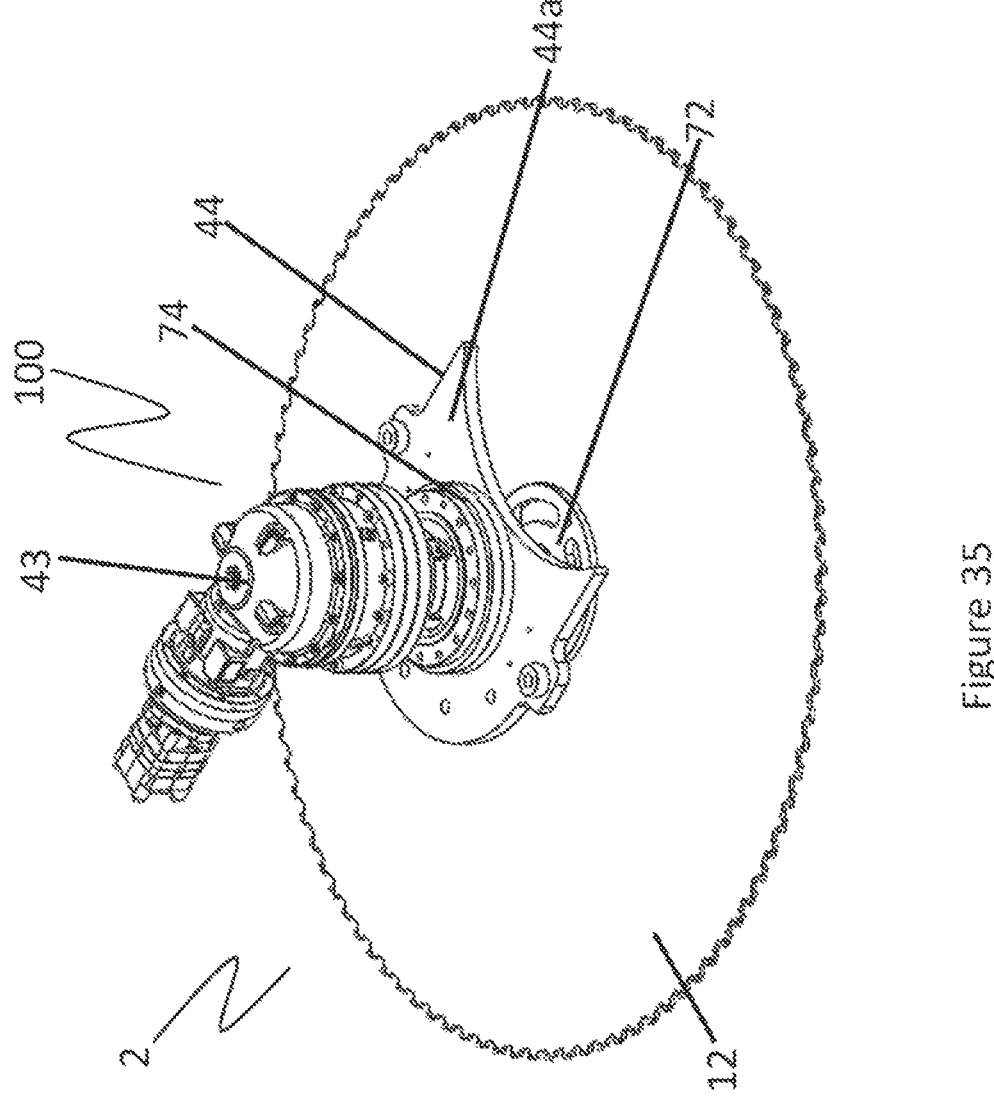
FIG. 35 is a perspective view of the cutting head and showing a cutting means drive arrangement.
Figure 36:
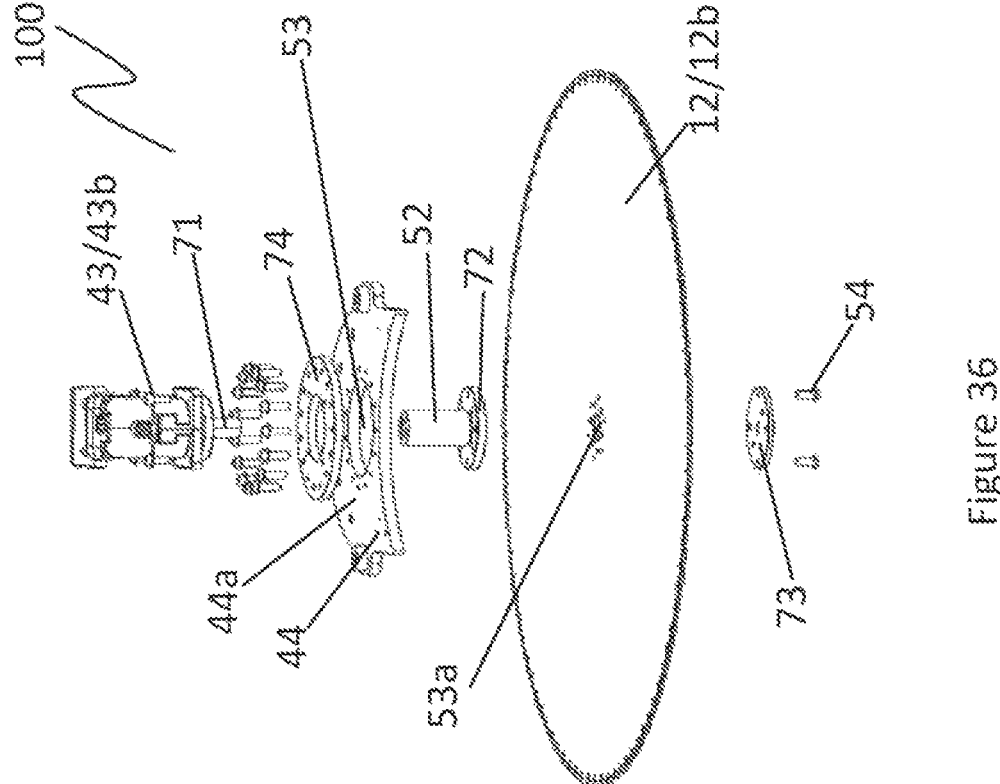
FIG. 36 is an exploded view of a second embodiment of the cutting head, blade and blade motor and illustrating an interchangeable cutting head drive arrangement.
Figure 37:
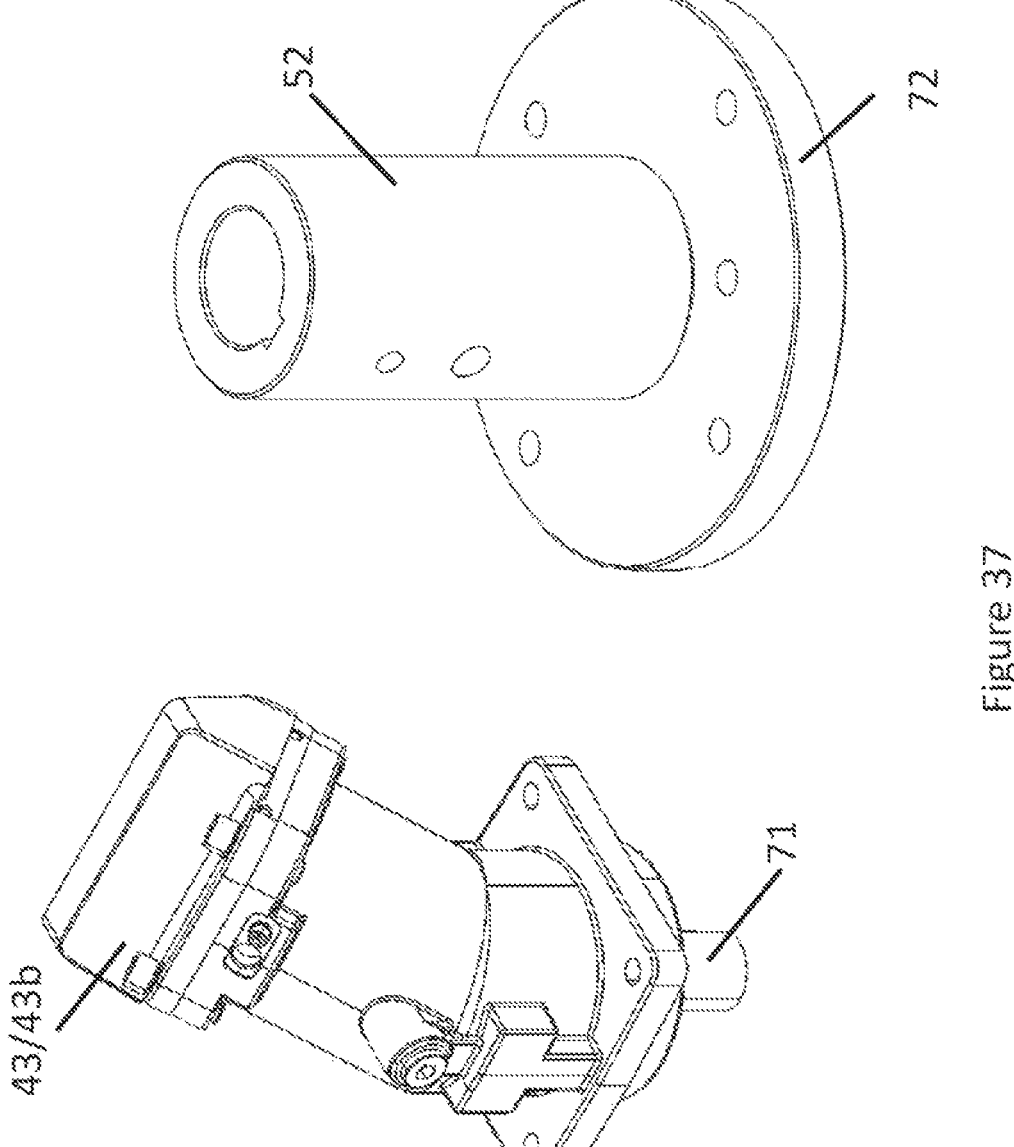
FIG. 37 is a perspective view of a second embodiment of a blade motor and associated spindle.

The cutting apparatus 1 or cutting head 2 has a blade motor 43 for powering motion and/or rotation of the blade 12. The blade motor has an output shaft 71. The blade motor 43 has a spindle 52, illustrated in FIG. 32, for rotating the blade 12 The blade 12 has an aperture 53a for receiving the spindle 52. In this embodiment, the blade 12 is releasably secured to the spindle 52 via a spindle washer 72 and/or one or more mechanical fasteners 54. The blade motor 43 is offset from the central axis of the at least one blade 12. This provides more clearance for making cuts with the blade. Thereby, this increases the ability of the cutting apparatus to cut straight through a pipe or other object having a larger diameter without needing to stop or reposition the cutting apparatus because the blade motor is too close to the object being cut. The cutting apparatus 1 has an offsetting arrangement such as a gearbox or chain drive (not shown) to enable the blade motor 43 to be offset relative to the central axis of the at least one blade 12. Alternatively, the blade motor 43 is set relative to the central axis of the at least one blade 12. The cutting apparatus 1 has a plurality of interchangeable blade motors 43. This mean, the blade motor 43 can be changed as required to perform different cuts. The cutting apparatus 1 has a low speed, high torque motor and/or a high speed, low torque motor. The cutting arrangement drive arrangement 100 has a low speed, high torque configuration 101, illustrated in FIG. 25. The embodiment illustrated in FIG. 25 shows a tungsten carbide tipped blade 12a and a low speed, high torque motor 43a which is releasably attachable to mounting plate 44. The cutting arrangement drive arrangement has a high speed, low torque configuration 102, illustrated in FIG. 36. The embodiment illustrated in FIG. 36 shows a diamond blade 12*b* and a high speed, low torque motor 43*b* which is releasably attachable to mounting plate 44. Interchangeability of the cutting arrangement drive arrangement 100 means that the configuration may be interchanged depending on the type of cut that is required. By the type of cut we mean depending on the type of object to be cut or the size, shape, weight, material or location of the object to be cut and/or on the speed and/or torque required to cut the object. This allows a single cutting apparatus to be used with a number of cutting means drive arrangements. Referring to FIGS. 25 and 35, the cutting head 2 has a mounting plate 44. The blade motor 43/43*a* is mounted to a surface of the mounting plate 44 of the cutting head 2. In this embodiment, the blade motor is secured to the front surface 44*a* of the mounting plate 44 of the cutting head 2. The blade motor 43 is releasably secured to the mounting plate 44 via one or more mechanical fasteners 54. The mounting plate 44 has an aperture 53 through which the motor spindle 52 extends for attachment to the blade 12 on the other side of the mounting plate 44. By the other side, we mean not the side having the front surface 44*a* i.e., the back side of the mounting plate. In this embodiment, the at least one blade 12/12*a* is supported on the spindle 52 extending through the aperture 53 in the mounting plate 44. However, the blade 12 may be supported to the cutting head 2 and attached to the blade motor 43 by any other suitable means. By cutting head we mean the collective assembly of the at least on blade 12, at least one blade motor 43, the mounting plate 44, any mechanical fasteners 54, washers and/or flanges/plates 72, 73, 74 (see FIGS. 25 and 35) used for attaching the at least one blade 12, at least one blade motor 43 and the mounting plate 44 to each other. This means that as the cutting head attachment arrangement 3 and/or the cutting head 2 is driven towards an object to be cut via the drive arrangement, so too is the blade 12. The cutting head 2 is releasably attached to the cutting head attachment arrangement 3 via mechanical fasteners 54 and/or via any other means suitable for attaching the cutting head 2 to the cutting head attachment arrangement 3. Only one cutting head is attached to the cutting head attachment arrangement at any one time. Referring to FIGS. 36, the high speed, low torque configuration is arranged in the same way as the low speed, high torque configuration illustrated in FIG. 25. The blade motor 43*b* is mounted to an adapter plate 74*a* which is mounted to the mounting plate 44. The blade 12/12*b* is also mounted in the same way as the blade 12/12*a* previously described in relation to FIG. 25. FIG. 37 illustrates a motor and spindle for use in the high speed configuration of FIG. 36.

Figure 4:
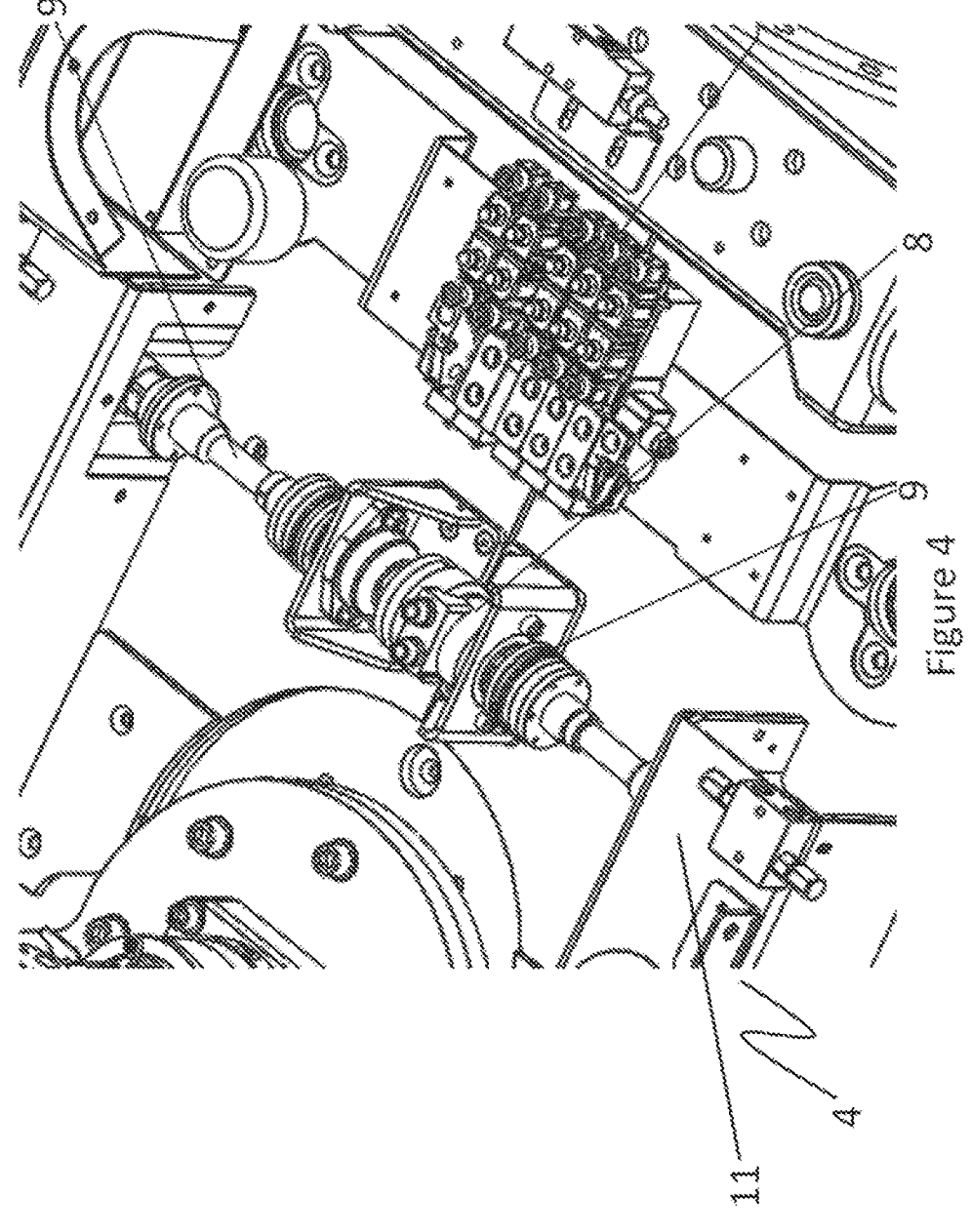
FIG. 4 illustrates a fourth perspective view of a cutting apparatus according to the present invention.
Figure 5:
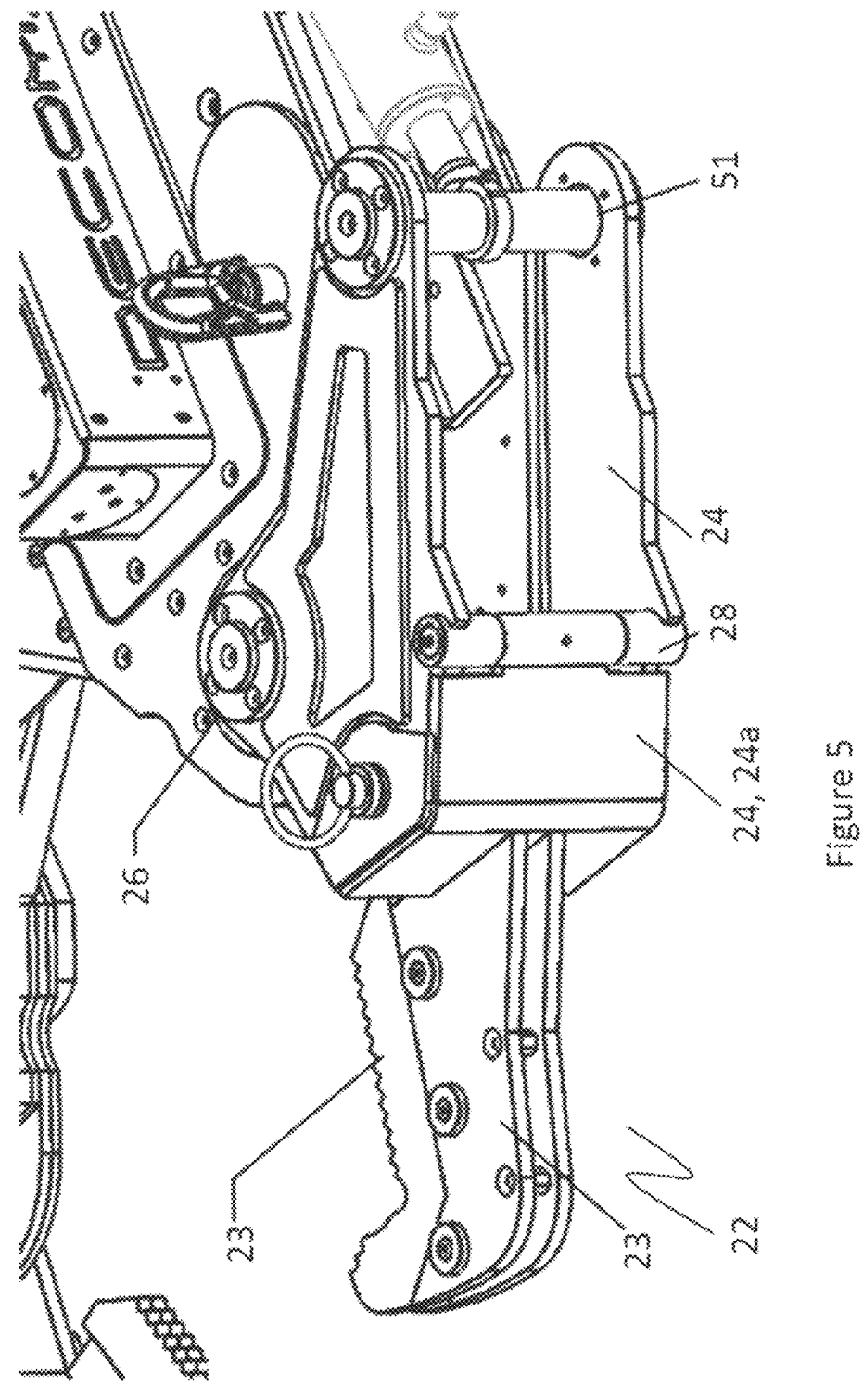
FIG. 5 illustrates a perspective view of a clamping means according to the present invention.
Figure 6:
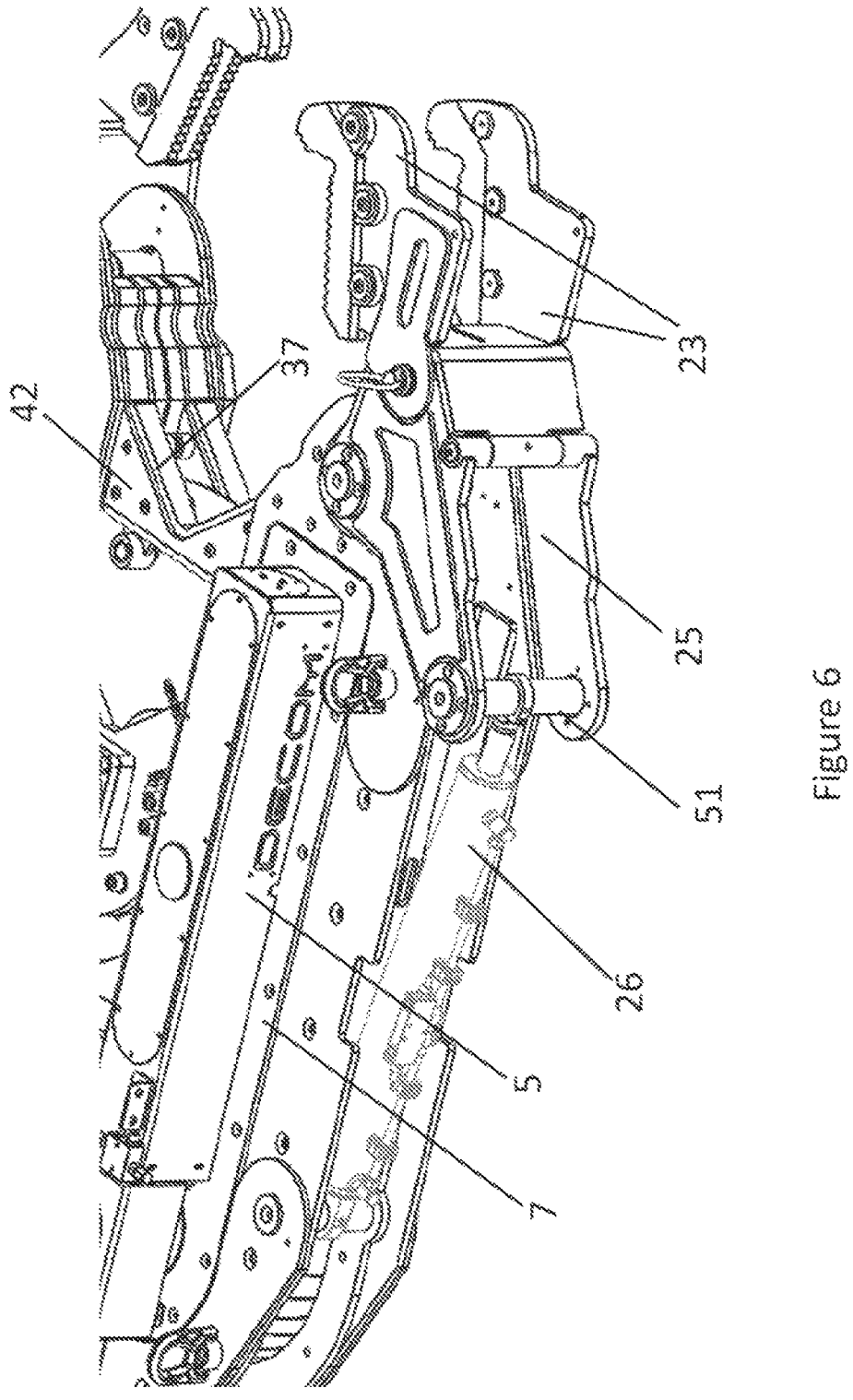
FIG. 6 illustrates a second perspective view of a clamping means according to the present invention.
Figure 7:
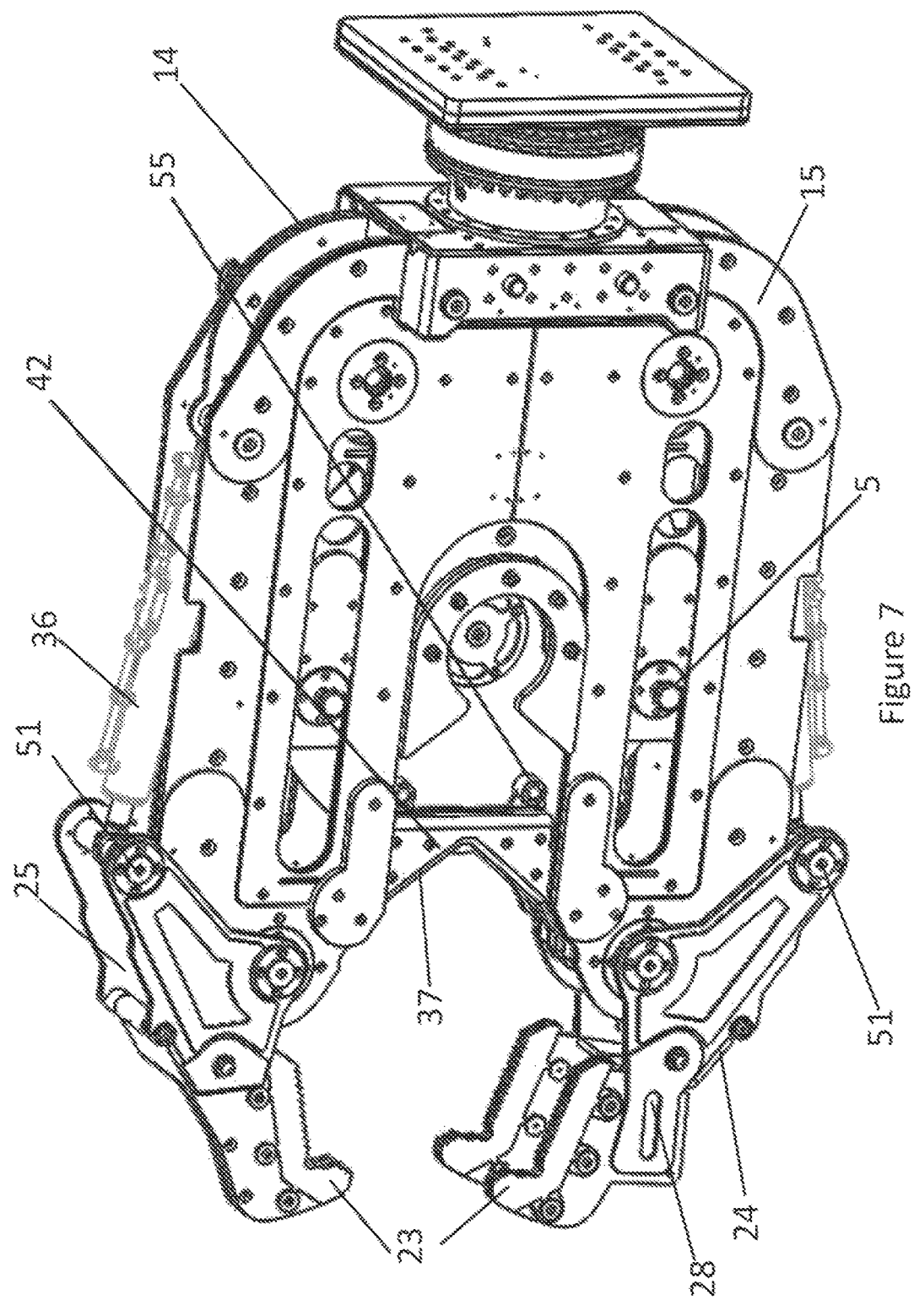
FIG. 7 illustrates a fifth perspective view of a cutting apparatus according to the present invention.
Figure 8:
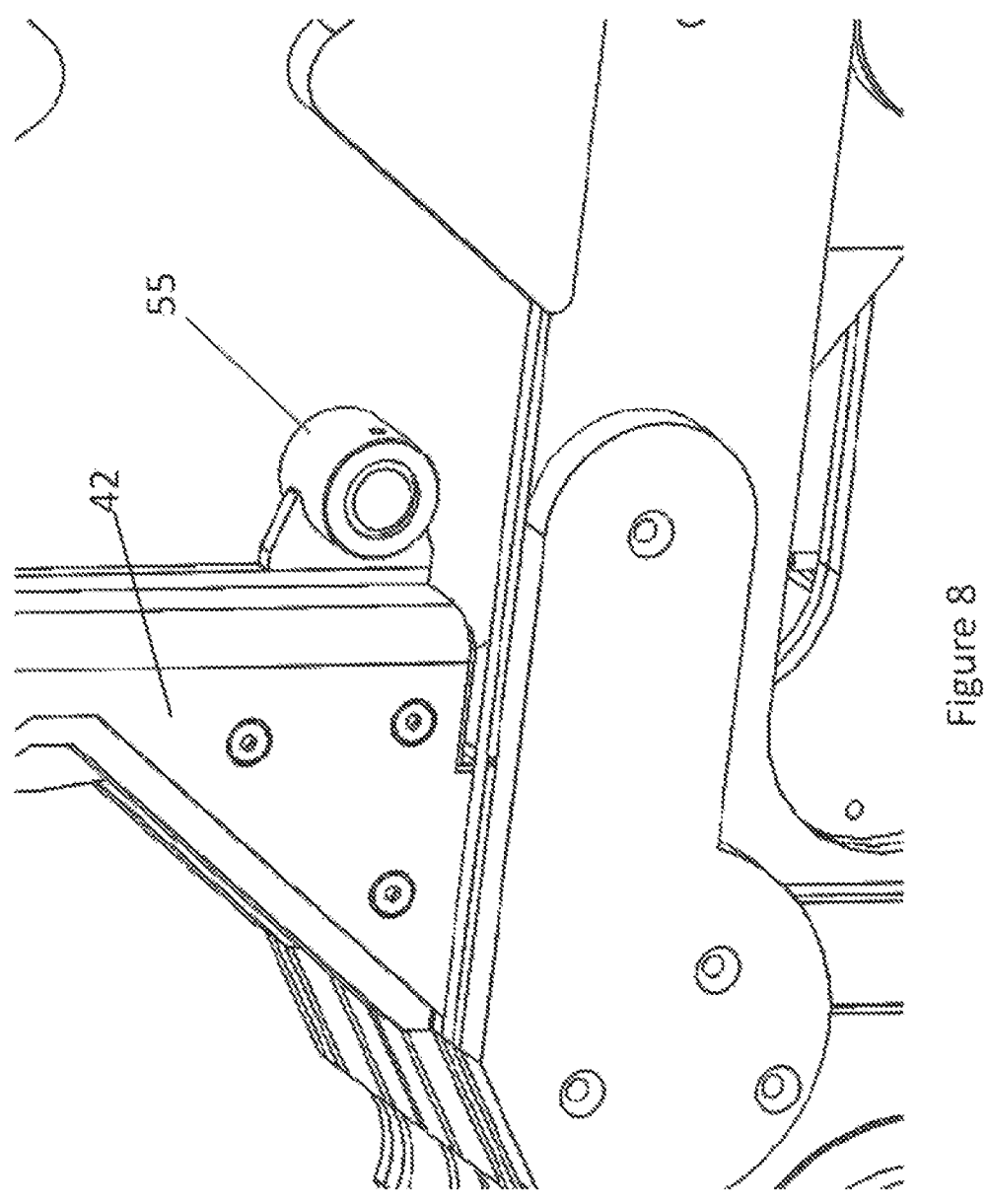
FIG. 8 illustrates a perspective view of a blade support according to the present invention.
Figure 33:
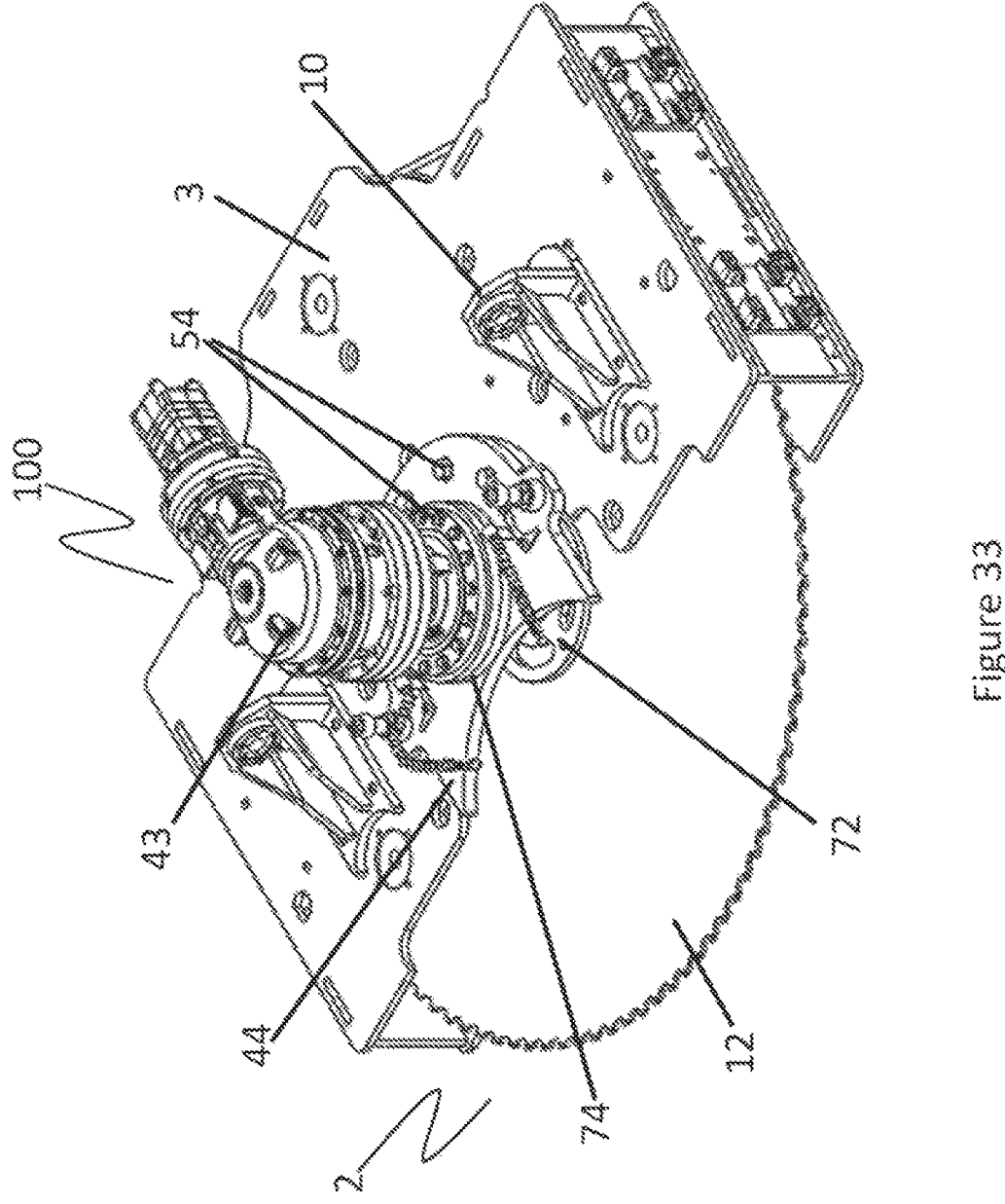
FIG. 33 is a perspective view of a cutting head attached to a cutting head attachment means and showing a cutting head drive arrangement.
Figure 34:
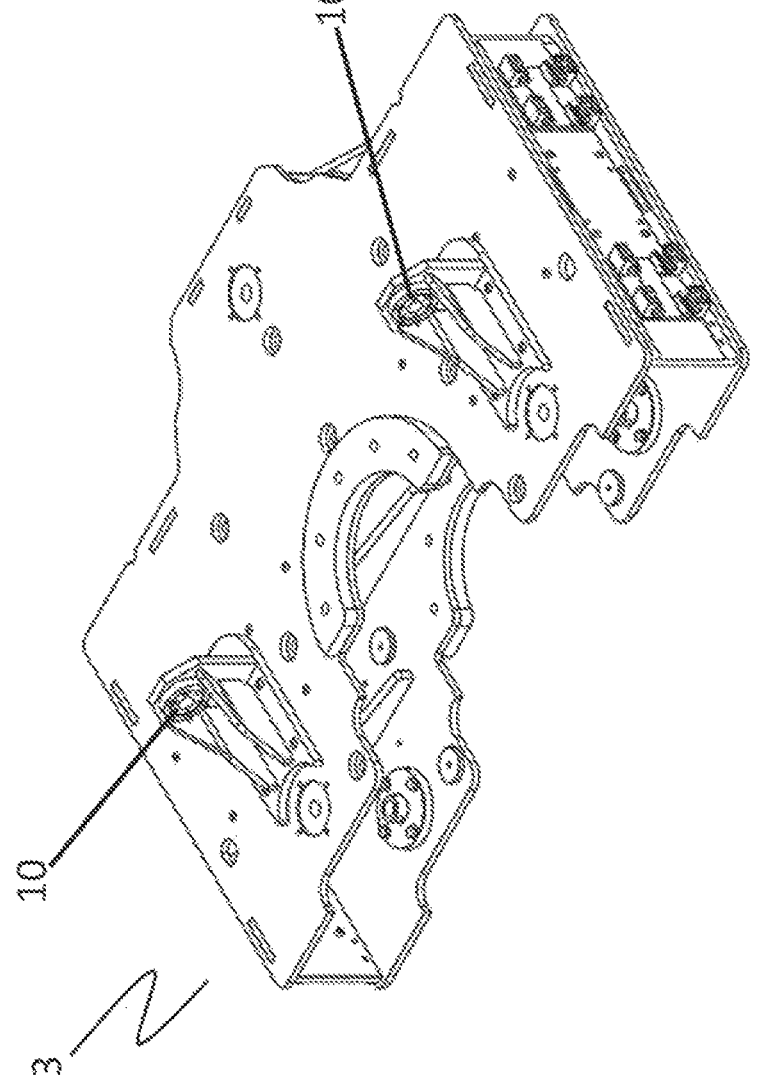
FIG. 34 is a perspective view of a cutting head attachment means.
Figure 41:
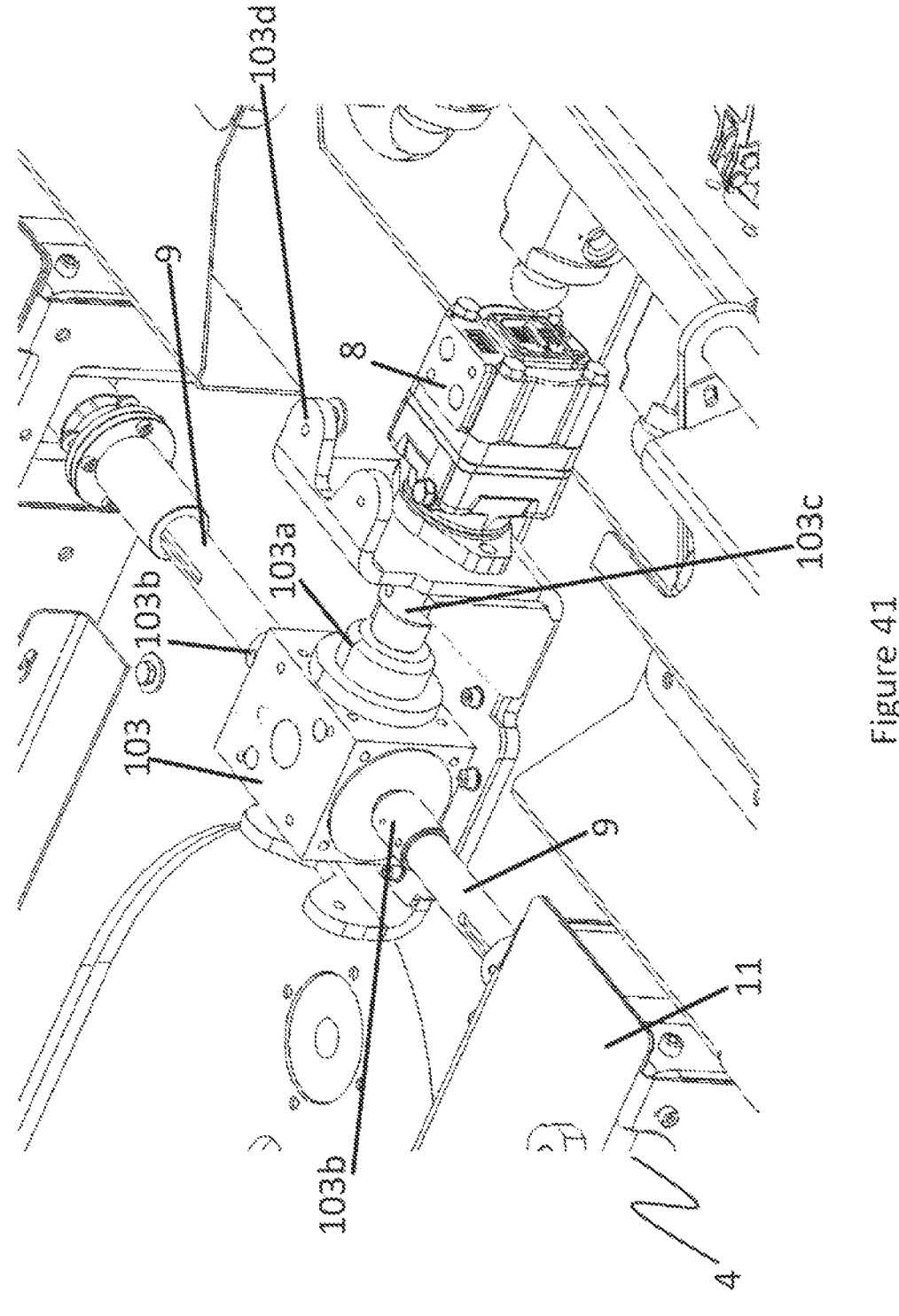
FIG. 41 is a perspective view of a second embodiment of the linear drive arrangement according to the present invention.

The drive arrangement 4 has a drive member 5 for applying drive force to the cutting head attachment arrangement 3 and/or the cutting head 2. The drive arrangement 4 has at least two drive members 5. In this embodiment, the drive arrangement 4 has two drive members 5. This enables more drive force to be applied to the cutting head attachment arrangement and/or the cutting head. This is in comparison to one drive member. The drive arrangement 4 is coupled to the cutting head attachment arrangement 3 and/or to the cutting head 2. The two drive members 5 are coupled to the cutting head attachment arrangement 3 and/or to the cutting head 2. In this embodiment, the two drive members 5 are coupled to the cutting head attachment arrangement 3. The at least two drive members 5 are disposed laterally of the cutting head attachment arrangement 3 and/or of the cutting head 2. By disposed laterally we mean outside the cutting zone of the cutting head and/or outside the zone over which the cutting head moves linearly. The at least two drive members are disposed laterally of the cutting head attachment arrangement 3 and/or of the cutting head 2 for applying an equal force to both sides of the cutting head attachment arrangement 3 and/or to both sides of the cutting head 2. The at least two drive members 5 are disposed laterally of the cutting head attachment arrangement 3 and/or of the cutting head to ensure uniform distribution of force is applied from the cutting head attachment arrangement 3 and/or from the cutting head 2 to the object 6 to be cut. This reduces uneven vibration between the cutting head attachment arrangement 3 and the object 6 to be cut. Thereby this reduces uneven vibration between the blade and the object to be cut. The at least two drive members 5 are mutually opposing relative to one another. In this embodiment, the at least two drive members 5 are disposed adjacent to mutually opposing lateral portions 7 of the cutting head attachment arrangement 3 (see FIG. 1). The at least two drive members 5 are driven by a single drive arrangement 4. This increases synchronization between the at least two drive members 5. This also reduces vibration of the cutting head attachment arrangement 3 and/or of the cutting head 2. This is in comparison to each drive member being driven by its own corresponding drive arrangement. The drive arrangement 4 is a linear drive arrangement. The drive arrangement has a drive motor 8. In this embodiment, the drive motor is a hydraulic drive motor. The dove arrangement 4 has an output shaft 9. The drive motor 8 rotates the output shaft 9. Two embodiments of the drive arrangement are illustrated, the first is illustrated in FIG. 4 and the second is illustrated in FIG. 41. In the embodiment illustrated in FIG. 41, the drive motor 8 provides power to gearbox 103 which has a single input shaft 103*a* and two output shafts 103*b*. The input shalt 103*a* is connected to the output shafts 103*b* via a bevel gear. However, the skilled person will understand that the input shaft may be connected to the output shaft by any suitable means. The gearbox 103 is a three-way gearbox 103 configured to provide a 1:1 gear ratio and/or speed ratio. However, the three way gearbox 103 is configurable to provide a positive and/or negative gear ratio and/or speed ratio. In the embodiment illustrated in FIG. 4, the drive motor 8 is a twin shaft motor. The gearbox 103 is coupled to motor 8 via a coupler 103*c*, the arrangement also has a gearbox and motor mounting bracket 103*d*. The drive arrangement 4 has a lead screw 5 to enable linear motion of the cutting head attachment arrangement 3 and/or of the cutting head 2. In the embodiments illustrated, the drive member 5 is a lead screw. The drive arrangement 4 has at least two lead screws 5. Each lead screw 5 is coupled to a portion of the cutting head attachment arrangement 3 and/or to the cutting head 2 via a threaded collar 10 (see FIGS. 33 and 34). The drive arrangement has a twin output shaft 9. Each output shaft 9 couples to one of the lead screws 5. Having a twin output shaft enables synchronisation between the at least two lead screws. The drive arrangement 4 has a gearbox 11. Each output shaft 9 couples to one of the lead screws 5 via the gearbox 11. The gearbox 11 has a bevel gear (not shown). The gearbox 11 is a bevel gearbox. The drive arrangement has at least two gearboxes 11. Each gearbox 11 is configurable to rotate a corresponding lead screw 5. The cutting apparatus 1 has a control arrangement for controlling the speed of drive arrangement 4 and/or the drive motor 8. The control arrangement has a flow control valve for controlling the speed of the drive arrangement 4 and/or of the drive motor 8. The control arrangement is configurable to enable speed adjustment of the drive arrangement 4 and/or of the drive motor 8. The flow control valve is configurable to enable speed adjustment of the drive arrangement 4 and/or of the drive motor 8. While one or more control arrangements such as hydraulic spool valves are visible in FIG. 4, the skilled person will understand that for subsea applications these will be provided remotely.

The cutting apparatus 1 has travel limiter arrangement to prevent the cutting head attachment arrangement 3 and/or the cutting head 2 from travelling beyond a pre-set distance. The travel limiter arrangement has position detectors for detecting the position of the cutting head attachment arrangement 3 and/or of the cutting head 2 relative to one or more other elements of a cutting apparatus and/or relative to a start position of the cutting head attachment arrangement 3 and/or of the cutting head 2 respectively. The cutting apparatus 1 may also have any other type of detector for detecting the position and/or travel distance of the cutting head attachment arrangement 3 and/or the cutting head 2 relative to one or more other elements of a cutting apparatus and/or relative to a start position of the cutting head attachment arrangement 3 and/or the cutting head 2, respectively. The travel limiter arrangement is configurable to detect when the cutting head attachment arrangement 3 and/or the cutting head 2 has travelled a pre-set distance and/or has reached a pre-set position. The travel limiter arrangement is configurable to reduce, stop and/or reverse flow to the drive motor 8 upon detection of the cutting head attachment arrangement 3 and/or the cutting head 2 travelling a pre-set distance and/or reaching a pre-set position. This prevents damage to the cutting apparatus structure which may arise due to continued driving of the cutting head 2 past a pre-set position. The cutting apparatus 1 has an electrical and/or hydraulic travel limiter arrangement.

The cutting apparatus 1 has a main frame 13 for supporting one or more elements of the cutting apparatus 1 such as the drive arrangement 4. The main frame 13 has two spaced apart structural support members 14, 15 for defining the structure of the main frame 13. The cutting apparatus 1 has two spaced apart structural support members 14, 15 for defining the structure of the cutting apparatus 1. The two spaced apart structural support members 14, 15 are mutually opposing. The two spaced apart support members 14, 15 are coupled via a structural spacer arrangement 16. The longitudinal axis of the two spaced apart structural support members 14, 15 are parallel. The two spaced apart structural support members 14, 15 are in a parallel arrangement defining a gap 17 between the structural support members 14, 15. The cutting apparatus 1 has a front plate and a back plate. The main frame 13 has a front plate and a back plate. The two spaced apart structural support members 14, 15 are a front plate and a back plate. The front plate and back plate are mutually opposing relative to one another The front plate and the back plate are spaced apart relative to each other. The front plate and the back plate are mechanically coupled to one another.

The cutting apparatus 1 has an object engaging portion 18 and non-object engaging portion 19. The cutting apparatus 1 has an object engaging end 20 and a non-object engaging end 21. The main frame 13 has an object engaging portion 18 and a non-object engaging portion 19. The main frame 13 has an object engaging end 20 and a non-object engaging end 21. The two spaced apart structural support members 14, 15 have an object engaging portion 18 and non-object engaging portion 19. The two spaced apart structural support members 14, 15 have an object engaging end 20 and a non-object engaging end 21. The object engaging end 20 is locatable at or about an end of the object engaging portion 18. The non-object engaging end 21 is locatable at or about the non-object engaging portion 19. In use, the cutting head attachment arrangement and/or the cutting head travels towards an object to be cut in a direction from the non-object engaging end 21 of the cutting apparatus towards the object engaging end 20 of the cutting apparatus. In use, the cutting head attachment arrangement 3 and/or the cutting head 2 travels away from an object to be cut in a direction from the object engaging end 20 of the cutting apparatus towards the non-object engaging end 21 of the cutting apparatus.

At least part of the cutting head 2 is disposed between the two spaced apart structural support members 14, 15. At least part of the at least one blade 12 is disposed between the two spaced apart structural support members 14, 15. At least part of the cutting head 2 is disposed in the gap 17 between the two spaced apart structural support members 14, 15. At least part of the at least one blade 12 is disposed in the gap between the two spaced apart structural support members 14, 15. At least part of the cutting head 2 is slidable between the two spaced apart structural support members 14, 15 and out through the object engaging end 20 for releasable detachment thereof. At least part of the at least one blade 12 is slidable between the two spaced apart structural support members 14, 15 and out through the object engaging end 20 for releasable detachment thereof.

At least part of the cutting head 2 and/or at least part of the blade 12 is parallel with the two spaced apart structural support members 14, 15.

Figure 26:
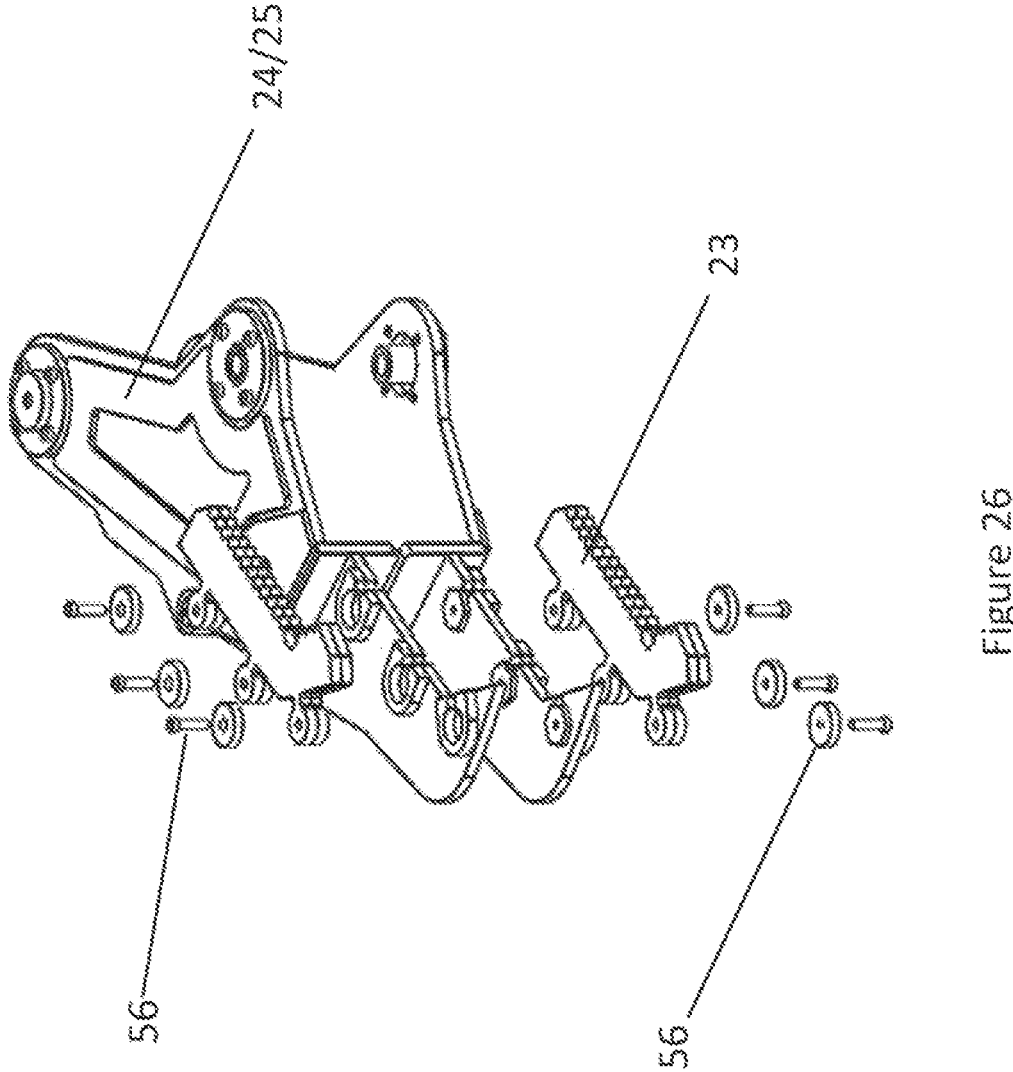
FIG. 26 is an exploded view one embodiment of the clamping arrangement.
Figure 27:
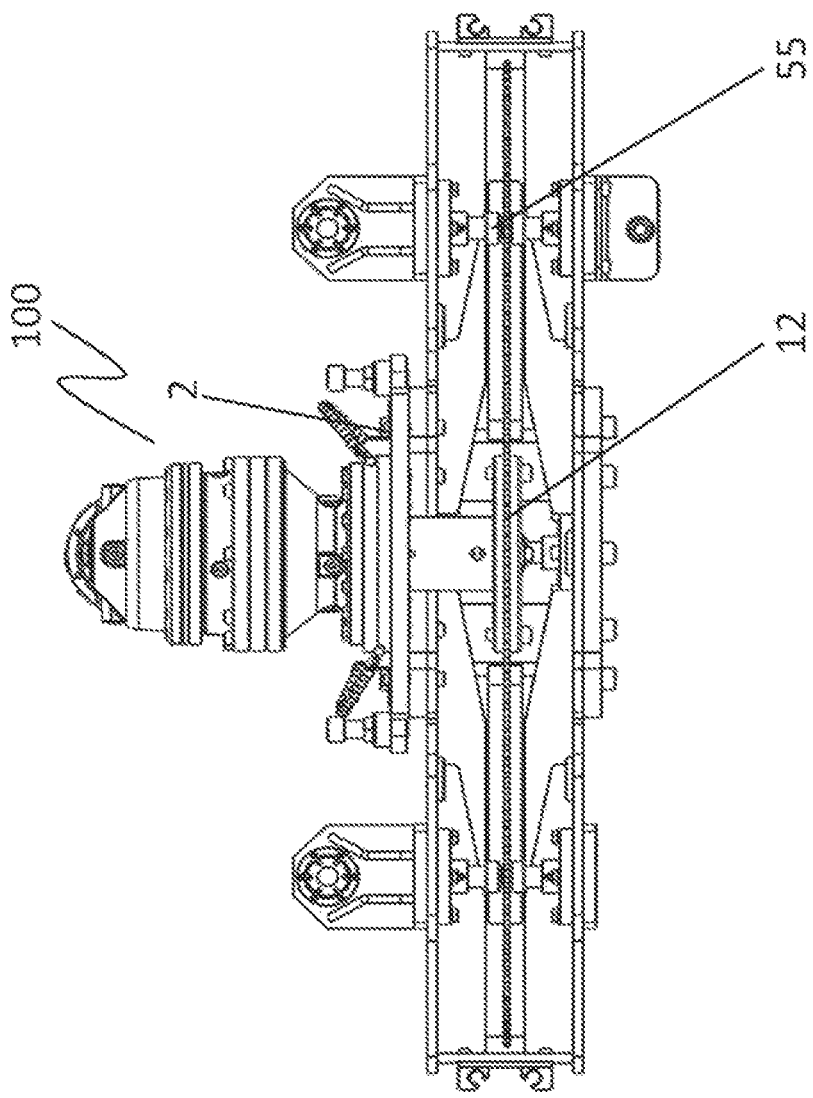
FIG. 27 is a perspective view of the cutting apparatus from the object engaging end.
Figure 39:
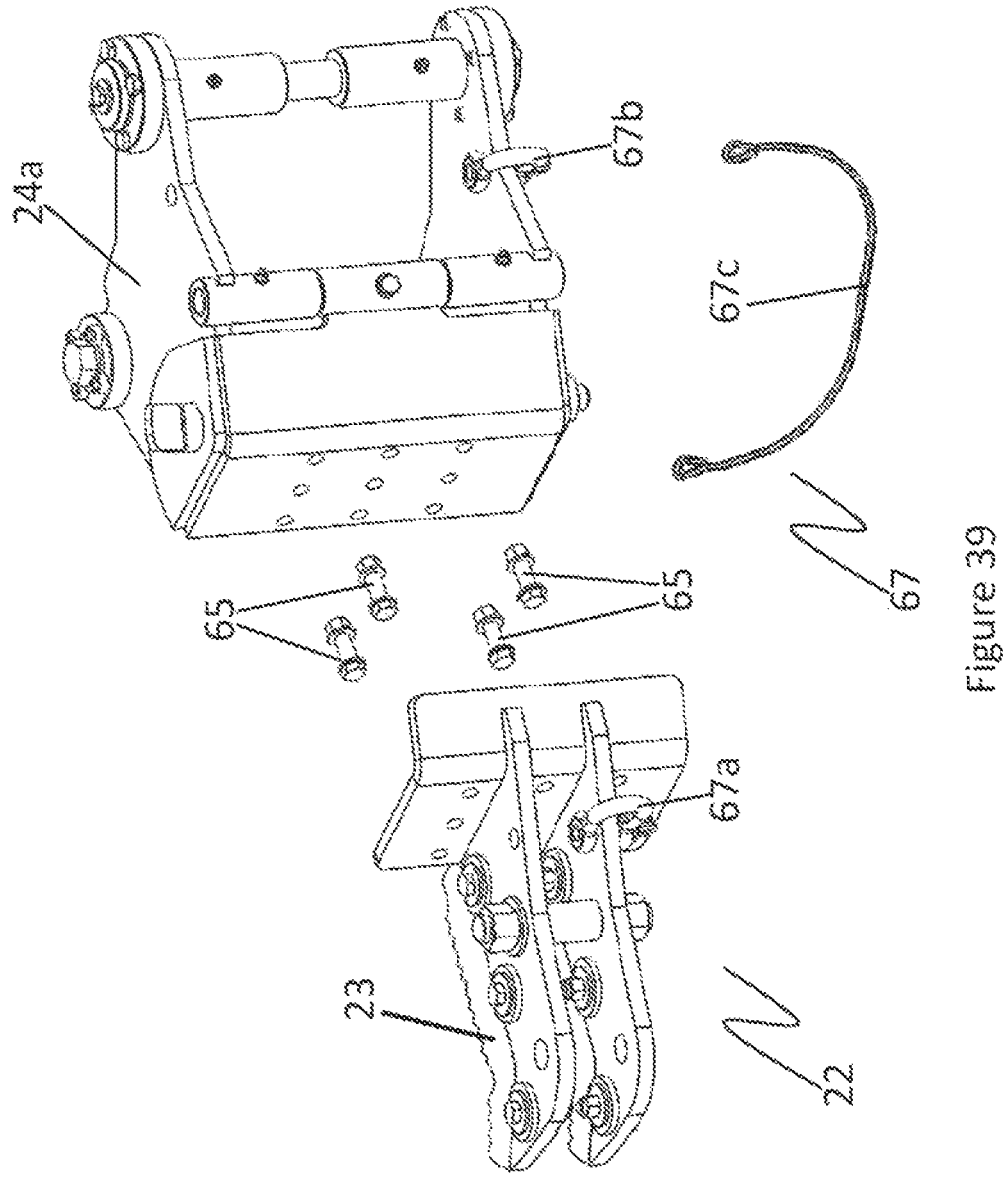
FIG. 39 is an exploded view of a clamping arrangement using shearable bolts according to the present invention.
Figure 40:
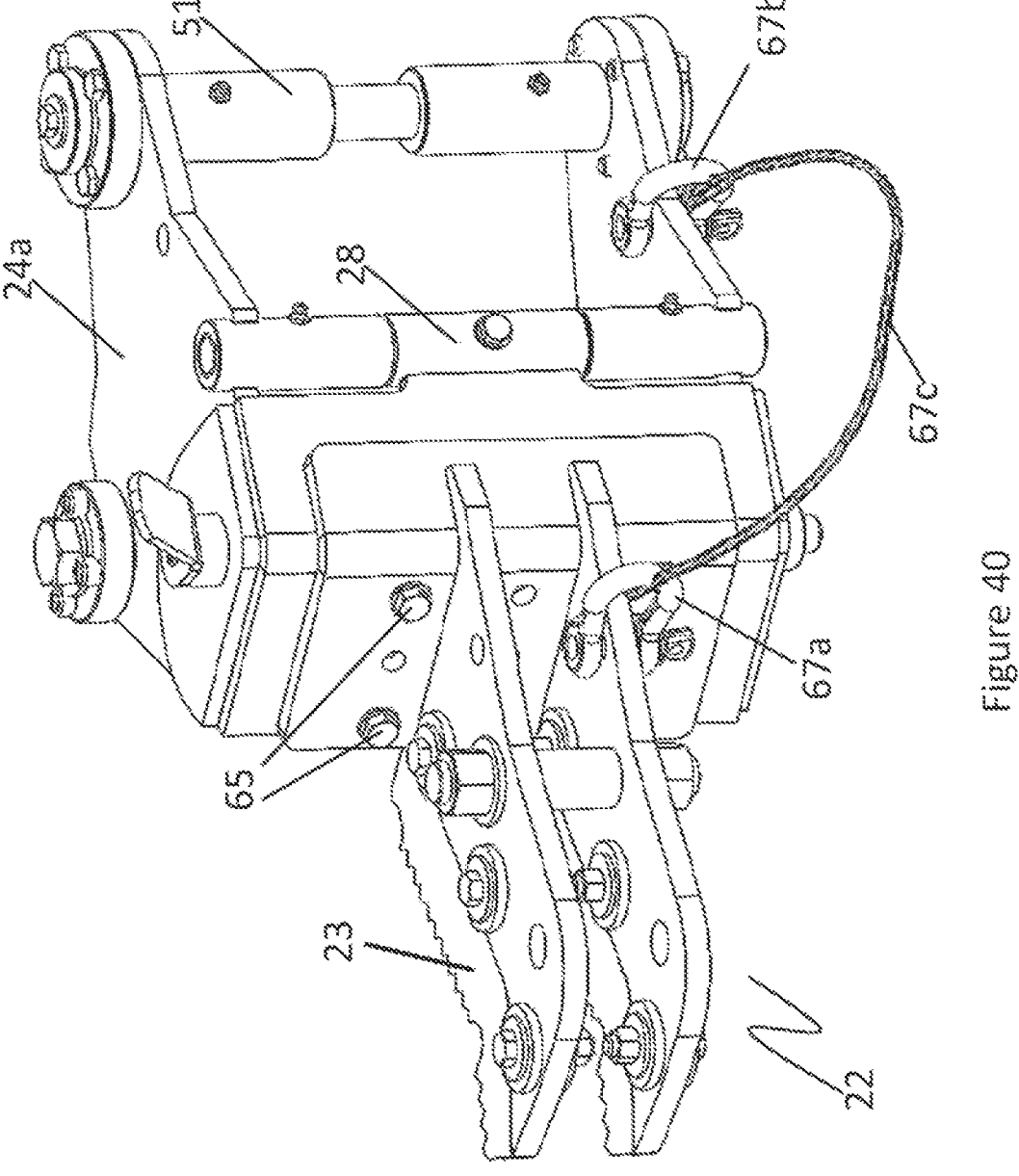
FIG. 40 is a perspective view of a clamping arrangement using shearable bolts according to the present invention.

The cutting apparatus 1 has a clamping arrangement 22 to releasably clamp an object to be cut. The clamping arrangement has one or more clamping jaws 23. In this embodiment, the clamping arrangement 22 has a plurality of clamping jaws 23. The clamping jaws 23 are interchangeable. The clamping jaws 23 can be changed as required, depending on the size, weight, material and location of the object to be clamped. This enables use of custom clamping jaws required for specific cuts. The one or more clamping jaws 23 are configurable to move towards, around and/or away from an object to be clamped. The clamping arrangement 22 has a left clamping arm 24 and a right clamping arm 25. The left clamping arm 24 and the right clamping arm 25 are configurable to move towards, around and/or away from an object to be clamped. The left clamping arm 24 and the right clamping arm 25 are pivotally attached to the main frame 13 of the cutting apparatus 1 at or about the object engaging portion 18 of the main frame 13. The left clamping arm 24 and right clamping arm 25 are pivotally attached to one or both of the structural support members 14, 15. The left clamping arm 24 and right clamping arm 25 are mutually opposing. The left clamping arm 24 and the right clamping arm 25 are configurable to support at least one clamping jaw 23 each. The one or more clamping jaws 23 are releasably attachable to one of the clamping arms 24, 25 via mechanical fasteners 56 such as bolts as illustrated in FIG. 26. As illustrated in FIGS. 39 and 40, the one or more clamping jaws 23 are also releasably attachable to a clamping arm 24 or, to a jaw pivot assembly 24a intermediate the clamping jaw 23 and clamping arm 24, via one or more shearable bolts/shear bolts 65. The one or more shearable bolts 66 are configured to snap upon application of excessive force or tension. This prevents transmission of any tensile load onto the cutting arrangement 12 or any part of the clamping arrangement 22. Thereby, this prevents damage to the cutting arrangement 12 or any part of the clamping arrangement 22. The one or more clamping jaws 23 are further attached to the clamping arm 24 or, jaw pivot assembly 24a, via a second attachment arrangement 67 to prevent loss of the one or more clamping jaws 23 upon snapping of the one or more shearable bolts 65. The secondary attachment arrangement 67 is configured to provide a sling for the one or more clamping jaws 23 upon snapping of the one or more shearable bolts 65 to prevent loss of the clamping jaws 23. In the embodiment illustrated in FIGS. 39 and 40, the second attachments arrangement 67 has a shackle 67a attached to the clamping jaw 23, a shackle 67b attached to jaw pivot assembly 24a and a wire rope 67c attached at one end to the clamping jaw shackle 67a and at another end to the jaw pivot assembly shackle 67b. The wire rope 67c is configured to sling the one or more clamping jaws 23 back to the clamping arm or jaw pivot assembly 24a upon snapping of the one or more shearable bolts 65.

The cutting apparatus 1 has a left primary pivot 26 and a night primary pivot 27 around which the left clamping arm 24 and the right clamping arm 25 pivot respectively. This enables movement of the one or more clamping jaws 23 around and/or away from an object to be clamped The left primary pivot 26 and the right primary pivot 27 extend between the two spaced apart structural support members 14, 15 at or about the object engaging portions 18 of the two spaced apart structural support members 14, 15. The left primary pivot 26 and the right primary pivot 27 extend perpendicular to the plane of the two spaced apart structural support members 14, 15. The left clamping arm 24 and the right clamping arm 25 are configurable to move parallel to the plane of the two spaced apart structural support members 14, 15. The one or more clamping jaws 23 are configurable to move parallel to the plane of the two spaced apart structural support members 14, 15. The left clamping arm 24 and the right clamping arm 25 are configurable to move parallel to the plane of direction of the cutting head 2 and/or of the cutting head attachment arrangement 3 and/or of the at least one blade 12. The one or more clamping jaws 23 are configurable to move parallel to the plane of direction of the cutting head 2 and/or of the cutting head attachment arrangement 3 and/or of the at least one blade 12.

The cutting apparatus 1 has a left secondary pivot 28 and a right secondary pivot 29 around which the one or more clamping jaws 23 can pivot, when supported on the left clamping arm 24 and right clamping arm 25 can pivot respectively. This enables further pivoting of the of the one or more clamping jaws around and/or away from an object to be clamped and can thereby accommodate a wider variety of different sized objects. This also enables further pivoting away from the main frame of the cutting apparatus which eases the process of changing the cutting head 2 and/or the at least one blade 12. This is in comparison to if the cutting apparatus only had the left and right main pivots. The pivot axis of the left and right primary pivots 26, 27 are parallel to the pivot axis of the left and right secondary pivots 28,29.

Figure 11:
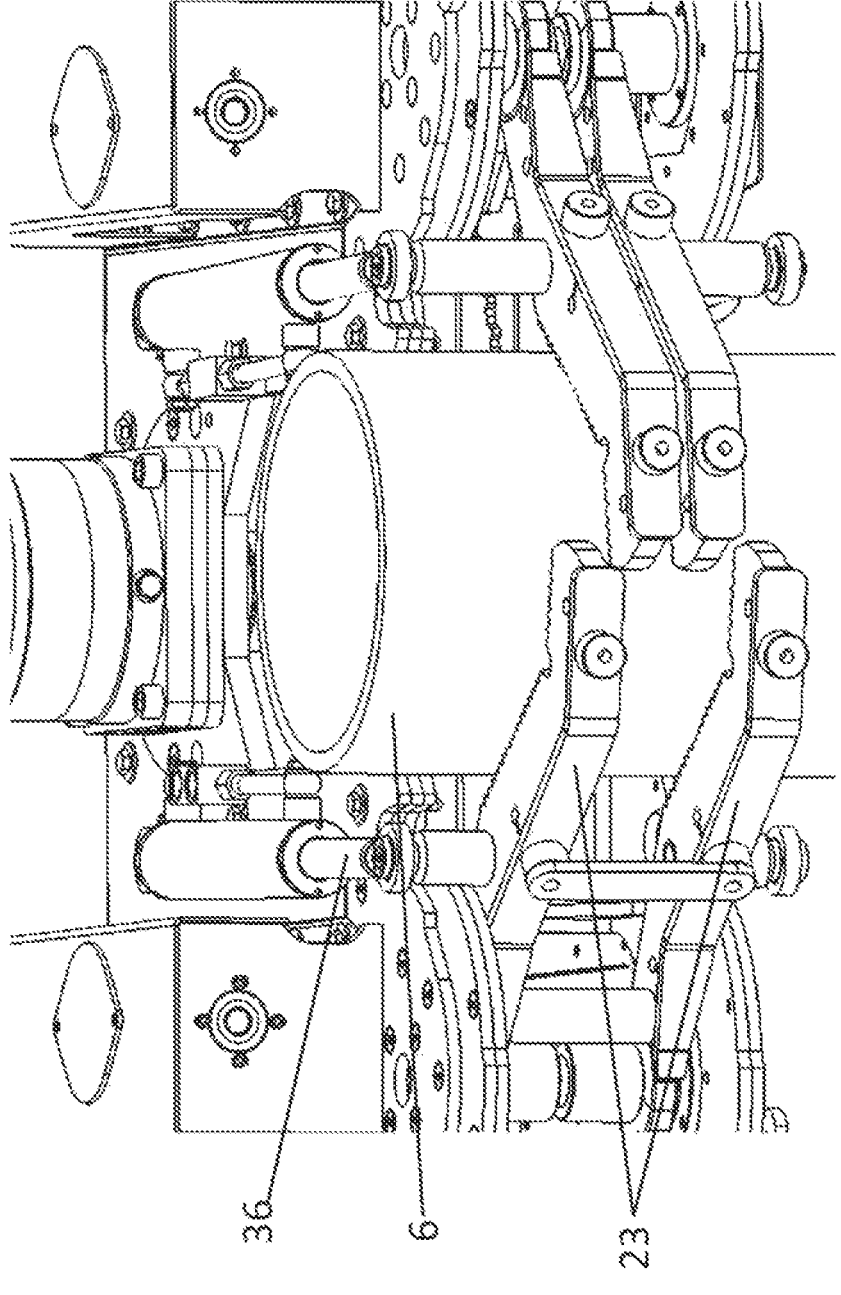
FIG. 11 illustrates a third perspective view of a clamping means according to the present invention.
Figure 12:
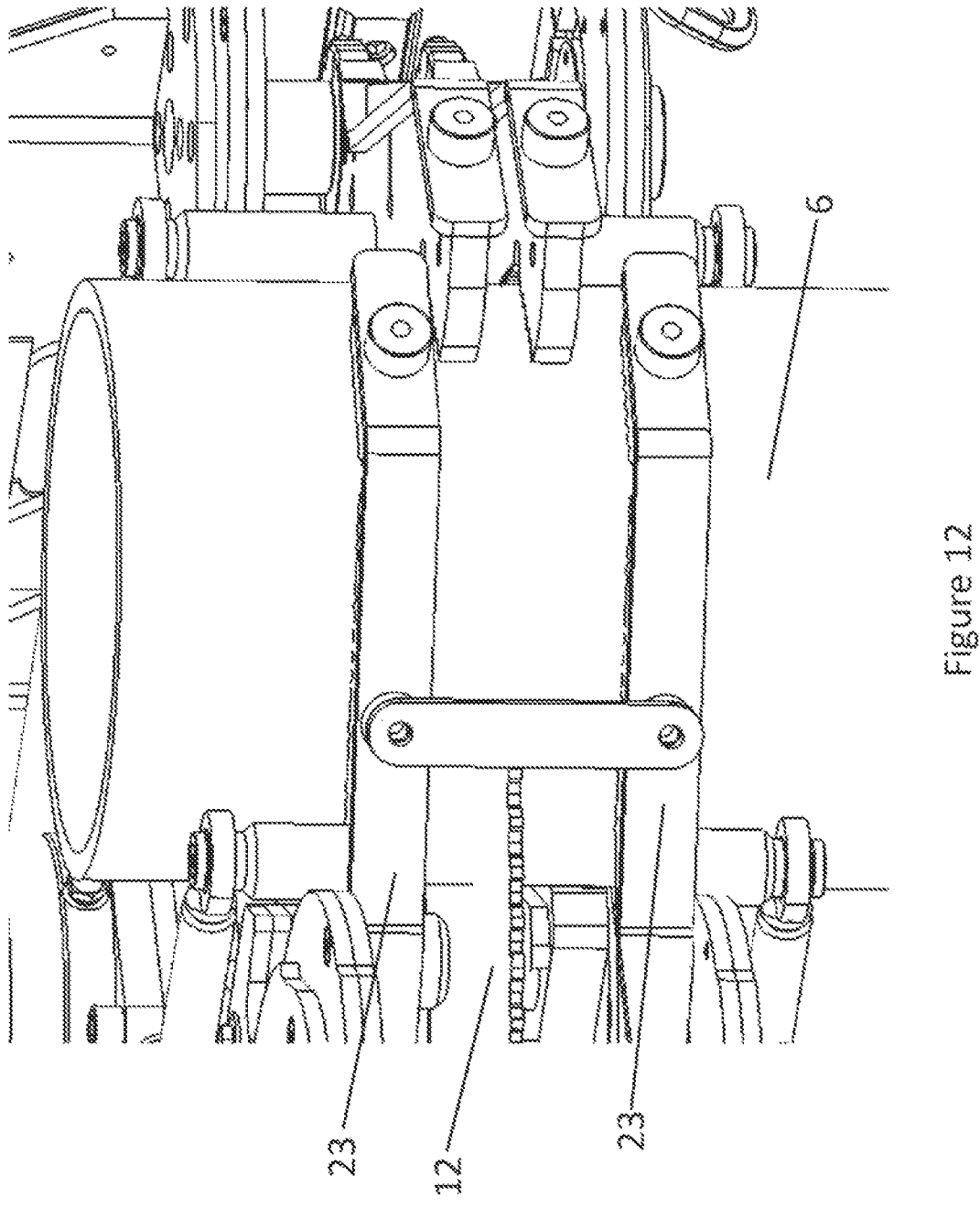
FIG. 12 illustrates a fourth perspective view of a clamping means according to the present invention.

The one or more clamping jaws 23 are locatable mutually opposing to one or more other clamping jaws 23. The one or more clamping jaws 23 supported on the left clamping arm 24 mutually oppose the one or more clamping jaws 23 supported on the right clamping arm 25 and vice versa. The one or more clamping jaws 23 are arrangeable such that in use the one or more clamping jaws 23 interlock around the object to be cut as illustrated in FIGS. 11 and 12. The one or more clamping jaws 23 are arrangeable such that in a clamping position the one or more clamping jaws interlock around the object to be cut. The one or more clamping jaws 23 are arrangeable such that in use, the one or more clamping jaws 23 supported on the left clamping arm 24 and the one or more clamping jaws 23 supported on the right clamping arm 25 do not abut each other. The one or more clamping jaws 23 are arrangeable such that in a clamping position, the one or more clamping jaws 23 supported on the left clamping arm 24 and the one or more clamping jaws 23 supported on the right clamping arm 25 do not abut each other. This prevents the opposing clamping jaws 23 from abutting against one another. Thereby, this enables the cutting apparatus 1 to clamp a wider variety of different sized objects. The smaller the diameter of the object to be clamped, the more interlocked the clamping jaws will be. This is in comparison to mutually opposing clamping jaws which would abut one another at the tips of the jaws when clamping an object below a certain threshold size. The cutting apparatus 1 has an additional clamping apparatus 60. The clamping arrangement 22 has an additional clamping apparatus 60. The additional clamping apparatus 60 has an upper clamping module 30 and a lower clamping module 32. The additional clamping apparatus 60 is releasably attachable to the main frame 13 of the cutting apparatus 1. The additional clamping apparatus 60 is releasably attachable to the non-object engaging portion 19 and/or non-object engaging end 21 of the cutting apparatus 1. The additional clamping apparatus 60 has a main body 61 having an upper portion 62 and a lower portion 63. The upper clamping module 30 is locatable on the upper portion 62 of the additional clamping apparatus 60 and the lower clamping module 32 is locatable on the lower clamping portion 63. The upper clamping module 30 and the lower clamping module 32 extend from the main body 61 of the additional clamping apparatus 60. The additional clamping apparatus 60 is releasably attachable to the cutting apparatus 1 at a substantially central portion of the main body 61 of the additional clamping apparatus 60 and is configurable to releasably attach to the cutting apparatus 1 such that the upper clamping module 30 extends above the one of the structural support members 14 of the cutting apparatus 1 and such that the lower clamping module 32 extends below the other of the structural support members 15. The upper clamping module 30 and lower clamping module 32 are parallel with the two structural support members 14, 15.

The additional clamping apparatus 60 has one or more clamping jaws 23. The upper clamping module 30 and the lower clamping module 32 have a left clamping jaw, indicated as 23a, and a right clamping jaw 23b. The one or more clamping jaws 23 and the one or more clamping module clamping jaws 23/23a/23b may be used interchangeably.

Figure 13:
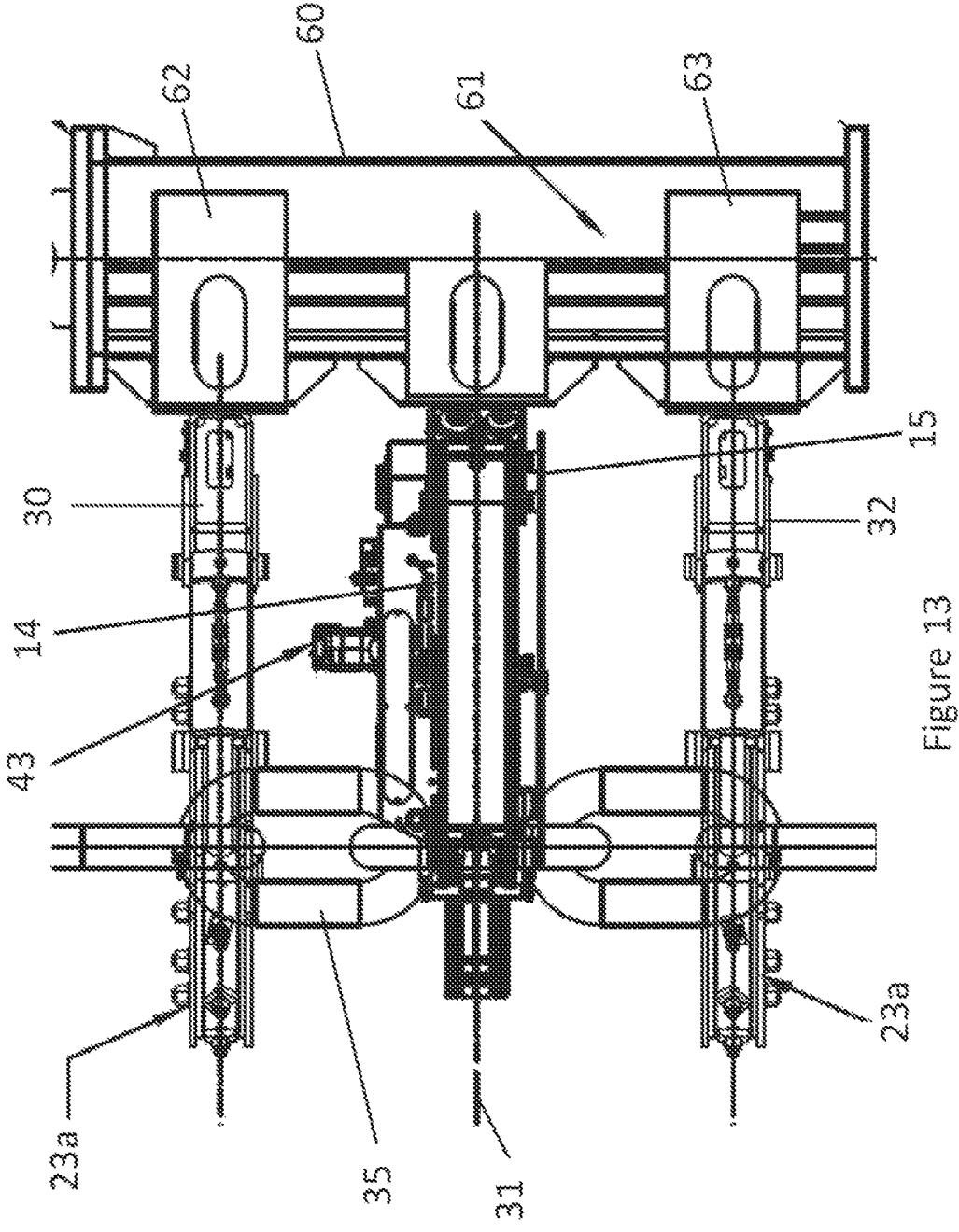
FIG. 13 illustrates a schematic view of a clamping means according to the present invention.
Figure 14:
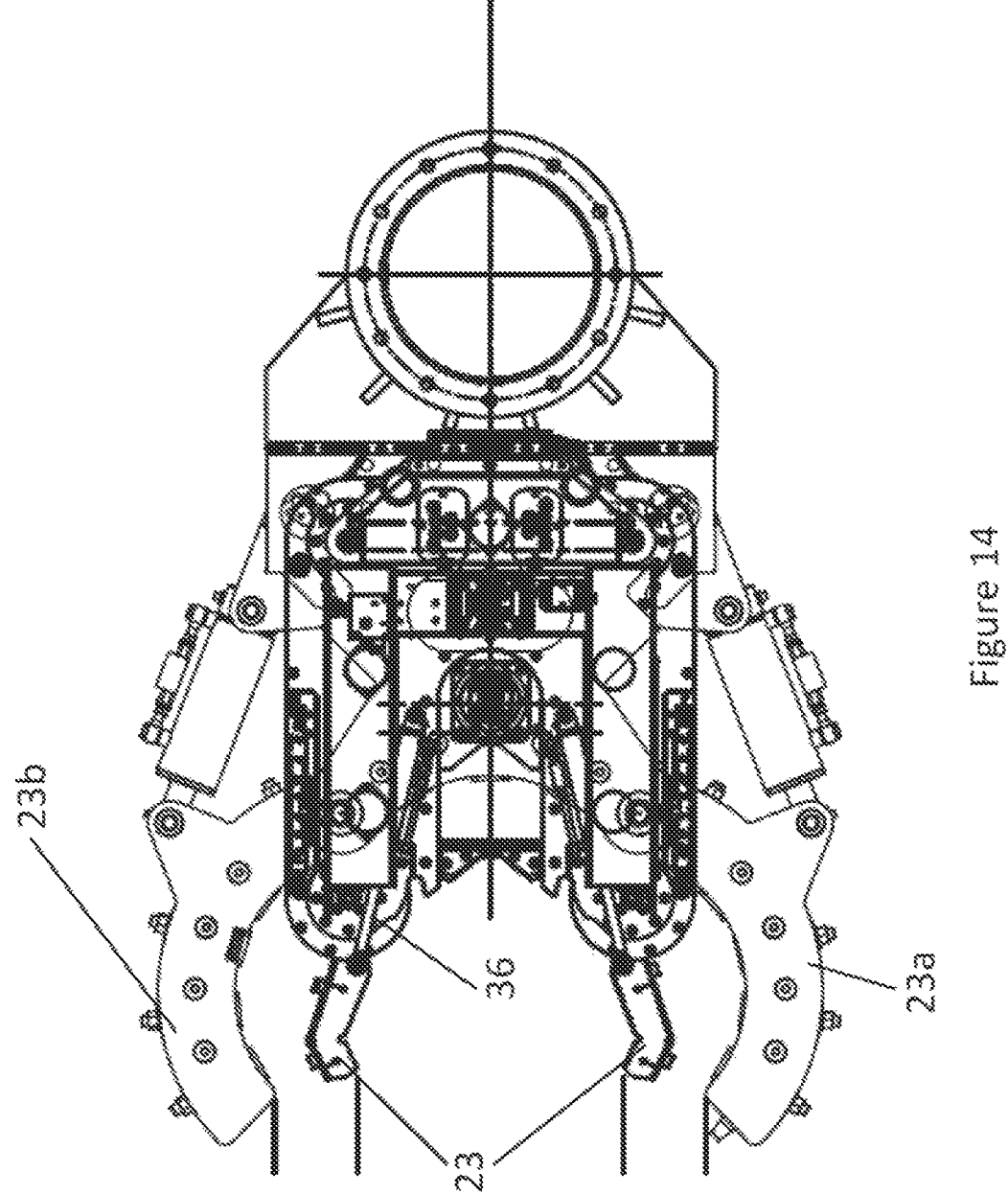
FIG. 14 illustrates a fifth perspective view of a clamping means according to the present invention.

The upper clamping module 30 is configurable to clamp an object above the cut line 31 and the lower clamping module 32 is configurable to clamp an object below the cut line 31, this is illustrated in FIG. 13. By cut line, we mean the planar portion of the object that will be cut. The one or more upper module clamping jaws 23a, 23b and the one or more lower module clamping jaws 32 are configurable to clamp an object 6 above and below the cut line 31 respectively. This creates a tension free zone between the one or more upper module clamping jaws 30 and the one or more lower module clamping jaws 32. This prevents the already cut portion of the object clamping on the at least one blade 12 as it passes through the object. This further enables accurate cutting of objects which may move or sway during cutting such as mooring chain. This is in comparison to a cutting apparatus having clamping jaws above the cut line only or below the cut line only.

The one or more clamping module clamping jaws 23, 23a, 23b are interchangeable. The clamping module left clamping jaws 23a are arrangeable to mutually oppose the clamping module right clamping jaws 23b. The one or more clamping jaws 23, 23a, 23b are configurable to releasably attach to the upper clamping module 30 and/or lower clamping module 32 via mechanical fasteners such as bolts.

The one or more clamping module clamping jaws 23a, 23b have an arcuate portion to clamp mooring chain 35. Ideally, the clamping module left clamping jaw and the clamping module right clamping jaw comprise mutually opposing arcuate portions to clamp opposing portions of mooring chain 35. The one or more clamping module clamping jaws 23a 23b are arrangeable such that in use they interlock with one another.

Figure 15:
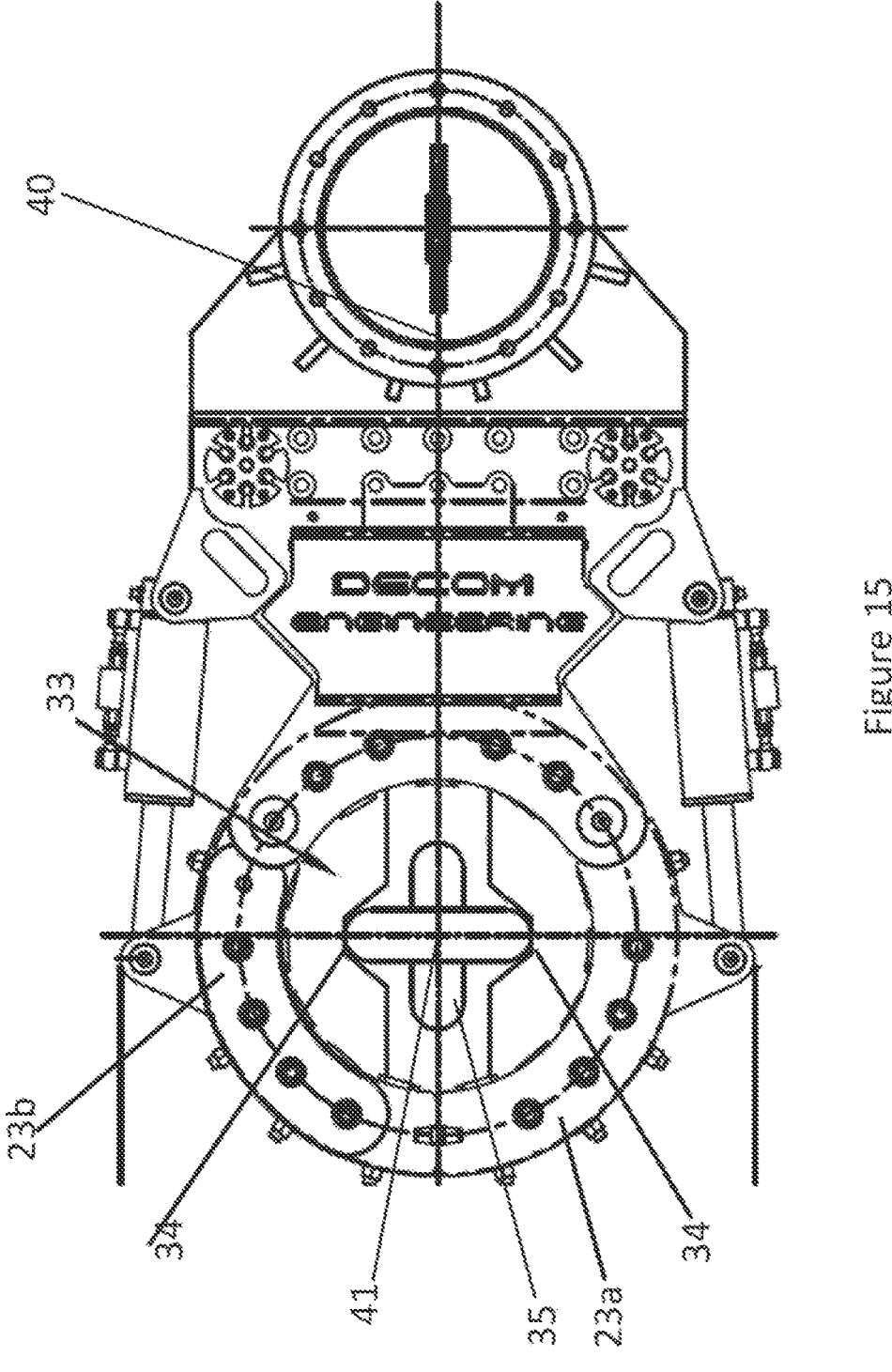
FIG. 15 illustrates a sixth perspective view of a clamping means according to the present invention.
Figure 16:
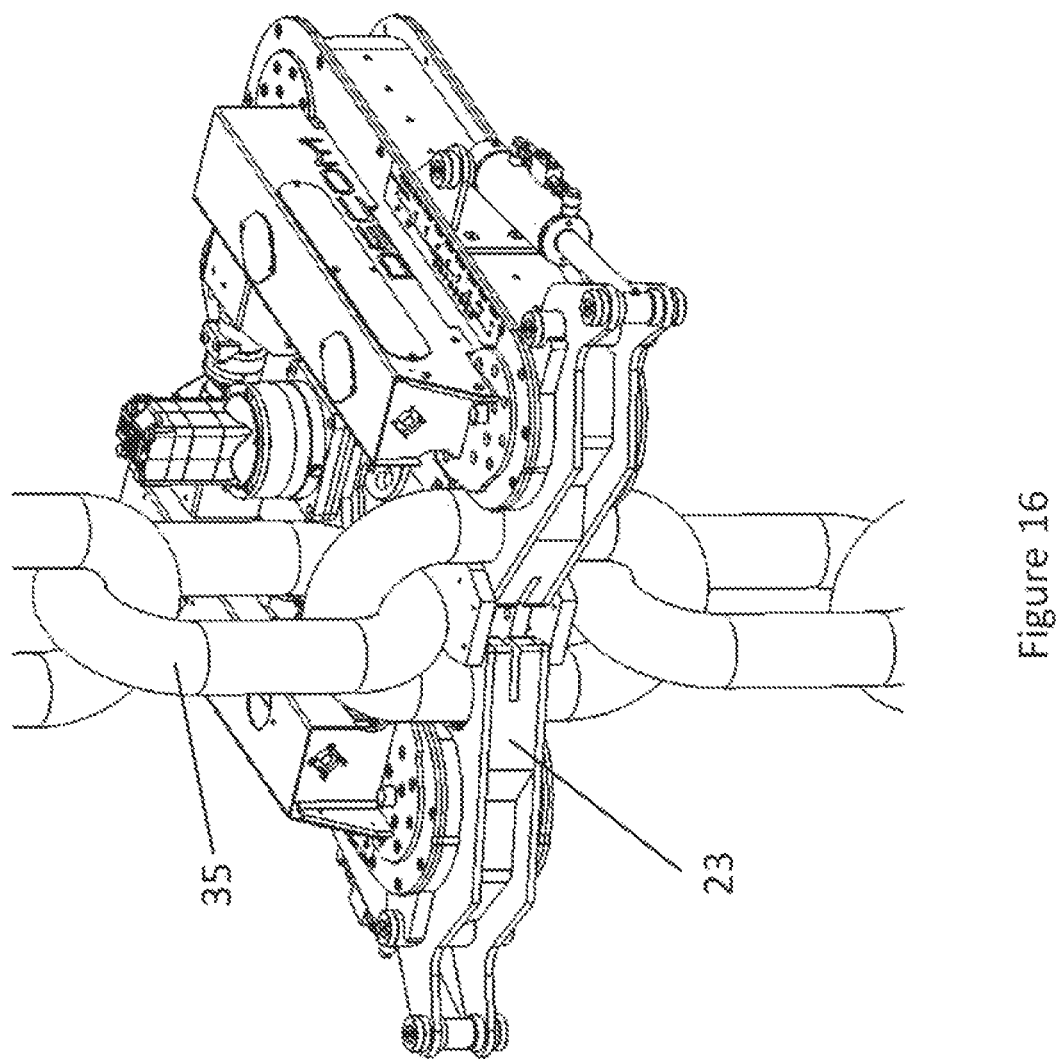
FIG. 16 illustrates a seventh perspective view of a clamping means according to the present invention.
Figure 17:
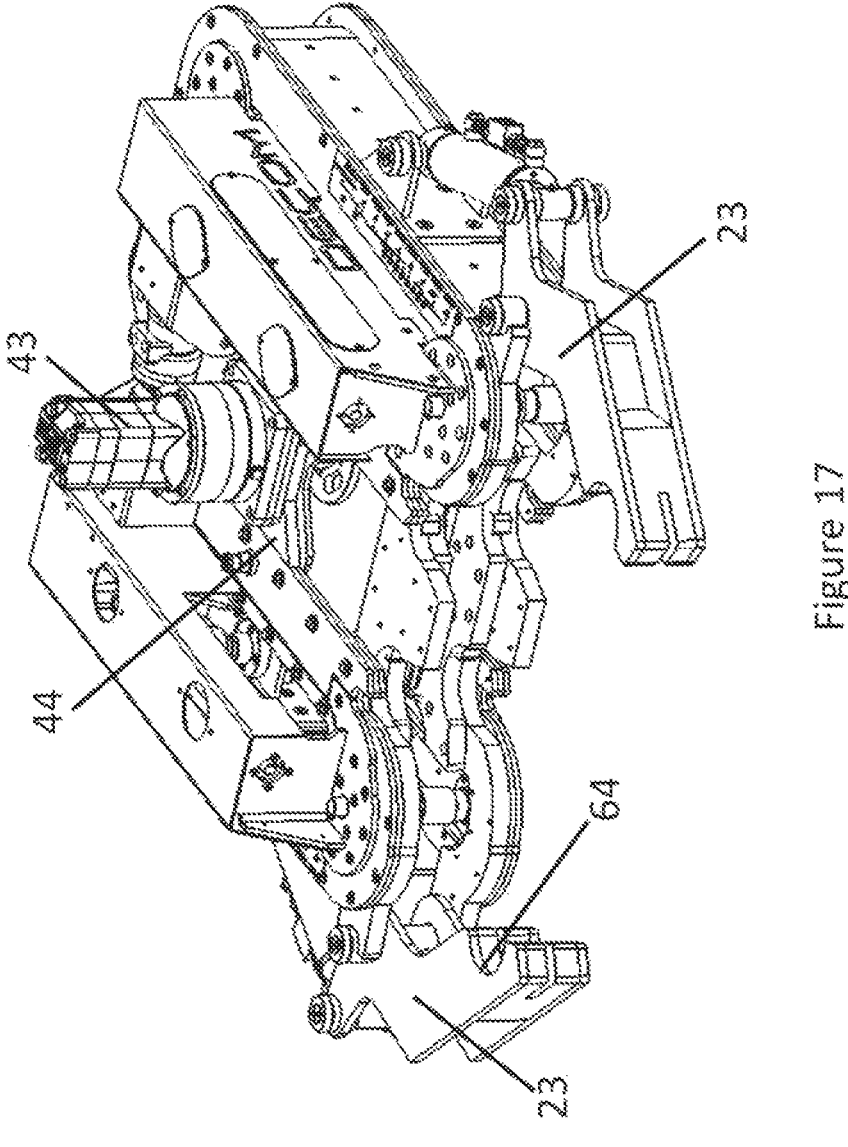
FIG. 17 illustrates an eighth perspective view of a clamping means according to the present invention.

The clamping arrangement 1 has clamp adjustment arrangement to adjust the shape and/or size of the one or more clamping jaws 23, 23a, 23b. This enables a wider variety of objects to be clamped. The clamp adjustment arrangement is removably detachable from the one or more clamping jaws 23, 23a, 23b. The clamp adjustment arrangement is interchangeable. This enables clamp adjustment arrangements of different sizes and/or shape to be interchanged depending on the requirement. This also enables the use of custom clamp adjustment arrangements. The clamp adjustment arrangement is configurable to releasably attach to the one or more clamping jaws 23, 23a, 23b via mechanical fasteners. The clamp adjustments arrangements are shaped and/or sized to correspond to the specific object to be clamped. In the embodiment shown in FIG. 15, the clamp adjustment arrangement 33 has an arcuate portion 34 configurable to clamp mooring chain 35. The clamp adjustment arrangement 33 is releasably attachable to mutually opposing clamping jaws 23, 23a, 23b. Alternatively, the clamping jaws 23 may comprise an arcuate portion for camping mooring chain 35. Custom clamping jaws 23 are arrangeable to compose an arcuate portion for clamping mooring chain. FIGS. 16 and 17 show an embodiment of the one or more clamping jaws 23 having an arcuate portion 64 for clamping mooring chain.

The left clamping arm 24 and right clamping arm 25 are configurable to operate independent of one another. By operate we mean move towards, away from and/or around an object to be clamped. The one or more clamping jaws 23 are configurable to operate independent from one another. The one or more upper clamping jaws 30 and the one or more lower clamping jaws 32 are configurable to operate simultaneously and/or independently from one another. This enables better control over clamping and/or dropping an object that is already clamped. The clamping arrangement is hydraulically, electrically and/or pneumatically operated and/or is operated via any other suitable means. The cutting apparatus 1 has one or more actuators 36 configurable to operate the clamping arrangement 22. The clamping arrangement has one or more actuators 36 configurable to operate the left clamping arm 24 and the right clamping arm 25. The clamping arrangement has one or more actuators 36 configurable to operate the one or more clamping jaws 23. Each actuator 36 is configurable to operate independently from the one or more other actuators 36. The cutting apparatus 1 has a clamp control arrangement to control the clamping arrangement 22. In this embodiment, the one or more actuators 36 are hydraulic actuators such as hydraulic cylinders. The cutting apparatus has hydraulic cylinder pins 51. The cutting apparatus has a clamp pressure control arrangement to control the clamping force of the clamping arrangement 22. The cutting apparatus 1 has a pressure release valve to control clamp pressure of the clamping arrangement 22. The clamping force of the clamping arrangement 22 is adjustable. For example, if the material being cut has the capacity to withstand a high radial load for example carbon pipe with wall thickness in excess of 15 MM the clamping force is set to an nominal hydraulic pressure of 110 Bar. This may be increased depending on the weight of the cutting apparatus and/or blade and the orientation of the cutting apparatus and/or blade during the cut. If materials with a low radial load capacity are required to be cut for example thin wall pipe flow lines or risers to ensure on damage is caused during the clamping process the clamping force needs to be reduced. This adjustment can be completed during pre-cut tests or via a remote pressure control valve configurable to control clamp pressure of the clamping means remotely, if necessary.

The clamp pressure control arrangement has a pressure release valve to control clamp pressure of the clamping arrangement 22. The pressure release valve is configurable to detect the pressure level of the clamping arrangement 22. The pressure release valve is configurable to open in response to the pressure of the clamping arrangement 22 reaching and/or exceeding a pre-set pressure threshold. The pressure release valve is configurable to divert flow away from the clamping arrangement 22 in response to the pressure of the clamping arrangement reaching and/or exceeding a pre-set pressure threshold. This prevents a build-up of pressure of the clamping arrangement. The pressure release valve is configurable to close and/or remain closed when the pressure of the clamping arrangement is below a pre-set pressure threshold. The pressure release valve is configurable to reduce clamping pressure from 210 bar to 10 bar. However, the actuators 36 may also be electrical actuators. The one or more clamping jaws 23 can be formed from one or more materials such as steel, aluminium, polyether ether ketone (PEEK) and/or nylon and/or any other suitable material required for specific applications.

The cutting apparatus has an abutment portion 37 upon which an object being clamped by the one or more clamping jaws 23 abuts against. The clamping arrangement 22 has an abutment portion 37 upon which an object being clamped by the one or more clamping jaws 23 abuts against. The abutment portion 37 is locatable on one or both of the structural support members 14, 15. The abutment portion 37 has a plurality of abutment surfaces 38. The clamping arrangement 22 is configurable to clamp an object adjacent to the object engaging end 20 of the cutting apparatus 1. The abutment portion 37 is locatable on the object engaging end 20 of the cutting apparatus. The left clamping arm 24 is locatable on one lateral side 7 of the cutting apparatus and the right clamping arm is locatable on another lateral side 7 of the cutting apparatus. The left clamping arm 24 and the night clamping arm 25 are locatable on opposing lateral sides 7 of the cutting apparatus. The one or more actuators 36 of the clamping arrangement 22 are locatable on a lateral side 7 of the cutting apparatus. Two or more actuators 36 of the clamping arrangement 22 are locatable on opposing lateral sides 7 of the cutting apparatus relative to each other The one or more actuators 36 of the clamping arrangement 22 are configurable to extend from the non-object engaging portion 19 of the cutting apparatus towards the clamping arrangement 22 on the lateral sides 7 of the cutting apparatus, at or about the object engaging portion 18 of the cutting apparatus.

Figure 9:
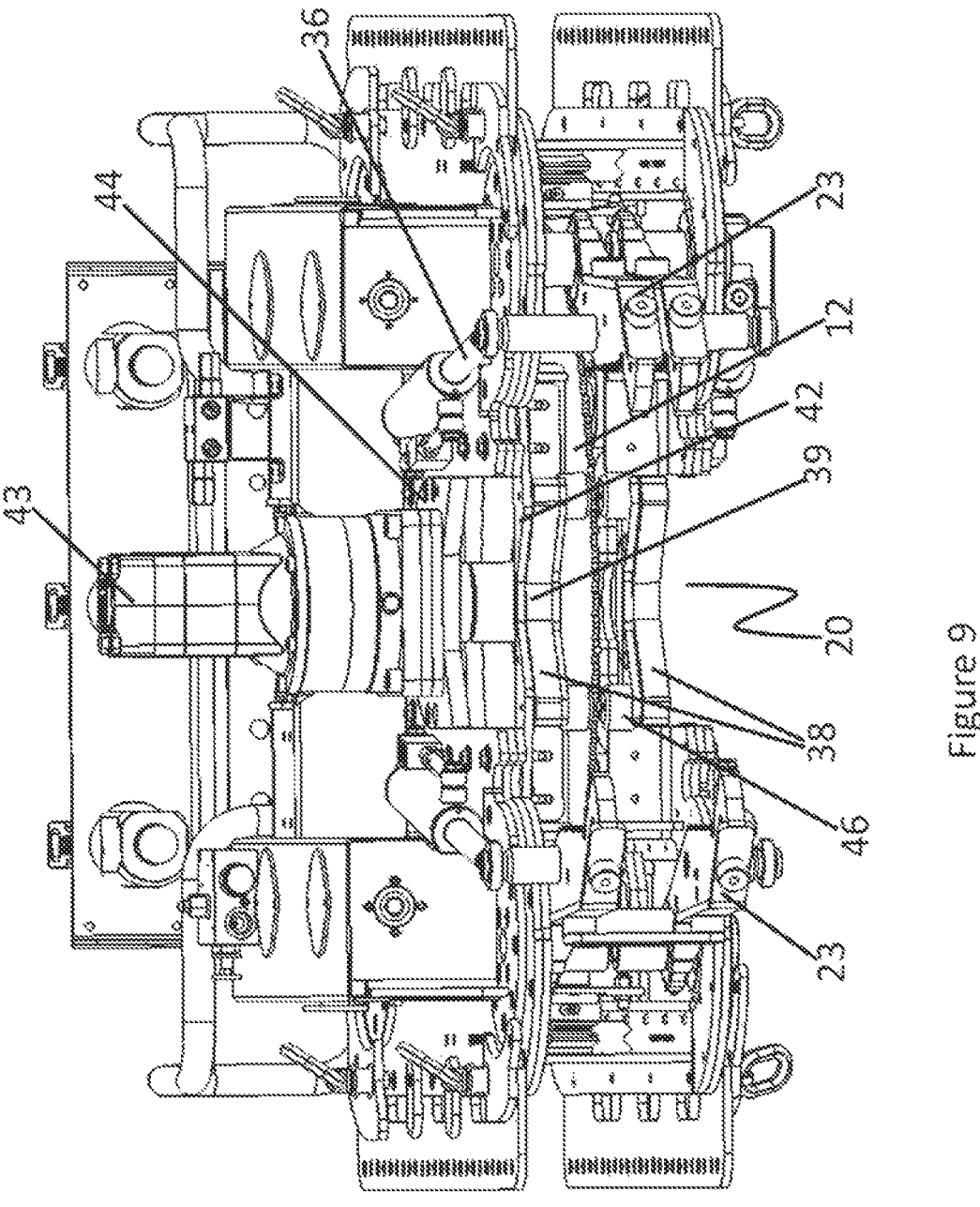
FIG. 9 illustrates a sixth perspective view of a cutting apparatus according to the present invention.
Figure 10:
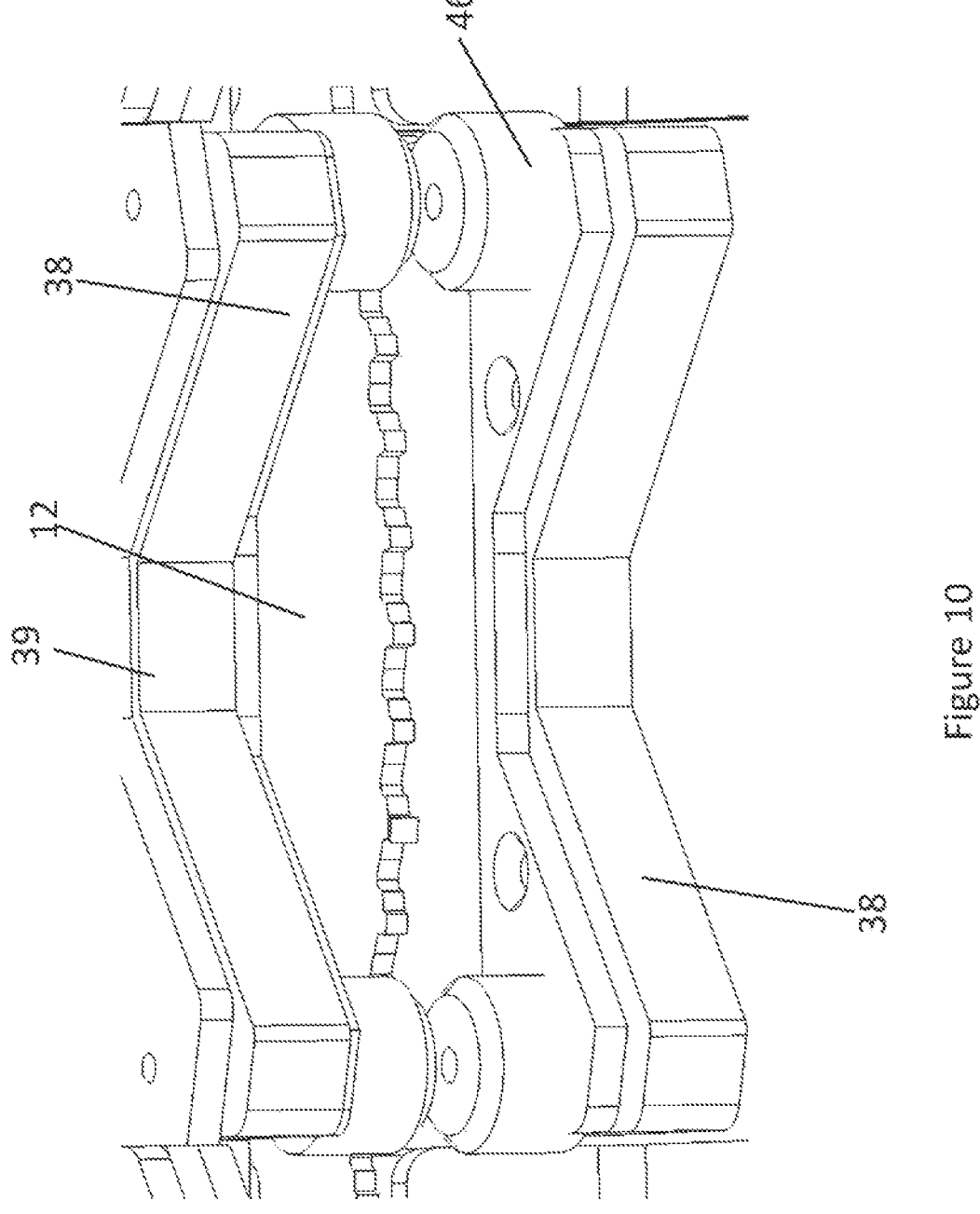
FIG. 10 illustrates a perspective view of an abutment portion according to the present invention.
Figure 28:
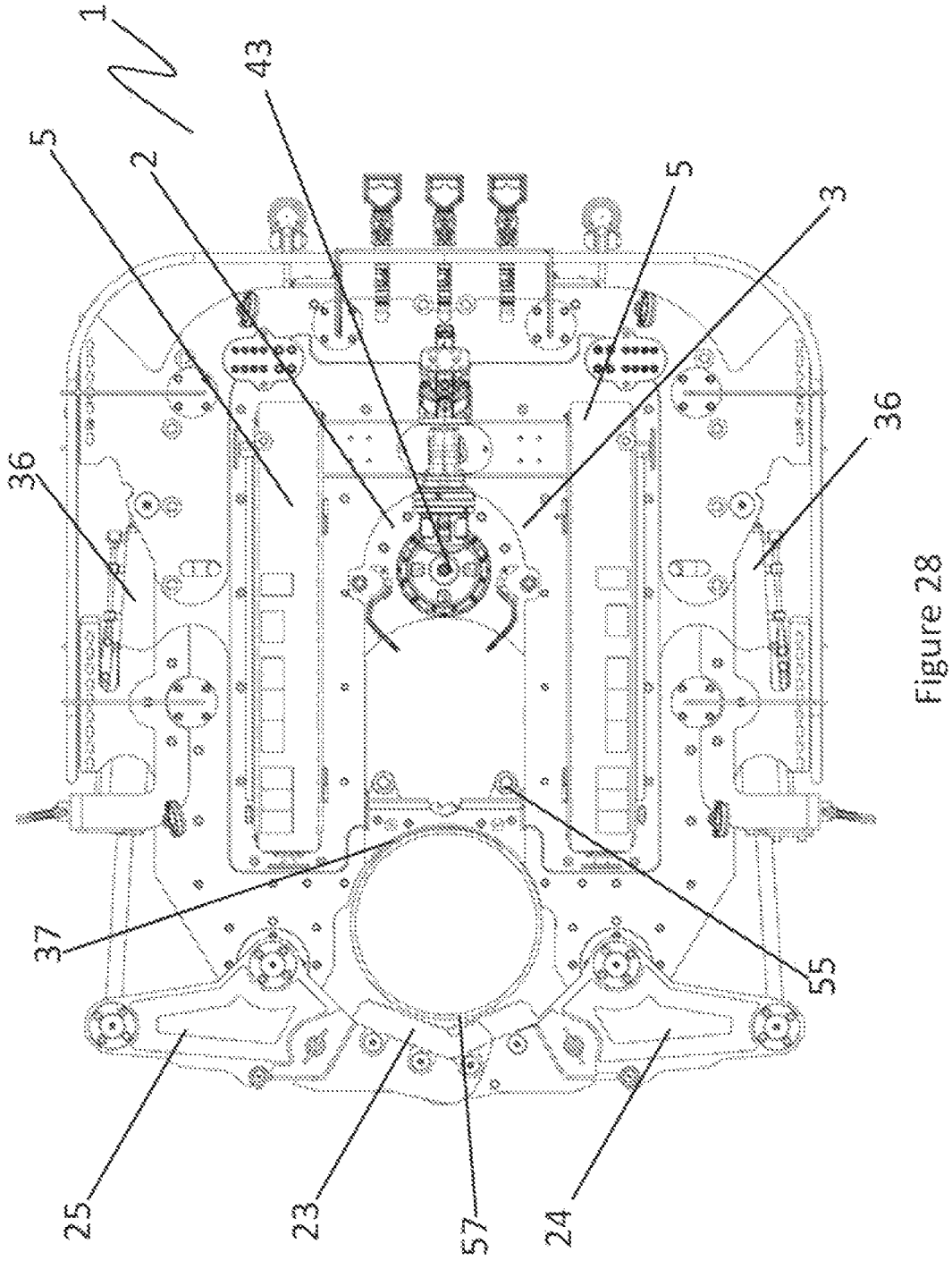
FIG. 28 is an orthogonal view of the cutting apparatus clamping a pipe.
Figure 29:
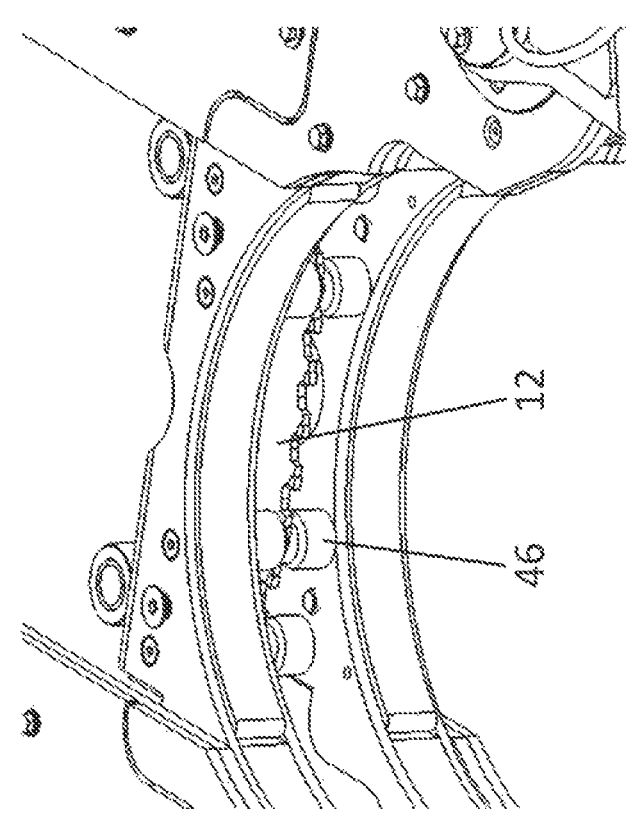
FIG. 29 is a second perspective view of the cutting apparatus from the object engaging end.
Figure 31:
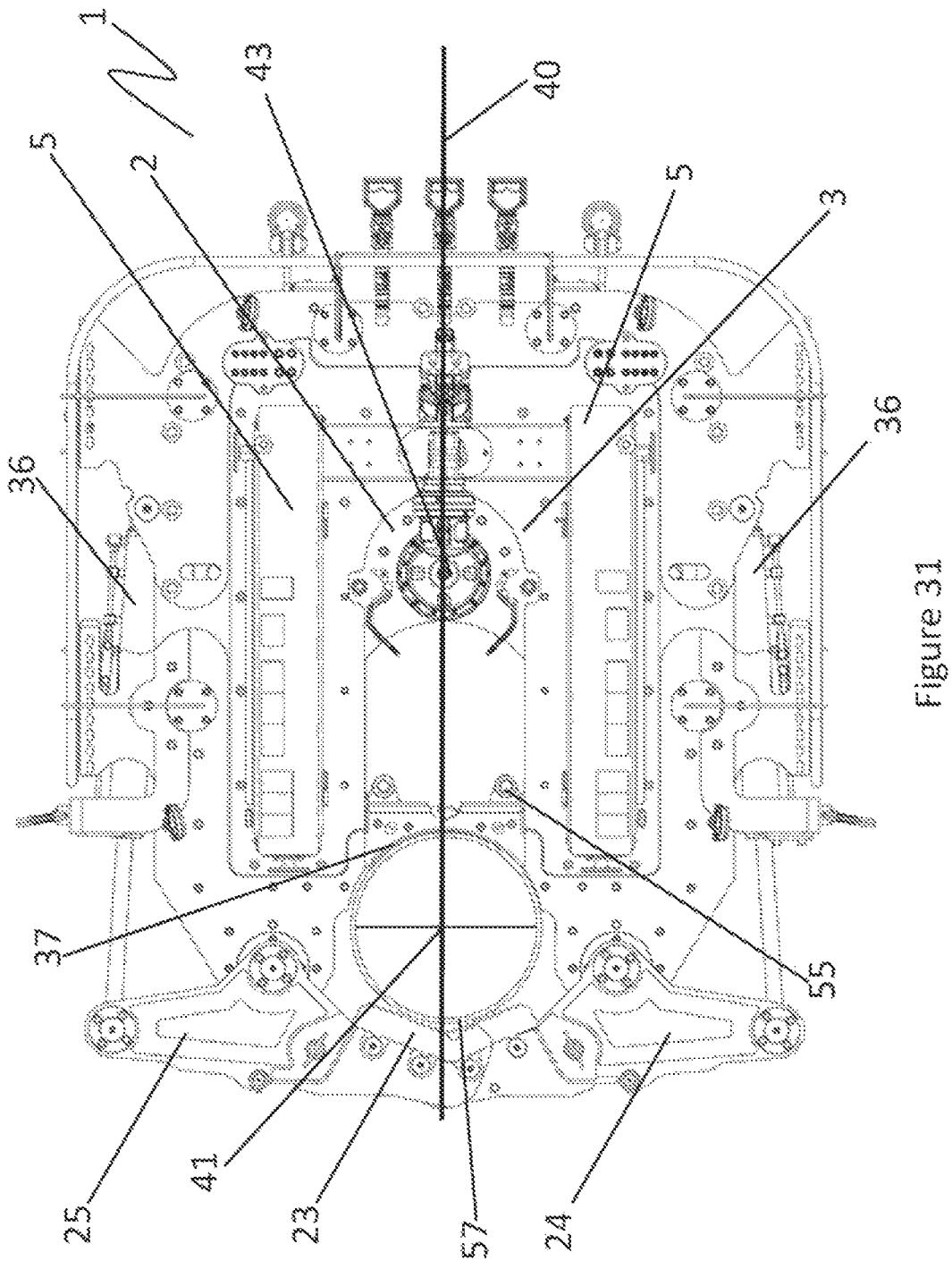
FIG. 31 is a second orthogonal view of the cutting apparatus clamping a pipe.
Figure 38:
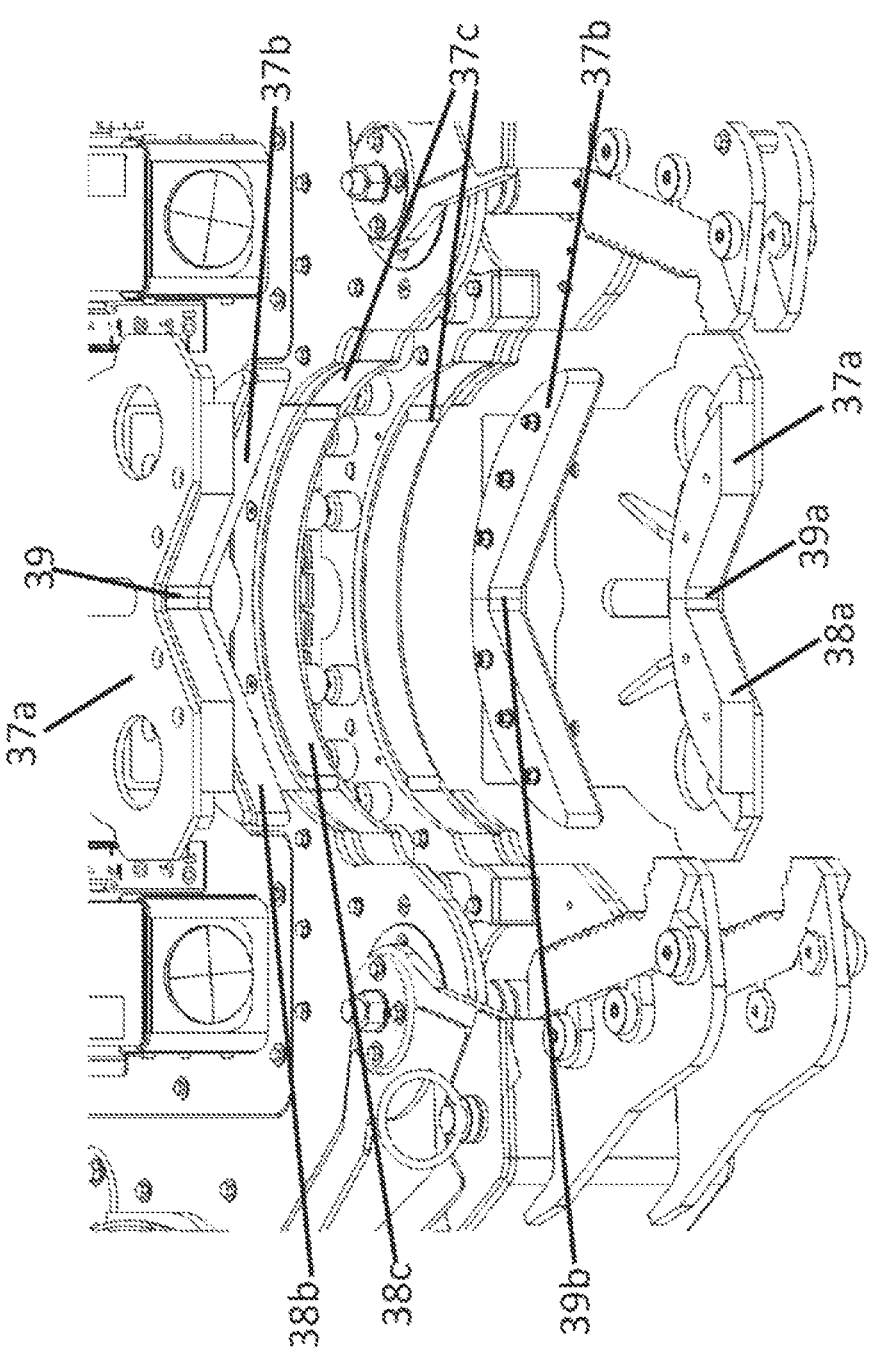
FIG. 38 is a perspective view illustrating a variety of abutment portion arrangements.

The one or more actuators 36 of the clamping arrangement 22 are configurable to extend from the non-object engaging portion 19 of the cutting apparatus towards the clamping arrangement 22 on the lateral sides 7 of the cutting apparatus, at or about the object engaging portion 18 of the cutting apparatus between the two spaced apart structural supports 14, 15 of the cutting apparatus. In the embodiment shown in FIGS. 9 and 10, the abutment portion 37 is tapered. The abutment portion 37 tapers to a central portion 39 of the abutment portion 37. One or more abutment surfaces 38 taper towards a central portion 39 of the abutment portion 37. However, the abutment portion 37 may also be arcuate shaped to correspond to an arcuate object to be cut such as a pipe. The abutment portion 37 is configurable to position an object uniformly in place such that the linear axis of travel of the at least one blade 40 passes through the central axis 41 of the object 6, 57 to be cut, as illustrated in FIGS. 15 and 31. The abutment portion 37 is configurable to position an object uniformly in place such that the central axis of the at least one blade is in alignment with the central axis of the object to be cut. The abutment portion 37 is configurable to position an object uniformly in place such that the linear axis of travel of the at least one blade is perpendicular to the central axis of the object to be cut. The abutment portion is configurable to position an object uniformly in place such that the leading edge of the at least one blade first intersects the object to be cut on a portion of the object that is parallel to the central axis of the object and the central axis of the at least one blade. This prevents non-uniform forces and/or non-uniform resistance being applied to the at least one blade 12. The abutment portion 37 has a releasably attachable Vee block assembly 42. The abutment portion 37 is a releasably attachable Vee block assembly. This means that a variety of different sized objects can be clamped. The larger the object or its diameter, the closer to the open end of the tapered abutment portion 37 it will abut against. The smaller the object or its diameter, the closer to the closed tapered end of the abutment portion it will abut against. This is in comparison to the abutment portion being flat or arched. The releasable attachment of the Vee-block assembly 42 also improves the case of removing all or some of the cutting head 2 past the object engaging end 20 of the cutting apparatus during changing. The releasably attachable Vee block assembly 42 is attached to the abutment portion via mechanical fasteners and/or via any other means suitable. The clamping arrangement 22 is configurable to clamp an object between the one or more clamping jaws 23 and the abutment portion 37. FIG. 28 illustrates an embodiment of the cutting apparatus 1 clamping a pipe 57. The cutting apparatus 1 has an abutment portion 37. In this embodiment, the abutment portion is arcuate shaped to correspond to the shape of the pipe 57 being clamped. FIG. 38 illustrates further embodiments of abutment portions 37a, 37b, 37c which can be utilised depending on the size of the object to be cut. For example, abutment portion arrangement 37a has a top abutment portion and a bottom abutment portion which may be used for objects having a diameter of 0-10", for example. Abutment portion arrangement 37b has a top abutment portion and a bottom abutment portion which be used for objects having a diameter of 10-22", for example. Abutment portion arrangement 37c has a top abutment portion and a bottom abutment portion which may be used for objects having a diameter of 22-24". The abutment portion arrangement is more arcuate shaped than the abutment portions 37a and 37b which enables it to be used with objects having larger diameters. The abutment portions 37a and 37b taper to a point which enable these abutment portion arrangements to be used over a variety of different sized object. The larger the object or its diameter, the closer to the tapered point of the abutment portion 37a and 37b it will be held/clamped. One or more of the abutment surfaces 38 of each embodiment 37a, 37b, 37c are referenced respectively as 38a, 38b, 38c, the central tapered portion 39 of embodiments 37a and 37b are also referenced respectively 39a, 39b.

In this embodiment, the mounting plate 44 has an abutment portion 45 shaped and sized to correspond to the clamping arrangement abutment portion 37. This enables the mounting plate 44 of the cutting head 2 to move right up to and/or to contact the object to be cut. This thereby increases the distance over which the cutting head can travel towards the object to be cut. Thereby this also enables the at least one blade to cut further through the object to be cut. This further ensures correct positioning of the object to be cut relative to the at least one blade.

The at least one blade 12 is disposed between the two spaced apart structural support members 14, 15 and is configurable to move between the two spaced apart structural support members 14, 15 towards and/or away from an object to be cut. The at least one blade 12 is configurable to move between the two spaced apart structural support members 14, 15 and through the object engaging end 20 of the cutting apparatus. The at least one blade 12 is configurable to move between the two spaced apart structural support members 14, 15 and through the object engaging end 20 of the cutting apparatus towards and/or away from an object to be cut.

Referring to FIGS. 25 and 36, the means for interchanging the cutting arrangement drive arrangement 100 will be described. The at least one blade 12 is removable from the cutting apparatus 1 and/or cutting head 2 and/or spindle 52 by opening the clamping arrangement 22, removing the at least one blade 12 from the cutting head 2 and/or spindle 52 (washer 72) to which it is attached by removing any fastening arrangements and sliding the at least one blade 12 between the two spaced apart structural support members 14, 15 and out through the object engaging end 20. The at least one blade 12 is attached to the cutting apparatus 1 and/or mounting plate 44 of the cutting head 2 and/or spindle by opening the clamping arrangement 22, sliding the at least one blade 12 into the object engaging end 20 and between the two spaced apart structural support members 14, 15 and attaching the blade 12 to the mounting plate 44 of the cutting head 2 and/or spindle 52 (washer 72) using fastening arrangements if necessary. By opening the clamping arrangement, we mean pivoting the clamping arms 24, 25 and/or jaws 23 outwards. away from the object engaging portion of the cutting apparatus 1 and towards the lateral edges of the cutting apparatus 1. For example, pivoting the right clamping arm 25, including any jaws 23 and/or other attachments attached to the right clamping arm, as far to the right as is necessary/possible and pivoting the left clamping arm 24, including any jaws 23 and/or other attachments attached to the left clamping arm, as far to the left as is necessary/possible. The interchangeable blades are changed by removing the blade 12 attached to the cutting apparatus 1 and/or cutting head 2 and/or motor spindle washer 72 and attaching a new/different blade to the cutting apparatus and/or cutting head and/or motor spindle washer 72 as previously described.

The at least one blade motor 43 and/or spindle assembly 52 is removed from the cutting apparatus 1 and/or mounting plate 44 of the cutting head 2 by removing/unfastening the fastening arrangements attaching the blade motor 43 and/or spindle assembly 52 to the cutting apparatus 1 and/or mounting plate 44 and/or adapter plate 74 and sliding the blade motor output shaft 71 out of the spindle 52. The adapter plates and/or flanges 74 enable the motor to be mounted to universal mounting plate 44. The at least one blade motor 43 and/or spindle 52 is attached to the cutting apparatus 1 and/or mounting plate 44 and/or adapter plate 74 by sliding the blade motor output shaft 71 into the spindle 52 (if necessary) and attaching it thereto and securing the blade motor 43 and/or spindle 52 to the cutting apparatus 1 and/or mounting plate 44 and/or or adapter plate 74 of the cutting head 2 using fastening arrangements. Interchangeable blade motors are changed by removing the blade motor 43 and/or spindle assembly 52 attached to the cutting apparatus 1, mounting plate 44 and/or adapter plate 74 and/or spindle 52 (if this is not removed with the blade motor) and attaching a new blade motor 43 to the cutting apparatus 1, mounting plate 44 and/or adapter plate 74 and/or spindle 52 (if this is not integral to the blade motor).

The cutting arrangement drive arrangement 100 may be interchanged by opening the camping arrangement 22, detaching the abutment portion 37 and/or Vee-block assembly 42, removing the mechanical fasteners and/or any other arrangements suitable for attaching the cutting head 2 to the cutting head attachment arrangement 3 and sliding the one or more parts of the cutting arrangement drive arrangement attached to the cutting head mounting plate 44 such as a blade 12 and/or blade motor 43 and/or any mechanical fasteners 54, washers and/or flanges and/or adapter plate 72, 73, 74) between the two spaced apart structural support members 14. 15 and out through the object engaging end 20. One or more parts of the cutting arrangement drive arrangement 100 is attached to the cutting apparatus 1 and/or mounting plate 44 and/or cutting head attachment arrangement 2 by opening the clamping arrangement 22, detaching the abutment portion 37 and/or Vee-block assembly 42, sliding the cutting head 2 into the object engaging end 20 and between the two spaced apart structural support members 14, 15 and attaching the one or more parts to the cutting apparatus 1 and/or cutting head attachment arrangement 3 and/or mounting plate using fastening arrangements if necessary and reattaching the abutment portion 37 and/or Vee-block assembly 42. The entire cutting head may also be interchanged by performing the same steps by detaching the mounting plate 44 from the cutting head attachment arrangement 3 and sliding the mounting plate 44 and its attachments out through the object engaging end. The same or new mounting plate 44 having a different cutting head configuration can be attached or reattached by sliding the mounting plate through the object engaging end and reattaching the mounting plate 44 to the cutting head attachment arrangement 3. Interchangeable cutting heads are changed by removing the cutting head 2 attached to the cutting apparatus 1 and/or cutting head attachment arrangement 2 and attaching a new/different cutting head 2 to the cutting apparatus 1 and/or cutting head attachment arrangement 3 as previously described.

The cutting apparatus has a number of washers/flanges and/or adapter plates 72, 73, 74 and/or other suitable arrangement configurable to releasably connect the blade motor 43, blade 12, spindle 52 and/or mounting plate 44 to one another. The washers/flanges 72, 73, 74 may be integral to the blade motor 43, blade 12, spindle 52 and/or mounting plate 44 or may be separate components.

Figure 32:
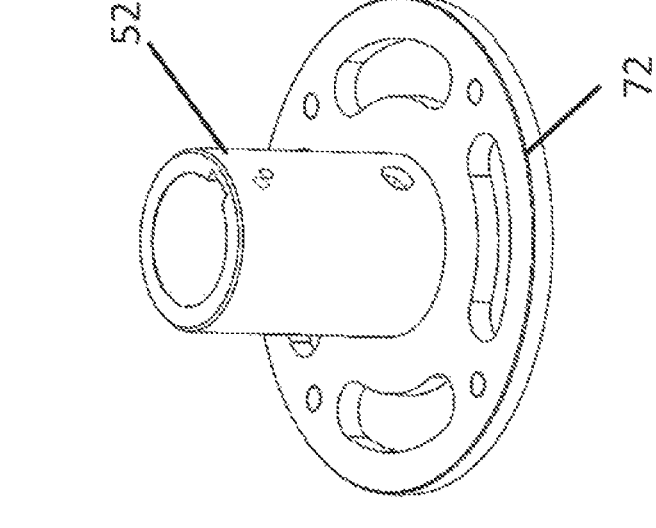
FIG. 32 is a perspective view of one embodiment of a blade motor and associated spindle.
Figure 32:
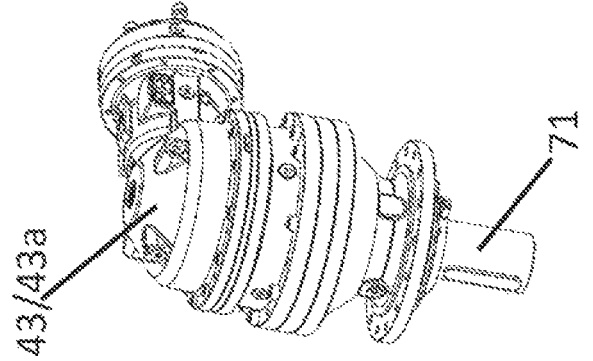
Figure 42:
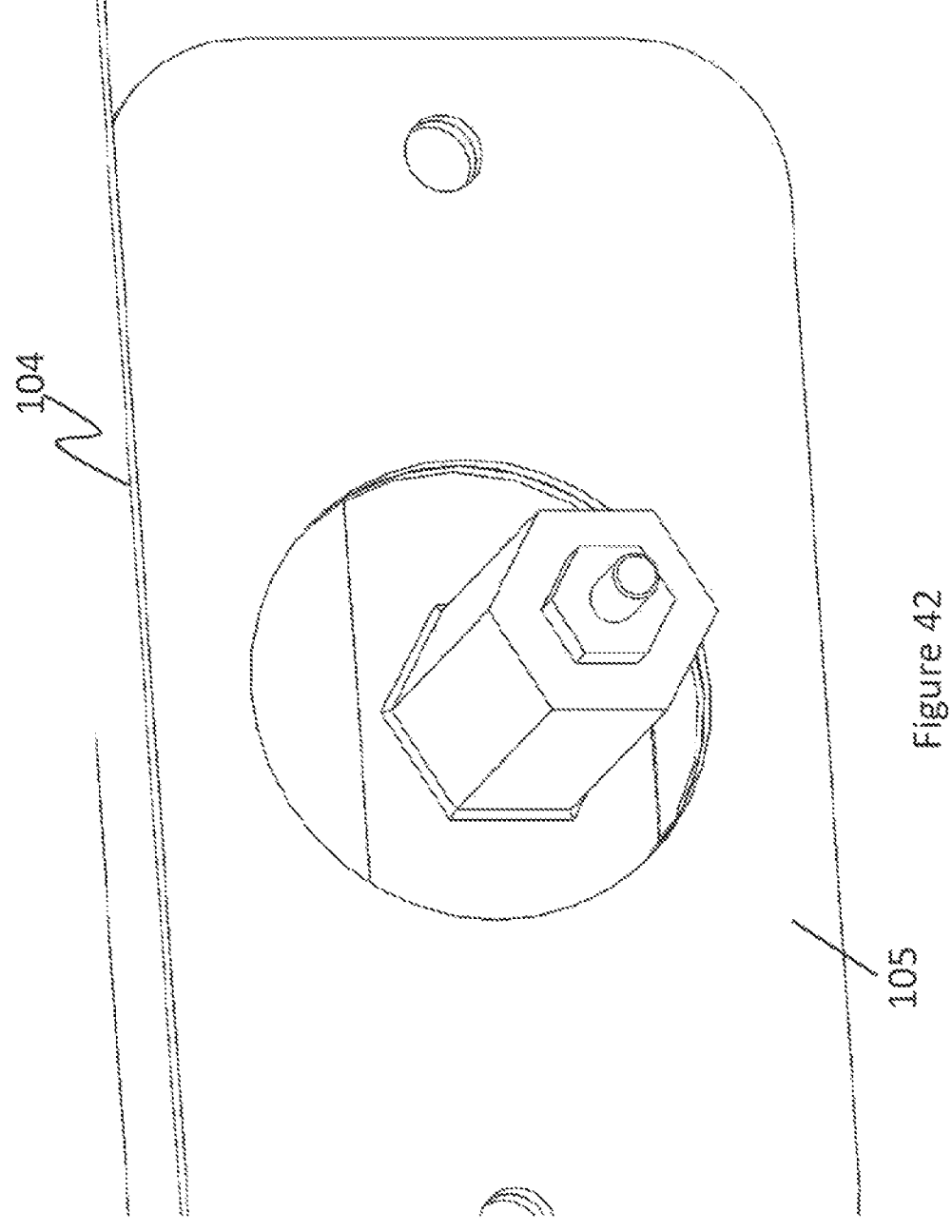
FIG. 42 is a perspective view of an embodiment of a pressure control valve according to the present invention.

The cutting apparatus 1 has a stalling arrangement 104, to prevent the at least one blade 12 becoming stuck or damaged during use. The stalling arrangement 104 is configurable to stall the linear drive motor 8 and/or the blade motor 43. The stalling arrangement is configurable to prevent motion and/or rotation of the at least one blade 12. The stalling arrangement is configurable to prevent advancement of the cutting head 2. The stalling arrangement has one of more sensors. The stalling arrangement has one or more pressure, torque, load and/or current sensors configurable to measure the pressure, torque, load and/or current in the dove motor 8 and/or the blade motor 43 and detect when this pressure, torque, load and/or current exceeds a pre-set pressure, torque, load and/or current threshold and/or when the pressure, torque, load and/or current is within a pre-set parameter. The stalling arrangement is configurable to send an output signal to a corresponding flow control valve to trigger the flow control valve to reduce and/or shut off flow to the drive motor 8 and/or blade motor 43 based on the detected level of pressure, torque, load and or current. The stalling arrangement may also have any other type of sensor configurable to detect when the load on the drive motor 8 and/or blade motor 43 is higher than the output of the drive motor 8 and/or blade motor 43 respectively. The stalling arrangement is configurable to reduce and/or prevent rotation of the at least one blade 12 which subsequently prevents further cutting of the at least one blade 12 through the object being cut which subsequently prevents advancement of the cutting head attachment arrangement 3 and/or the cutting head 2. The stalling arrangement also prevents rotation of the at least one blade 12 before the blade, motors and/or structural components become snagged or stuck or damaged. The blade motor 43 may be a bent axis motor as illustrated in FIG. 32. The stalling arrangement is configured to stall the linear drive motor 8 based on the pressure from the blade motor 43. The stalling arrangement 104 has a valve 105, illustrated in FIG. 42, most preferably a pilot pressure control valve. The stalling arrangement 104 is configured to stall the linear drive arrangement 4 and/or linear motor 8 upon pressure in the valve reaching a pre-determined threshold. Pressure in the valve will increase as pressure from the blade motor 43 increases and/or as torque increases. This prevents continuous advancement of the blade 12 when the pressure in the valve and/or from the blade 12 and/or torque exceed a pre-set pressure threshold.

The cutting apparatus has one or more blade guides 46 which define a virtual plane for the leading edge portion of the at least one blade 12 through which the at least one blade is guided. This prevents misalignments and or bending of the blade. The cutting apparatus 1 has a plurality of blade guides 46. The one or more blade guides 46 are locatable on the one or both of the structural support members 14, 15. The one or more blade guides 46 are locatable on mutually opposing surfaces of the two spaced apart structural support members 14, 15. The one or more blade guides 46 are mutually opposing relative to another of the one or more blade guides 46. The cutting apparatus 1 has one or more blade supports 55. The one or more blade supports 55 have upper and lower steel supports with nylon inserts. The one or more blade supports 55 are adjustable so that they make contact with the upper and lower face of the blade 12. The one or more blade supports 55 are locatable in different positions depending on the blade diameter and blade weight, in this embodiment the one or more blade supports 55 are locatable along the diameter of the blade 12.

Figure 3:
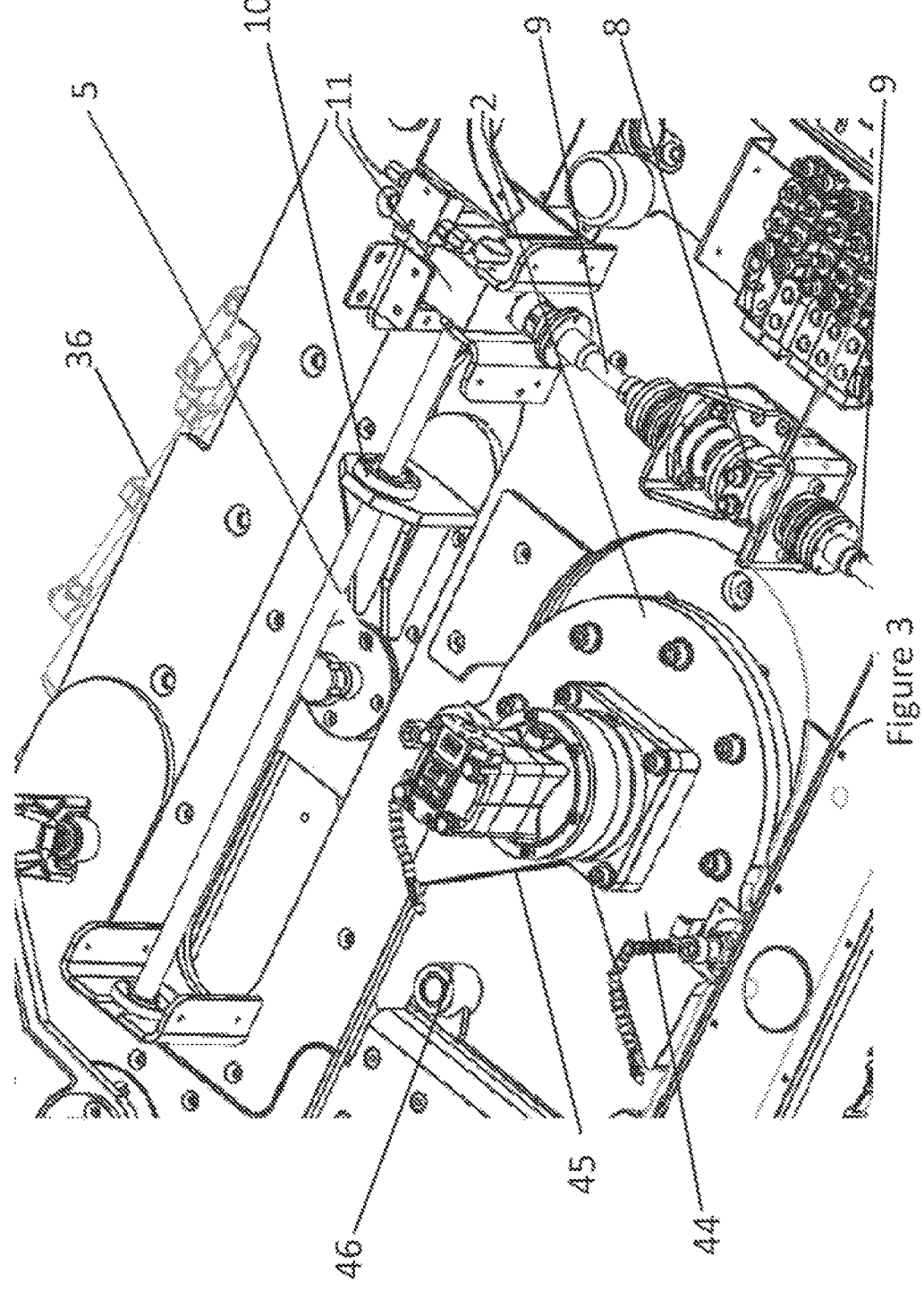
FIG. 3 illustrates a third perspective view of a cutting apparatus according to the present invention.
Figure 18:
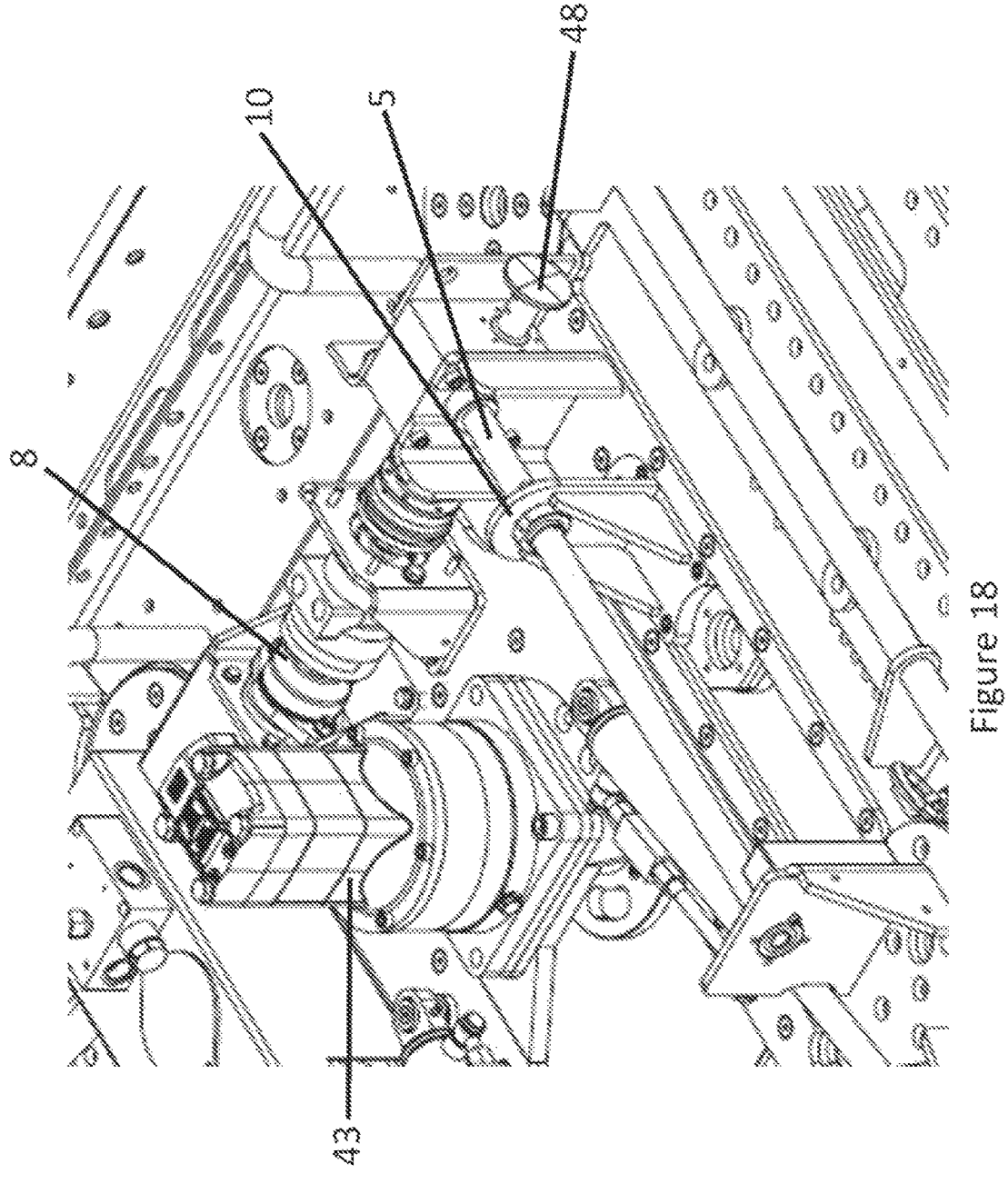
FIG. 18 illustrates a seventh perspective view of a cutting apparatus according to the present invention.
Figure 19:
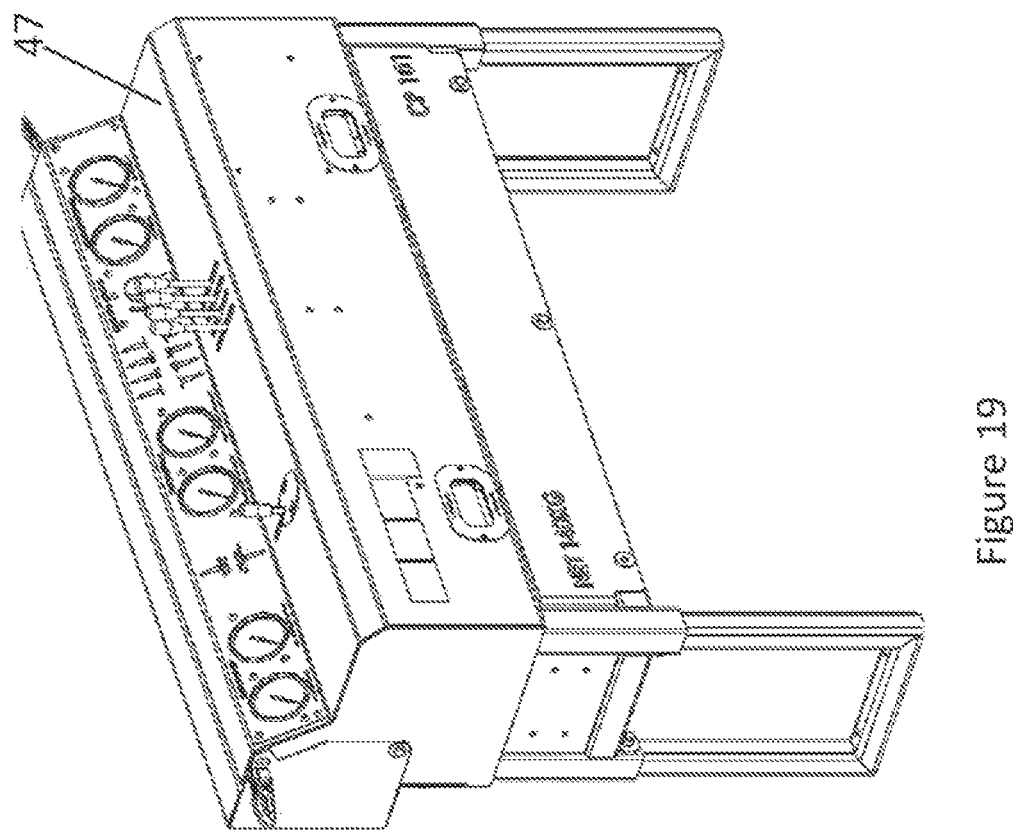
FIG. 19 illustrates a perspective view of a remote-control panel according to the present invention.
Figure 20:
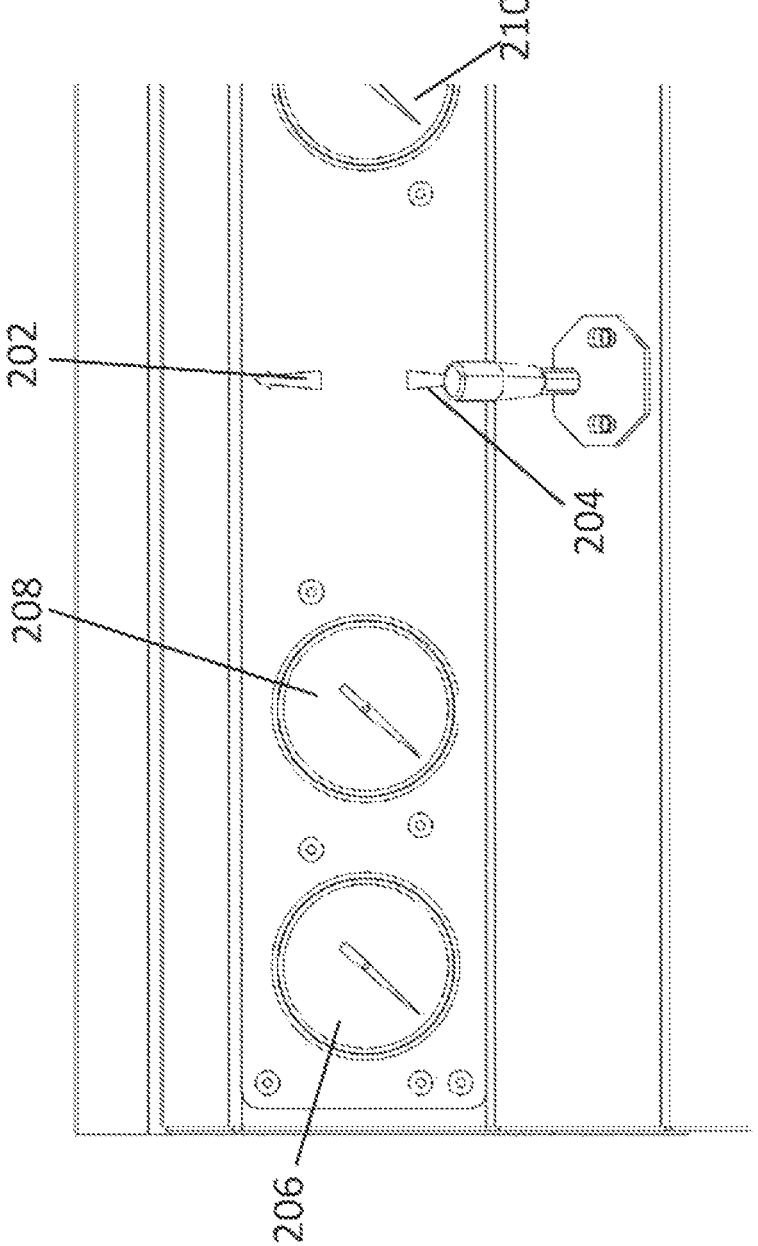
FIG. 20 illustrates a second perspective view of a remote control panel according to the present invention.
Figure 21:
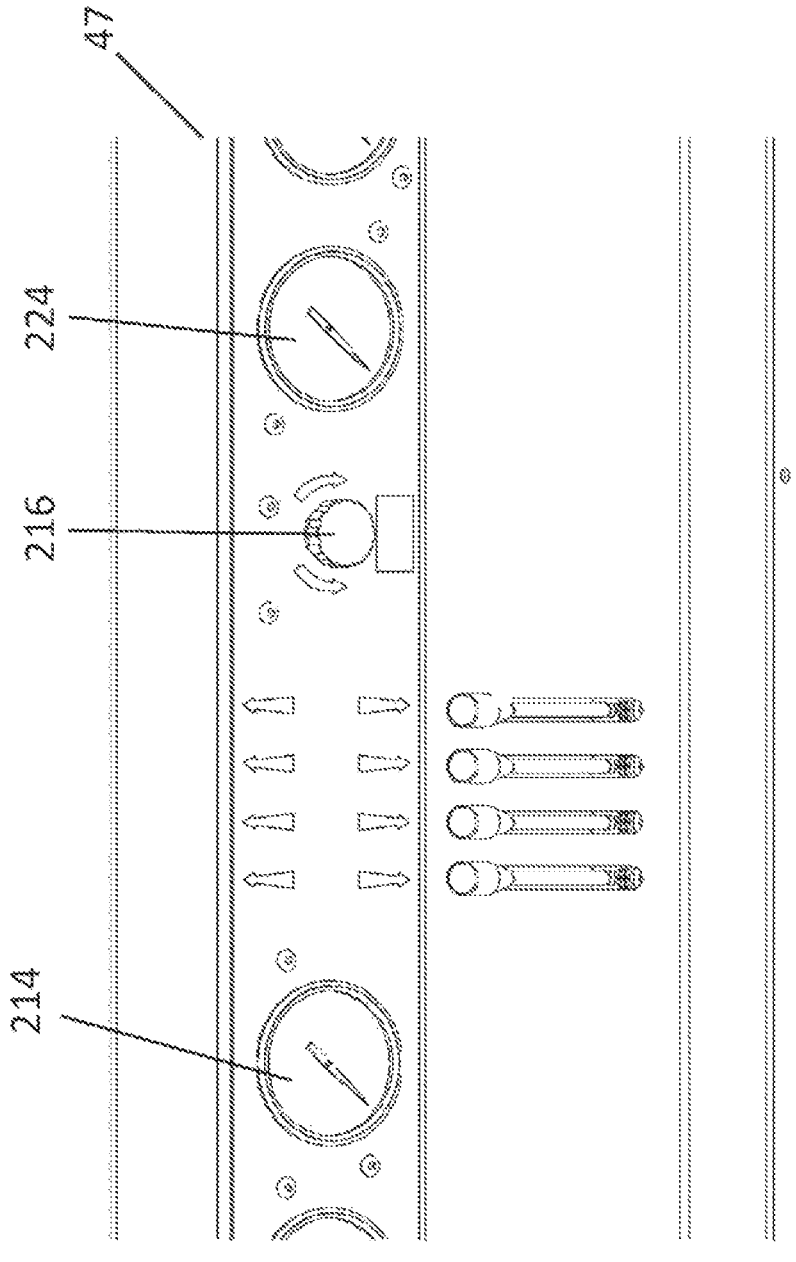
FIG. 21 illustrates a third perspective view of a remote-control panel according to the present invention.
Figure 22:
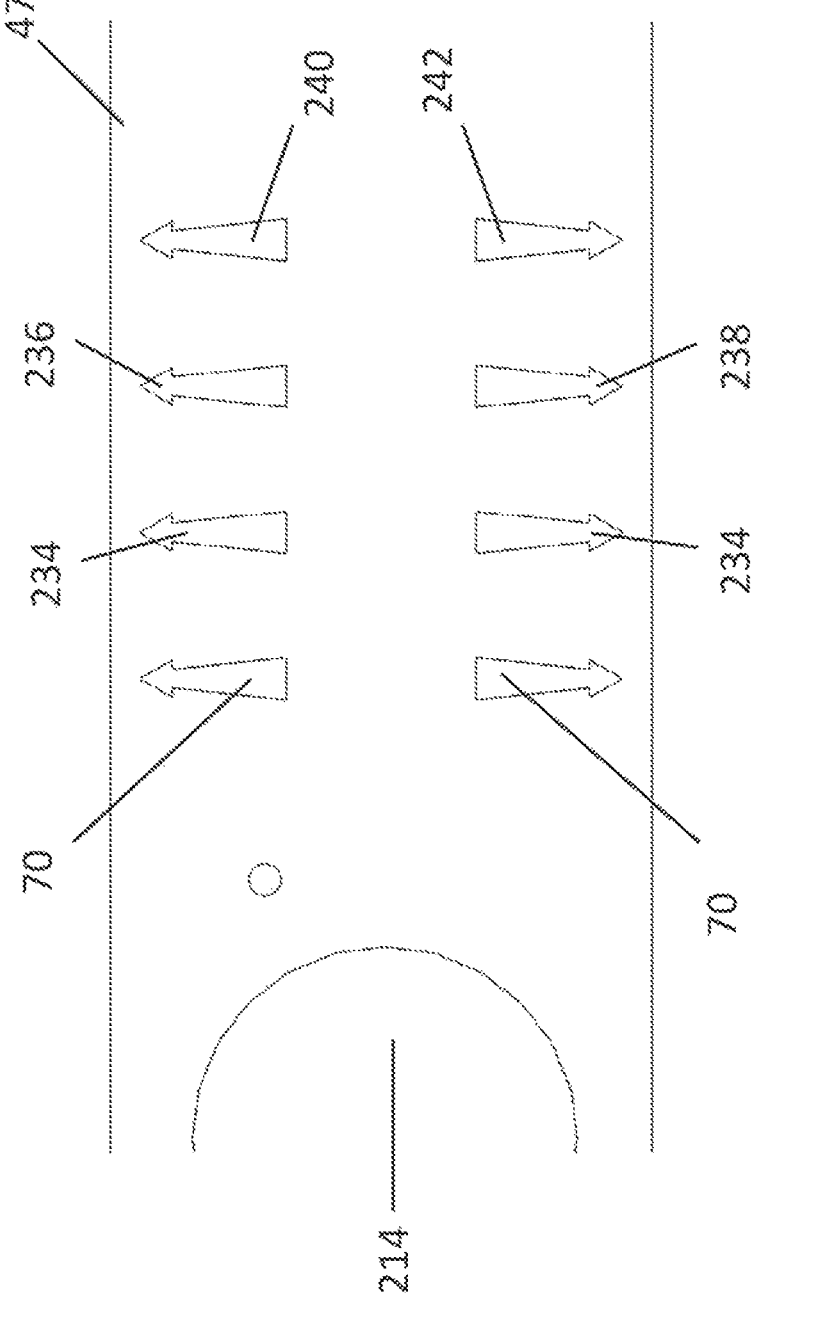
FIG. 22 illustrates a fourth perspective view of a remote-control panel.
Figure 23:
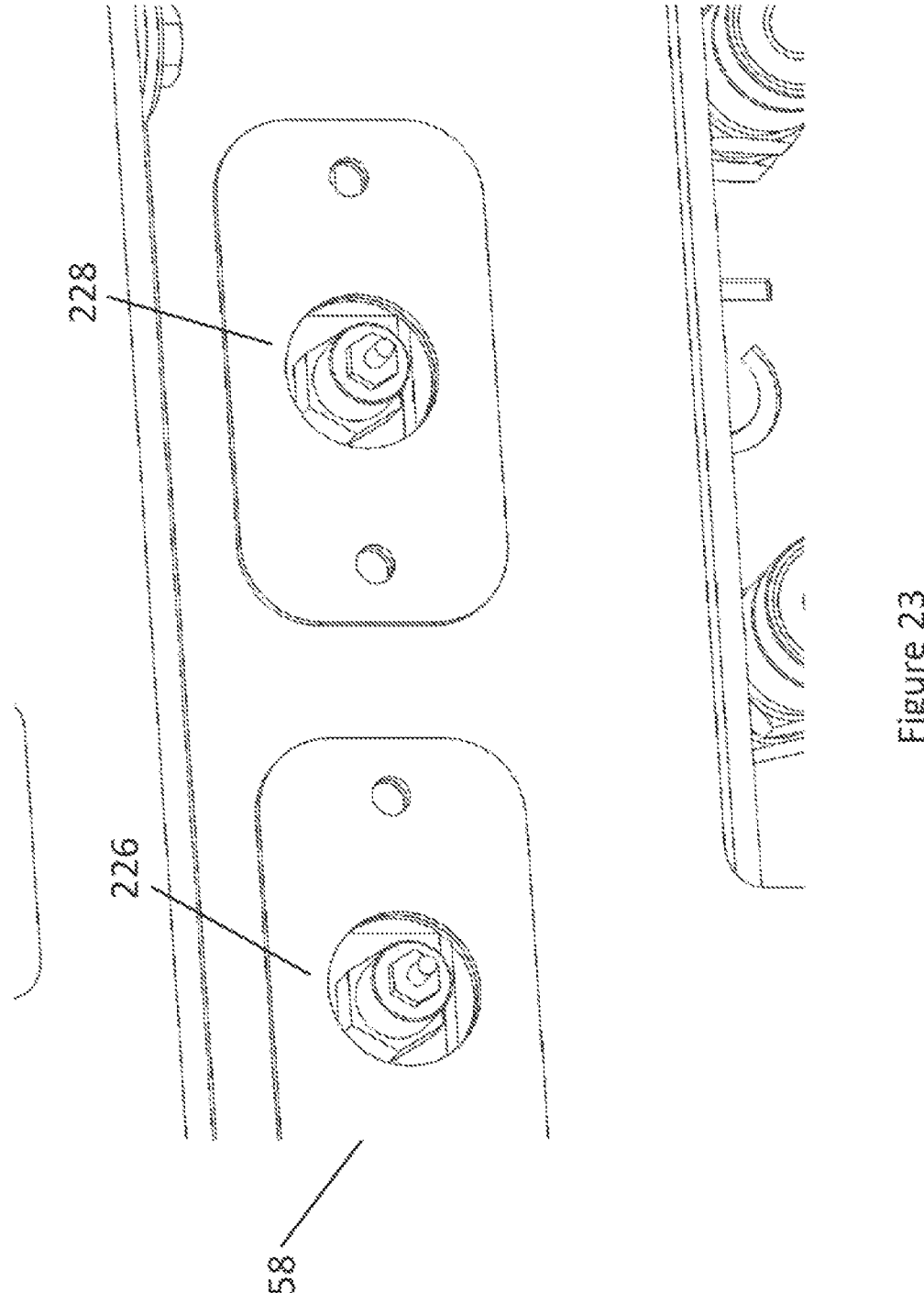
FIG. 23 illustrates a perspective view of pressure check points of the cutting apparatus according to the present invention.
Figure 24:
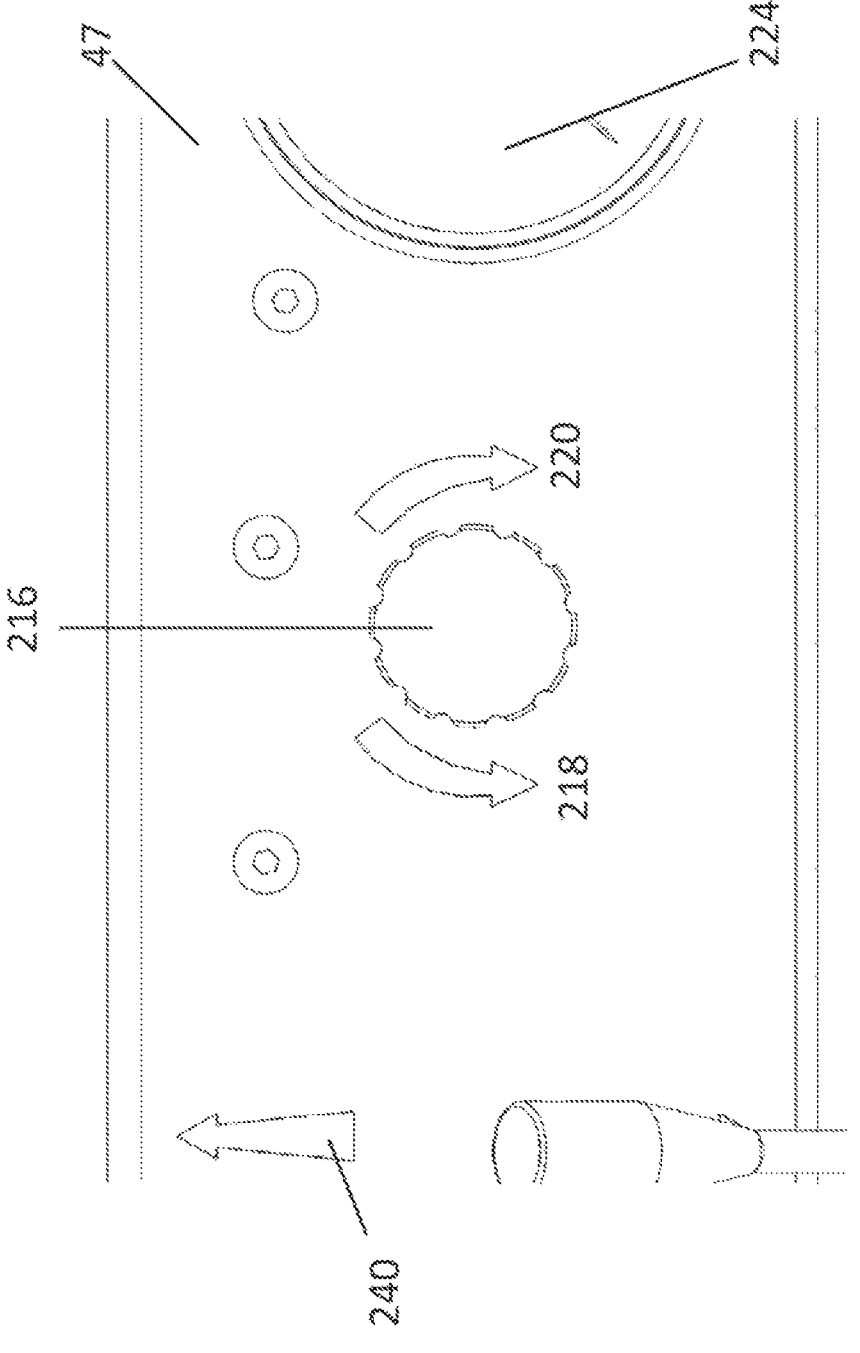
FIG. 24 illustrates a fifth perspective view of the present invention according to an aspect of the present invention.
Figure 30:
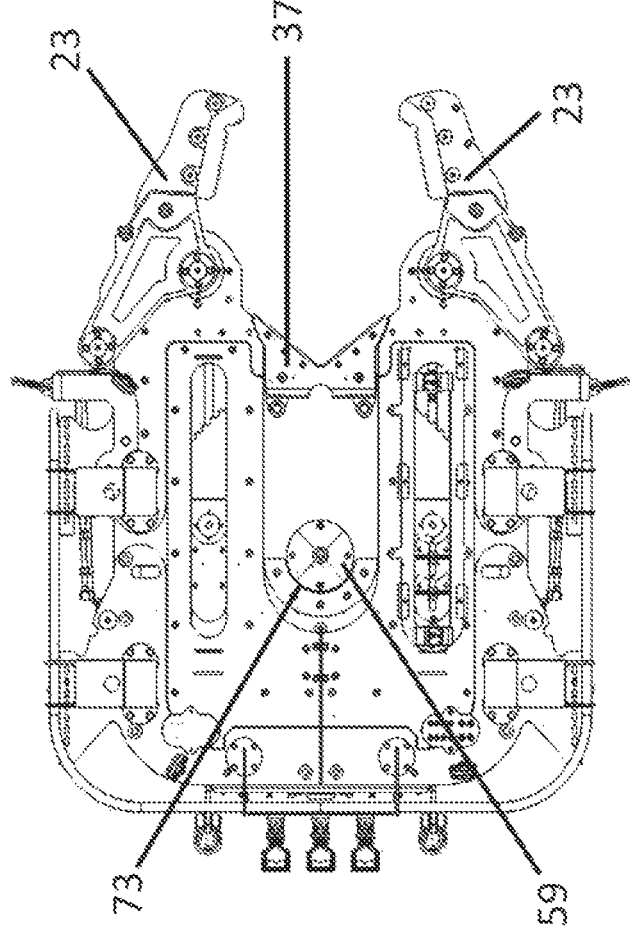
FIG. 30 is an orthogonal view of the cutting apparatus.

The cutting apparatus 1 is suitable for subsea application. The cutting apparatus 1 is suitable for above sea application. The cutting apparatus 1 has a remote-control panel 47 to enable remote control of one or more other elements of the cutting apparatus. The cutting apparatus 1 has a remote observation arrangement to enable observation of one or more other elements of the cutting apparatus in operation from a distance in relation to one or more other elements of the cutting apparatus. The cutting apparatus 1 has a remote optical observation arrangement to enable observation of one or more other elements of the cutting apparatus in operation from a distance in relation to one or more other elements of the cutting apparatus. The remote observation arrangement comprises one or more cameras (not shown) which are releasably attachable to the main frame 13 of the cutting apparatus 1. The remote observation arrangement has one or more lights (not shown) which are releasably attachable to the main frame 13 of the cutting apparatus 1. The remote-control observation arrangement has one or more screens (not shown) locatable on the remote control-panel to enable visualisation of images and/or videos captured by the one or more cameras. The cutting apparatus 1 has rotator blade indicators 59 to indicate when the at least one blade is or is not rotating. The rotator blade indicators are locatable on the main frame 13 of the cutting apparatus 1 and/or on the remote-control panel 47. The rotator blade indicators 59 are also locatable on the blade retaining flange, 73 as illustrated in FIG. 30. The rotator blade indicators have one or more sensors configurable to detect rotation of the at least one blade such as motion sensors and or any other type of sensor configurable to detect rotation of the at least one blade 12. The cutting apparatus 1 has one of more indicators 48 for the linear travel which are configurable to indicate linear movement of the cutting head and/or cutting head attachment arrangement in both forwards and reverse direction. Referring to FIG. 18, as twin shaft drive motor 8 rotates shaft 9 (shown in FIG. 3), this causes rotation of lead screw 5 which drives the threaded collar/travelling nut 10 in a linear direction, forward and/or backward. Movement of the threaded collar/travel nut 10 further causes movement of the cutting head attachment arrangement 3 and/or cutting head 2 in the same direction. Referring to FIG. 41, as gearbox 103 receives power from motor 8, this is transmitted to the gearbox outputs 103b, causing rotation of shafts 9. This causes rotation of lead screw 5 which drives the threaded collar/travelling nut 10 in a linear direction, forward and/or backward. Movement of the threaded collar/travel nut 10 further causes movement of the cutting head attachment arrangement 3 and/or cutting head 2 in the same direction. Rotation of shaft 9 also causes rotation of the travel indicator 48. This enables an operator to visualise when and in which direction the linear drive is moving. The travel indicator 48 will rotate clockwise and/or anticlockwise depending on the direction of rotation of the shaft and/or direction of linear movement of the cutting head attachment arrangement 3 and/or cutting head 2. The cutting apparatus 1 is hydraulically, electrically and/or pneumatically powered and/or is powered via any other suitable means. The cutting apparatus 1 has a slew assembly 49. This enables rotation of the cutting apparatus and/or vertical alignment of the cutting apparatus and/or horizontal alignment of the cutting apparatus and/or alignment of the apparatus in any orientation between vertical and horizontal alignment. The slew assembly enables adjustment of the alignments and/or orientation of the cutting apparatus. The cutting apparatus has one or more connection members 50 for connecting the cutting apparatus 1 to a remotely operated vehicle (ROV) and/or a crane for deployment of the cutting apparatus. The cutting apparatus 1 has one or more electrical, hydraulic and/or pneumatic connection arrangements for connecting the apparatus to a remote power source. The cutting apparatus 1 is configurable to receive hydraulic power from a power pack and an excavator. The cutting apparatus 1 has a floatation arrangement (not shown) to provide neutral buoyancy of the cutting apparatus 1. This improves the ease of handling and/or positioning the cutting apparatus. The floatation arrangement is releasably attachable to the main frame 13 of the cutting apparatus. The cutting apparatus 1 is suitable to cut a variety of materials including steel, concrete and inconel. The cutting apparatus 1 is suitable to cut a variety of objects including pipes, blocks of material, mooring chain and umbilicals. The clamping arrangement is 22 configurable to clamp an object having a diameter in the range of approximately 1270 mm and 101.6 mm. The cutting head 2 is configurable to support at least one blade 12 having a diameter up to 2600 mm. The cutting apparatus 1 has a lubrication arrangement to enable lubrication of the at least one blade during cutting. The lubrication arrangement has a fluid delivery arrangement to deliver fluid to the at least one blade 12 during cutting. FIG. 23 illustrates pressure check points 58 which allow for a hydraulic pressure gauge to be connected under pressure to the pressure line so the pressure can be determined. This can be achieved without and loss in hydraulic oil. In this embodiment, the pressure check points 58 are located on the main frame of the cutting apparatus 1. However, the pressure check points may be located on any other suitable part of the cutting apparatus 1.

The cutting apparatus 1 has one or more auxiliary valves 70 to enable control of additional hydraulic circuits from the remote-control panel and to enable individual control of the one or more upper clamping jaws and one or more lower clamping jaws.

In use, the cutting apparatus 1 is connected to a hydraulic using suitable means for example, suitable open-ended spanners. The hydraulic hoses are BSP type thread the sizes are ¼" BSP—⅜" BSP—½ BSP. Replacement fittings or hoses should be the correct size with BSP hose ends and fittings. The hydraulic hoses are SAE100R2AT. However, the skilled person will understand that any other suitable hoses or fittings may be used. Hydraulic oil may be supplied to the cutting apparatus via a direct hydraulic hose connection into the bulkhead or by connecting the supply via a series of hot stabs. The control panel and bulkhead of the cutting apparatus comprises the same notations to mark the hydraulic connectors. The hydraulic supply hose is connected from the HPU to the control panel 47. Hydraulic return hoses are connected from the control panel 47 to the HPU. The control panel 47 is then connected to the cutting apparatus 1 via hydraulic hoses, the hydraulic hoses include one or more of a blade supply and return, a feed supply and return, a tank line (the type of the tank line will depend on the cutting means/blade to be used), left clamp open and close and/or right claim open and close. The cutting apparatus can then be raised by a suitable means for example by a crane. The cutting apparatus functionality is tested by operating one or more control arrangements.

In use, an object is cut using cutting apparatus 1 by deploying the cutting apparatus 1 to the site where the cut is required and installing a cutting arrangement drive arrangement 100 and/or cutting head 2 to the cutting apparatus 1. This may involve installing and/or replacing one or more parts of the cutting arrangement drive arrangement 100 such as a cutting means 12 and/or cutting means motor 43. The clamping force of the cutting apparatus 1 and/pr clamp arrangement 22 should be pre-set prior to deployment of the cutting apparatus 1. Power is provided to the clamping means 22 to enable the clamping arrangement 22 to manoeuvre around an object to be cut. The clamping jaws 23 and/or clamping arms 24 are opened via the control means 232 (left clamping arm open) and 236 (right clamping arm open) and the cutting arrangement/blade 12 is fully retracted away from the object engaging end 20 of the cutting apparatus. The left clamping arm and right clamping are actuated to close around the object to be cut via control arrangement 234 and 223638, respectively. The object is clamped such that it abuts against the abutment portion 37 of the cutting apparatus 1. Power is provided to the cutting arrangement motor 43 and/or to the linear drive arrangement 4 to power rotation of the cutting arrangement 12 and movement of the cutting head 2 and/or cutting head attachment arrangement 3 and/or of the cutting arrangement 12 towards the object to be cut. The blade 12 is activated in a clockwise direction via actuation of blade lever towards a direction 202. With the blade 12 rotating, the blade feed control 216 is in a closed position. Blade feed control can be operated to a minimum by rotating in the direction of 218 or a maximum by rotating the direction of 220. The blade 12 is feed toward the object to be cut via activation of a feed in lever in the direction of the 'feed in' position 240. The power is maintained via checking and adjustment of the pressure gauges and feed control, 210 and 214 indicate a left-hand clamp pressure gauge and a right hand clamp closure pressure gauge respectively, reference numeral 224 indicates feed in pressure control gauge, reference numerals 226 and 228 indicate blade circuit pressure control and feed circuit pressure control, respectively. The feed rate can be adjusted via the feed control in the direction 218 or 220. The linear feed indicator 48 is checked to ensure the linear feed is beginning to move. Blade pressure is checked throughout the cut via clockwise 206 and counter clockwise 208 blade pressure gauges and the blade feed can be adjusted according to the pressure. The pressure will indicate contact with the material being cut. Once the cut is complete, the feed lever is returned from the 'feed in' position 240 to a neutral position and the blade is stopped by pulling the blade lever from the clockwise direction, indicated at 202 to a neutral position. The feed control valve is then opened by turning the feed control to the max i.e., toward direction 220. The blade is in a direction toward the non-object engaging end 21 of the cutting apparatus by moving the feed lever toward the 'feed out' position 242. The cutting apparatus 1 is returned to the deck and one or more one or more parts the cutting arrangement drive arrangement 100 and/or the cutting head configuration and/or the cutting head 2 can be interchanged to prepare for the next cut, should the next cut require a different configuration.

The skilled man will appreciate that all preferred or optional features of the invention described with reference to only some aspects or embodiments of the invention may be applied to all aspects of the invention.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A cutting apparatus configurable for subsea application, the cutting apparatus comprising:
   a cutting head;

a main frame having an object engaging end and a non-object engaging end wherein the main frame comprises two spaced apart structural support members defining a structure of the apparatus;
   a clamping means releasably clamp an object to be cut; and
   a cutting means drive arrangement having at least one cutting means and at least one motive means configurable to rotate the at least one cutting means directly via an output shaft of the motive means, the cutting apparatus is configured such that all, some or a part of the cutting means drive arrangement is interchangeable, on site;
wherein at least one cutting means is removable from the cutting apparatus by opening the clamping means outwardly from the object engaging end, removing the at least one cutting means from the cutting head by removing fastening means and sliding the at least one cutting means between the two spaced apart structural support members and out through the object engaging end.

2. The cutting apparatus according to claim 1, wherein the cutting means drive arrangement comprises the at least one cutting means, the at least one motive means for powering the cutting means, mechanical fasteners, washers and/or flanges used for attaching the cutting means and/or the motor to each other, to one or more parts of the cutting apparatus and/or to one or more other parts of the cutting means drive arrangement.

3. The cutting apparatus according to claim 1, wherein one, some or all parts of the at least one cutting means drive arrangement are releasably detachable to a mounting plate of the cutting head.

4. The cutting apparatus according to claim 3, wherein the at least one cutting means and/or the motive means are releasably attachable to a mounting plate of the cutting head.

5. The cutting apparatus according to claim 4, wherein the at least one cutting means is configurable to be removed from the cutting apparatus and/or another part of the cutting apparatus by opening the clamping means and moving the at least one cutting means out through the object engaging end of the cutting apparatus; and/or wherein the at least one cutting means is configurable to be attached to the cutting apparatus and/or another part of the cutting apparatus by opening the clamping means, moving and/or sliding the at least one cutting means into the object engaging end and between the two spaced apart structural support members and attaching the cutting means to the mounting plate of the cutting head and/or another part of the cutting apparatus or cutting head.

6. The cutting apparatus according to claim 1, wherein the at least one cutting means is at least one blade; and wherein the at least one cutting means is interchangeable with a different type of cutting means.

7. The cutting apparatus according to claim 1, wherein the cutting apparatus comprises a cutting head attachment means configurable for releasably attaching the cutting head and/or the cutting means drive arrangement to one or more other parts of the cutting apparatus.

8. The cutting apparatus according to claim 7, wherein the cutting apparatus comprises a drive means for enabling linear motion of the cutting head attachment means towards and/or away from an object to be cut, in use; and wherein the drive means enables linear motion of the cutting means drive arrangement and/or the cutting head via the cutting head attachment means towards and/or away from an object to be cut, in use.

9. The cutting apparatus according to claim 8, wherein the drive means comprises at least two drive members, wherein the at least two drive members are lead screws.

10. The cutting apparatus according to claim 8, wherein the drive means comprises a control means having a flow control valve for controlling the speed of the drive means and/or drive motor.

11. The cutting apparatus according to claim 7, wherein the cutting head and/or mounting plate can be removed from the cutting apparatus and/or cutting head attachment means by opening the clamping means, detaching any abutment portion and/or Vee-block assembly releasably attached at the object engaging end of the cutting apparatus, removing any mechanical fasteners and/or any other means suitable for attaching the cutting head to the cutting head attachment means and sliding the cutting head and/or mounting plate, including any other parts attached to the cutting head mounting plate between the two spaced apart structural support members and out through the object engaging end; and/or wherein the cutting head and/or mounting plate of the cutting head is attached to the cutting apparatus and/or cutting head attachment means by opening the clamping means, detaching any abutment portion and/or Vee-block assembly releasably attached at the object engaging end of the cutting apparatus, sliding the cutting head and/or mounting plate into the object engaging end and between the two spaced apart structural support members and attaching the cutting head and/or mounting plate to the cutting apparatus and/or cutting head attachment means using fastening means if necessary and reattaching the abutment portion and/or Vee-block assembly.

12. The cutting apparatus according to claim 1, wherein the motive means is a blade motor, and wherein the motive means is interchangeable with a different type of motive means.

13. The cutting apparatus according to claim 1, wherein the cutting apparatus comprises a high speed, low torque cutting means drive arrangement to enable the cutting apparatus to perform a high speed, low torque cut; wherein the high speed, low torque cutting means drive arrangement comprises a high speed, low torque motor; and wherein the high speed, low torque cutting means drive arrangement comprises a high speed, low torque cutting means.

14. The cutting apparatus according to claim 1, wherein the cutting apparatus comprises a low speed, high torque cutting means drive arrangement to enable the cutting apparatus to perform a low speed, high torque cut; wherein the low speed, high torque cutting means drive arrangement comprises a low speed, high torque motor; and wherein the low speed, high torque cutting means drive arrangement comprises a low speed, high torque cut.

15. The cutting apparatus according to claim 1, wherein the clamping means comprises one or more clamping jaws; wherein the one or more clamping jaws are interchangeable with one or more different types of clamping jaws; wherein the clamping means comprises a left clamping arm and a right clamping arm; and wherein the left clamping arm and the right clamping arm are configurable to support at least one clamping jaw each.

16. The cutting apparatus according to claim 15, wherein the left clamping arm and the right clamping arm are releasably and pivotally attachable to the main frame of the cutting apparatus at an object engaging portion of the cutting apparatus.

17. The cutting apparatus according to claim 15, wherein the one or more clamping jaws are configurable to releasably attach to the clamping arms via mechanical fasteners such as bolts and/or via one or more shearable bolts/shear bolts which are configurable to snap upon application of excessive force or tension.

18. The cutting apparatus according to claim 15, wherein the cutting apparatus comprises a left primary pivot and a right primary pivot around which the left clamping arm and the right clamping arm are configurable to pivot respectively to enable movement of the left clamping arm and/or right clamping arm and one or more clamping jaws around and/or away from an object to be clamped; and wherein the left primary pivot and the right primary pivot extend between the two spaced apart structural support members at or about the object engaging portion.

19. The cutting apparatus according to claim 18, wherein one or both of the left clamping arm and the right clamping arm of the clamping means comprises one or more upper clamping jaws configurable to clamp an object above the cut line; wherein one or both of the left clamping arm and the right clamping arm of the clamping means comprises one or more lower clamping jaws configurable to clamp an object below the cut line; and wherein the cutting apparatus is configurable to clamp an object above and below the cut line to create a tension free zone between the upper clamping jaws and the lower clamping jaws.

20. The cutting apparatus according to claim 1, wherein the two spaced apart structural support members are located mutually opposed to each other; and wherein the left clamping arm and/or the right clamping arm is releasably and/or pivotally attached to one or both of the structural support members.

* * * * *